(12) United States Patent
Fang et al.

(10) Patent No.: US 10,813,061 B2
(45) Date of Patent: Oct. 20, 2020

(54) POWER REDUCTION IN A WIRELESS NETWORK

(71) Applicant: Intel Corporation, Santa Clara, CA (US)

(72) Inventors: Juan Fang, Hillsboro, OR (US);
Laurent Cariou, Portland, OR (US);
Shahrnaz Azizi, Cupertino, CA (US);
Alexander W. Min, Portland, OR (US);
Thomas J. Kenney, Portland, OR (US);
Rath Vannithamby, Portland, OR (US); Ravikumar Balakrishnan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 16/134,400

(22) Filed: Sep. 18, 2018

(65) Prior Publication Data
US 2019/0045461 A1     Feb. 7, 2019

(51) Int. Cl.
| | |
|---|---|
| *H04W 52/36* | (2009.01) |
| *H04W 52/24* | (2009.01) |
| *H04W 72/04* | (2009.01) |
| *H04W 74/00* | (2009.01) |
| *H04B 17/318* | (2015.01) |
| *H04L 29/12* | (2006.01) |
| *H04W 84/12* | (2009.01) |

(Continued)

(52) U.S. Cl.
CPC ........ *H04W 52/367* (2013.01); *H04B 17/318* (2015.01); *H04W 52/245* (2013.01); *H04W 72/0473* (2013.01); *H04W 74/006* (2013.01); *H04L 61/6022* (2013.01); *H04W 74/0816* (2013.01); *H04W 84/12* (2013.01); *H04W 88/08* (2013.01)

(58) Field of Classification Search
None
See application file for complete search history.

(56) References Cited

U.S. PATENT DOCUMENTS

| 2016/0165574 A1* | 6/2016 | Chu | ..................... H04L 27/2602 370/312 |
|---|---|---|---|
| 2019/0082467 A1* | 3/2019 | Nunome | ............. H04W 74/006 |

(Continued)

*Primary Examiner* — Lonnie V Sweet
(74) *Attorney, Agent, or Firm* — Schwegman Lundberg & Woessner, P.A.

(57) ABSTRACT

Methods, apparatuses, and computer readable media for power reduction in a wireless network are disclosed. An apparatus of a first access point is disclosed comprising processing circuitry configure to decode a first PPDU, the first PPDU including a trigger for control (TOC) frame, the TOC frame comprising resource allocations for deferral transmissions, the TOC frame including a first duration field indicating a duration of a transmission opportunity (TXOP). The processing circuitry may be further configured to respond to a determination that the TOC frame includes a resource allocation by encoding a second PPDU including a preamble portion and a media access control (MAC) portion including a receive with condition (ARC) frame, the ARC frame including a second duration field indicating a remaining duration of the TXOP, an address field indicating a MAC address of the first AP, and a condition field indicating a condition.

20 Claims, 24 Drawing Sheets

(51) Int. Cl.
*H04W 88/08* (2009.01)
*H04W 74/08* (2009.01)

(56) References Cited

U.S. PATENT DOCUMENTS

2020/0045637 A1* 2/2020 Noh .................... H04L 27/0006
2020/0169897 A1* 5/2020 Adachi ............... H04W 74/002

* cited by examiner

BSS

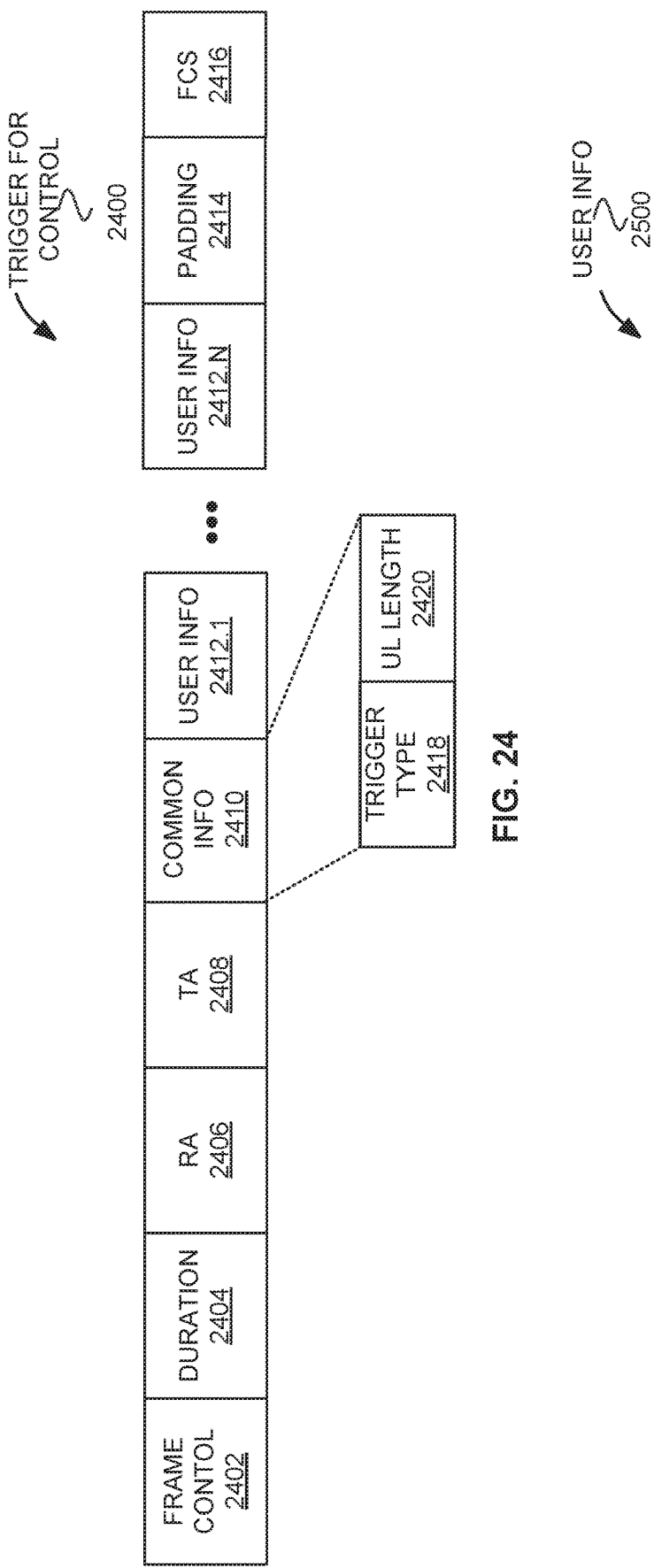
FIG. 24
FIG. 25

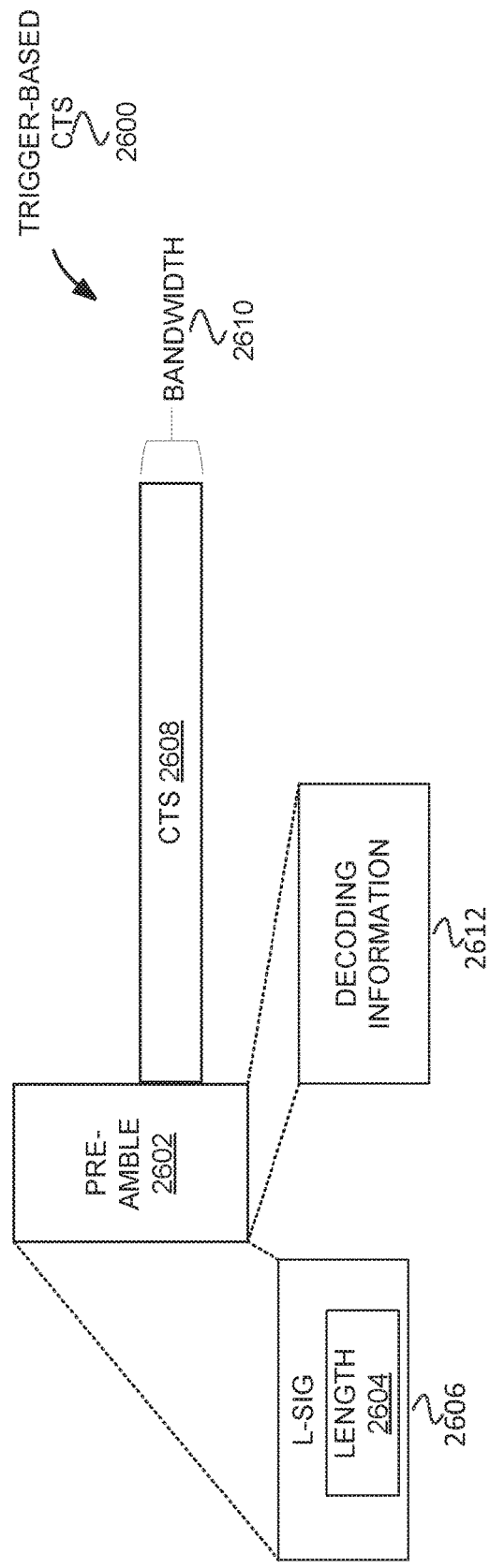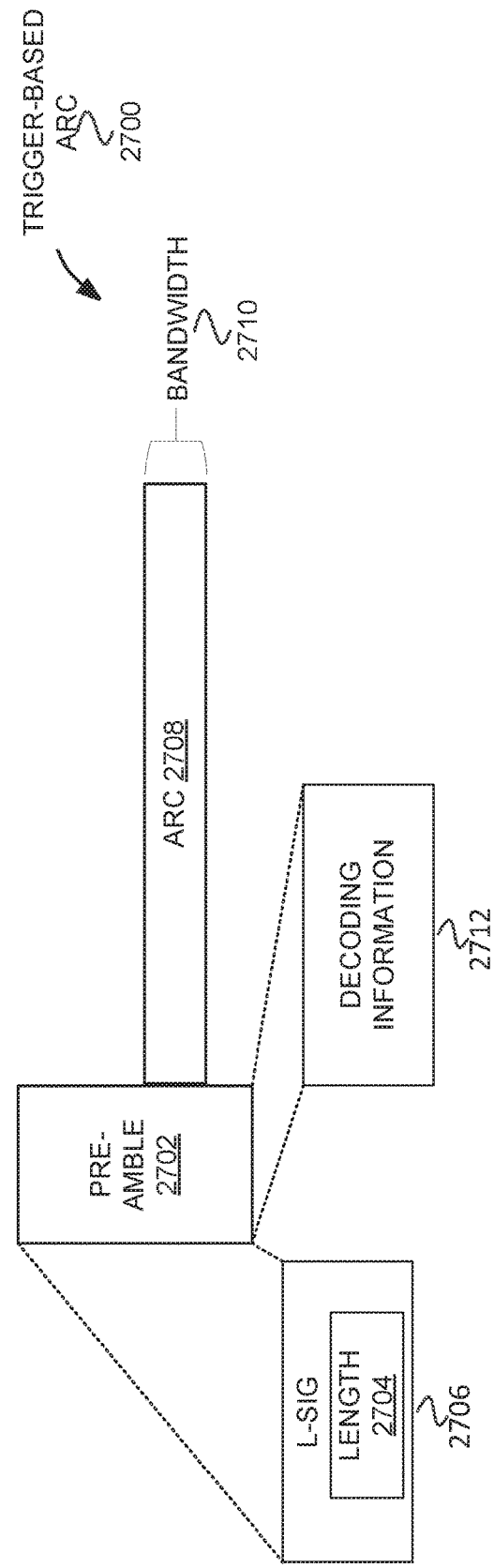

POWER REDUCTION IN A WIRELESS NETWORK

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11 ax, and/or IEEE 802.11 extremely high-throughput (EHT).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 24 illustrates a trigger for control (TOC) frame in accordance with some embodiments;

FIG. 25 illustrates a user information field in accordance with some embodiments;

FIG. 26 illustrates a trigger-based (TB) CTS in accordance with some embodiments;

FIG. 27 illustrates a TB ARC frame in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling null data packet (NDP) feedback reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
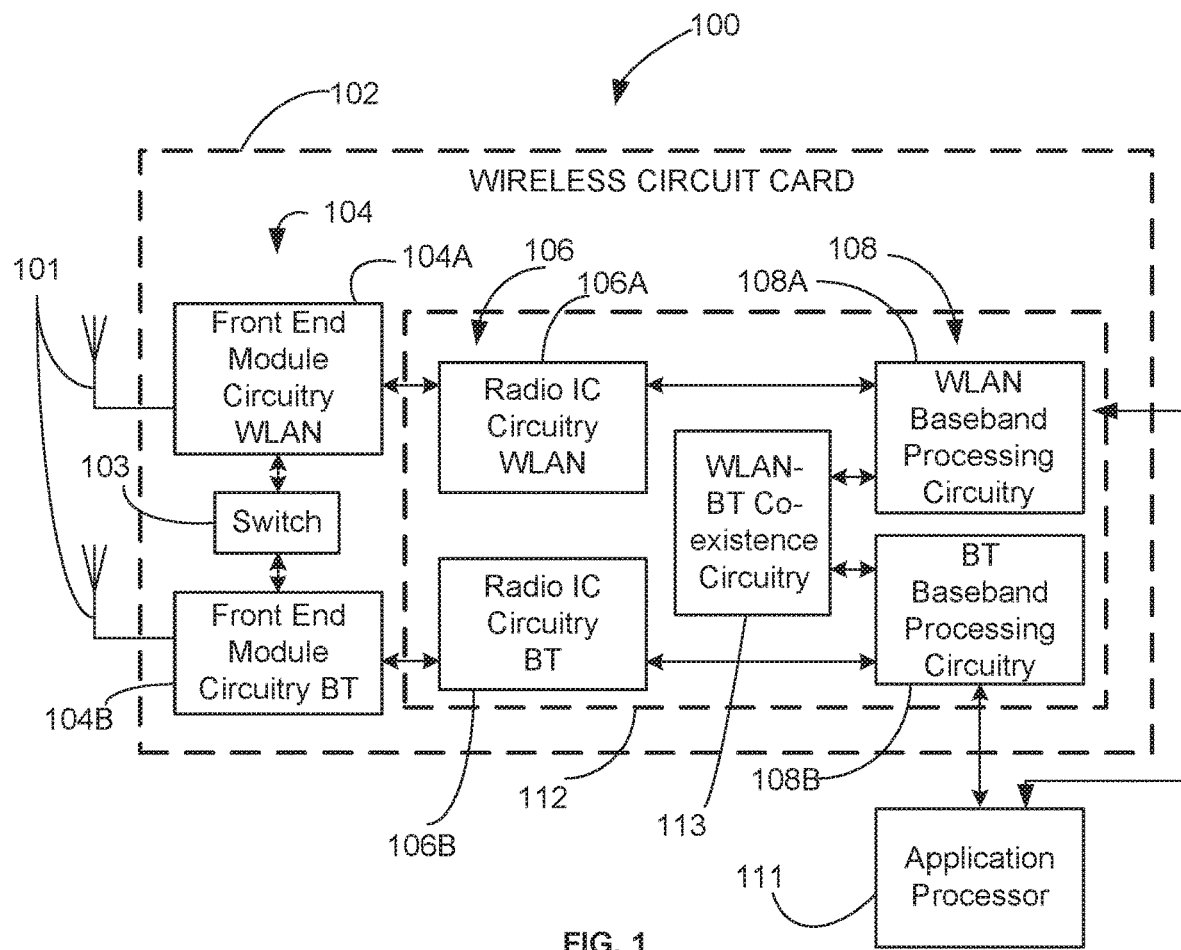
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11 n-2009, IEEE 802.11-2012, IEEE 802.11-2016, IEEE 802.11ac, and/or IEEE 802.1 lax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.1 lax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
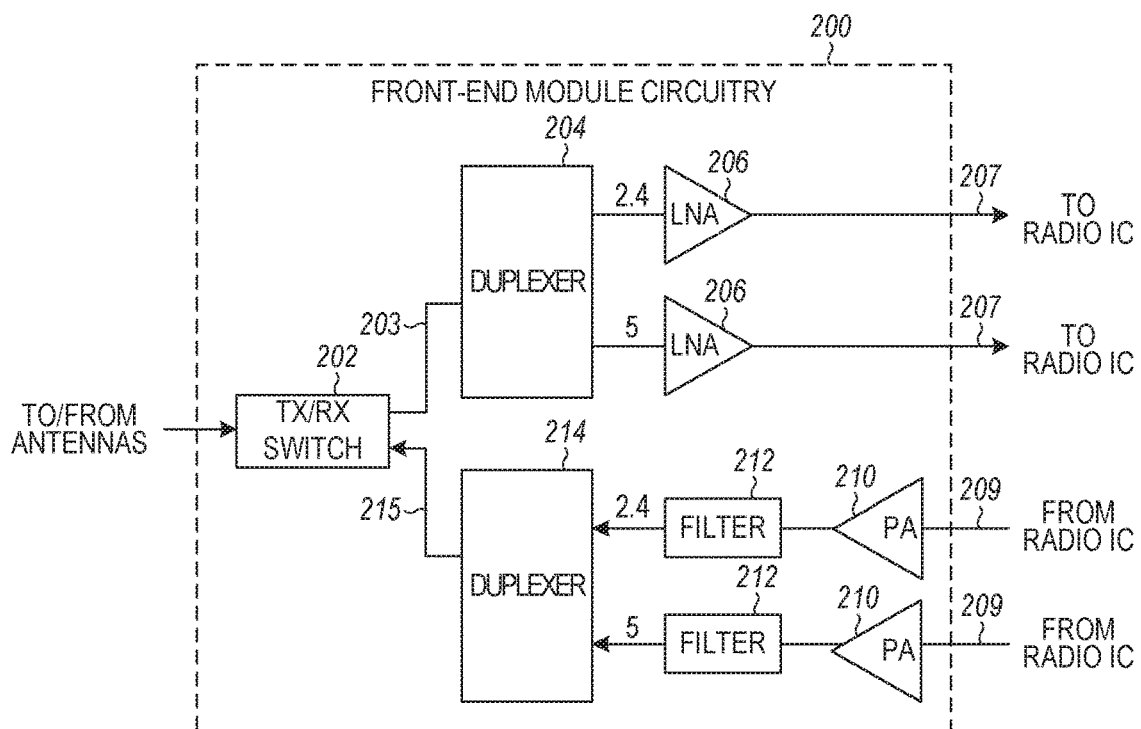
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
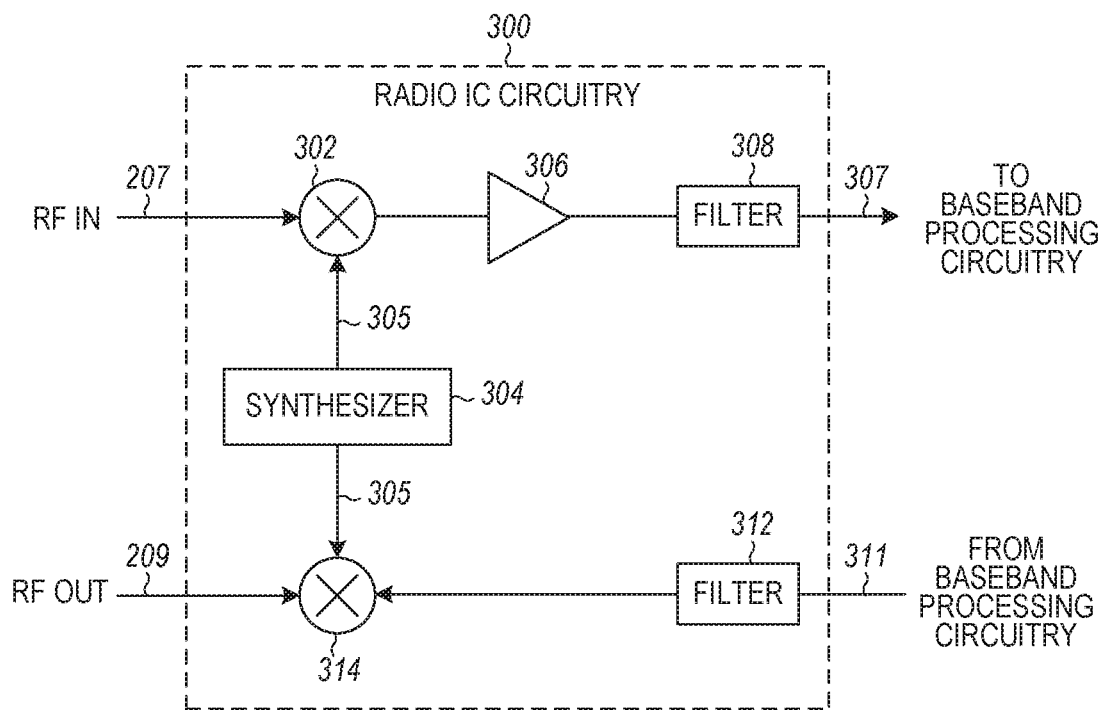
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuit 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
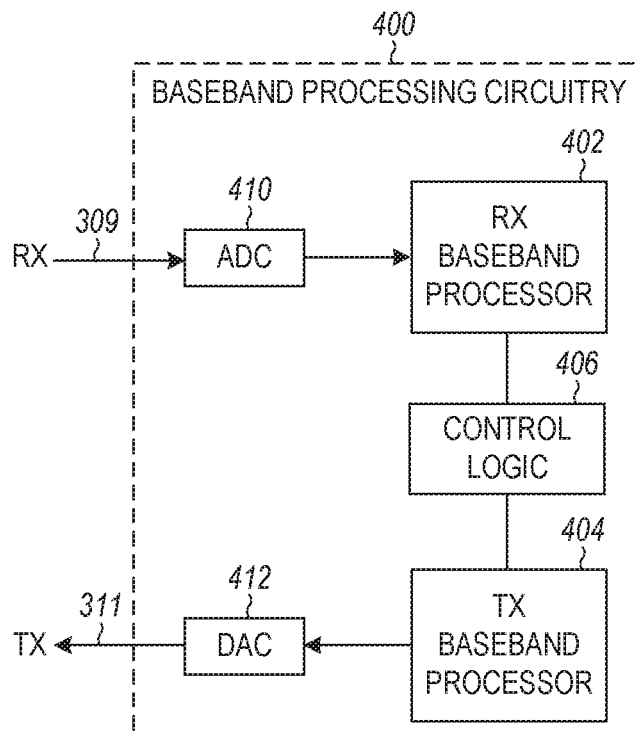
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
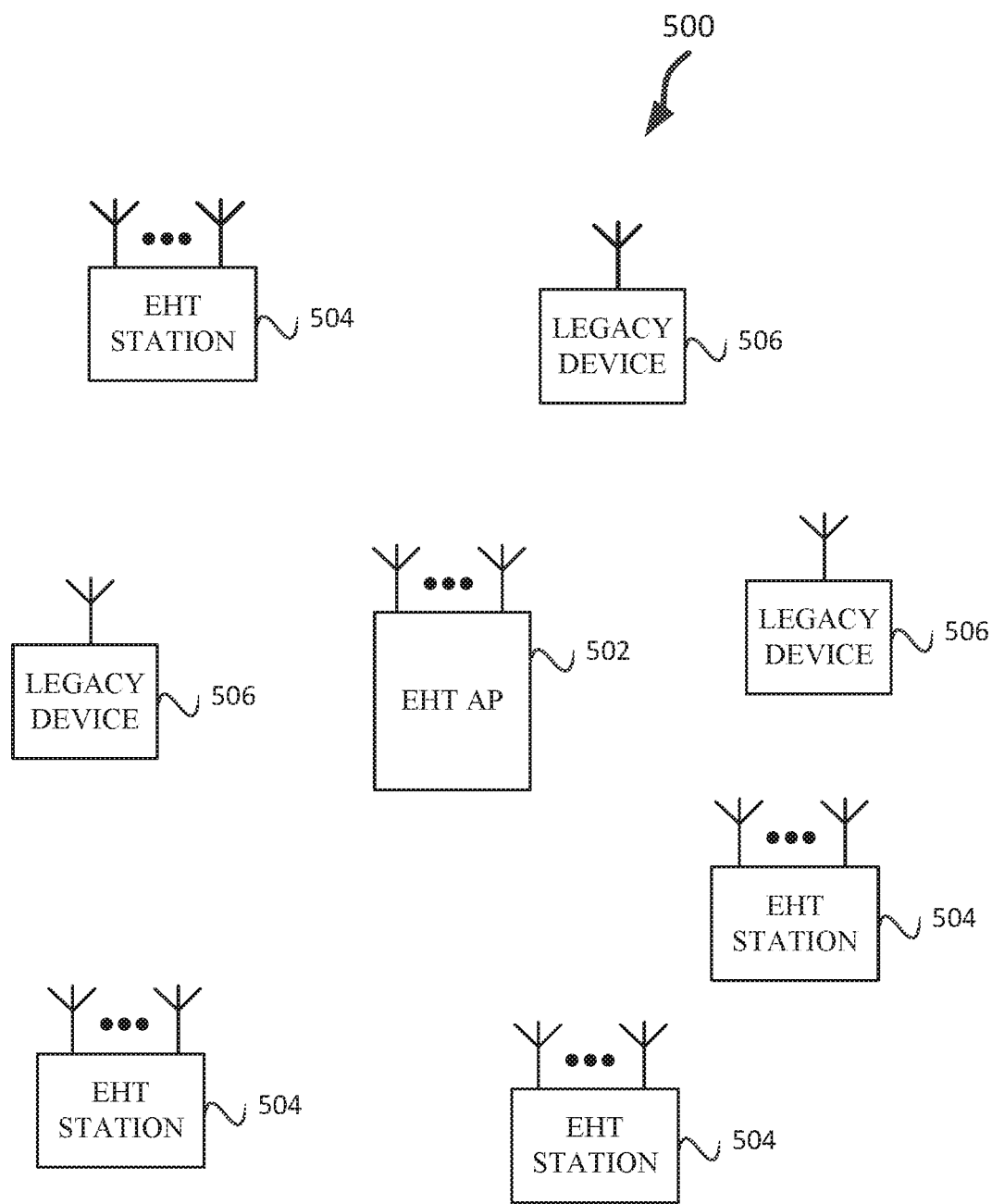
FIG. 5 illustrates a WLAN in accordance with some embodiments.

FIG. 5 illustrates a WLAN 500 in accordance with some embodiments. The WLAN 500 may comprise a basis service set (BSS) that may include a EHT access point (AP) 502, which may be termed an AP, a plurality of EHT (e.g., IEEE 802.11EHT) stations (STAs) 504, and a plurality of legacy (e.g., IEEE 802.11n/ac/ax) devices 506. In some embodiments, the EHT STAs 504 are configured to operate in accordance with IEEE 802.11 ax. In some embodiments, IEEE 802.11EHT may be termed Next Generation 802.11. In some embodiments, the EHT APs 502 are configured to operate in accordance with IEEE 802.1 lax.

The EHT AP 502 may be an AP using the IEEE 802.11 to transmit and receive. The EHT AP 502 may be a base station. The EHT AP 502 may use other communications protocols as well as the IEEE 802.11 protocol. The IEEE 802.11 protocol may be IEEE 802.11 ax. The IEEE 802.11 protocol may be IEEE 802.11 next generation. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one EHT APs 502 and may control more than one BSS, e.g., assign primary channels, colors, etc. EHT AP 502 may be connected to the internet.

The legacy devices 506 may operate in accordance with one or more of IEEE 802.11 a/b/g/n/ac/ad/af/ah/aj/ay/ax, or another legacy wireless communication standard. The legacy devices 506 may be STAs or IEEE STAs. The EHT STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11EHT or another wireless protocol. In some embodiments, the EHT STAs 504 may be termed extremely high throughput (EHT) stations or stations.

The EHT AP 502 may communicate with legacy devices 506 in accordance with legacy IEEE 802.11 communication techniques. In example embodiments, the EHT AP 502 may also be configured to communicate with EHT STAs 504 in accordance with legacy IEEE 802.11 communication techniques.

In some embodiments, a EHT frame may be configurable to have the same bandwidth as a channel. The EHT frame may be a physical Layer Convergence Procedure (PLCP) Protocol Data Unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A EHT frame may be configured for transmitting a number of spatial streams, which may be in accordance with MU-MIMO and may be in accordance with OFDMA. In other embodiments, the EHT AP 502, EHT STA 504, and/or legacy device 506 may also implement different technologies such as code division multiple access (CDMA) 2000, CDMA 2000 IX, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

Some embodiments relate to EVT communications. In accordance with some IEEE 802.11 embodiments, e.g, IEEE 802.11EHT/ax embodiments, a EHT AP 502 may operate as a master station which may be arranged to contend for a wireless medium (e.g., during a contention period) to receive exclusive control of the medium for a transmission opportunity (TXOP). The EHT AP 502 may transmit a EHT/HE trigger frame transmission, which may include a schedule for simultaneous UL transmissions from EHT STAs 504. The EHT AP 502 may transmit a time duration of the TXOP and sub-channel information. During the TXOP, EHT STAs 504 may communicate with the EHT AP 502 in accordance with a non-contention based multiple access technique such as OFDMA or MU-MIMO. This is unlike conventional WLAN communications in which devices communicate in accordance with a contention-based communication technique, rather than a multiple access technique. During the EHT control period, the EHT AP 502 may communicate with EHT stations 504 using one or more EHT frames. During the TXOP, the EHT STAs 504 may operate on a sub-channel smaller than the operating range of the EHT AP 502. During the TXOP, legacy stations refrain from communicating. The legacy stations may need to receive the communication from the EHT AP 502 to defer from communicating.

In accordance with some embodiments, during the TXOP the EHT STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The EHT AP 502 may also communicate with legacy stations 506 and/or EHT stations 504 in accordance with legacy IEEE 802.11 communication techniques. In some embodiments, the EHT AP 502 may also be configurable to communicate with EHT stations 504 outside the HE TXOP in accordance with legacy IEEE 802.11 or IEEE 802.11EHT communication techniques, although this is not a requirement.

In some embodiments the EHT station 504 may be a "group owner" (GO) for peer-to-peer modes of operation. A wireless device may be a EHT station 502 or a EHT AP 502.

In some embodiments, the EHT STA 504 and/or EHT AP 502 may be configured to operate in accordance with IEEE 802.11 mc. In example embodiments, the radio architecture of FIG. 1 is configured to implement the EHT STA 504 and/or the EHT AP 502. In example embodiments, the front-end module circuitry of FIG. 2 is configured to implement the EHT STA 504 and/or the EHT AP 502. In example embodiments, the radio IC circuitry of FIG. 3 is configured to implement the EHT station 504 and/or the EHT AP 502. In example embodiments, the base-band processing circuitry of FIG. 4 is configured to implement the EHT station 504 and/or the EHT AP 502.

In example embodiments, the EHT stations 504, EHT AP 502, an apparatus of the EHT stations 504, and/or an apparatus of the EHT AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-31.

In example embodiments, the EHT station 504 and/or the EHT AP 502 are configured to perform the methods and operations/functions described herein in conjunction with FIGS. 1-31. In example embodiments, an apparatus of the EHT station 504 and/or an apparatus of the EHT AP 502 are configured to perform the methods and functions described herein in conjunction with FIGS. 1-31. The term Wi-Fi may refer to one or more of the IEEE 802.11 communication standards. AP and STA may refer to EHT access point 502 and/or EHT station 504 as well as legacy devices 506.

In some embodiments, a EHT AP STA may refer to a EHT AP 502 and/or a EHT STAs 504 that is operating as a EHT APs 502. In some embodiments, when a EHT STA 504 is not operating as a EHT AP, it may be referred to as a EHT non-AP STA or EHT non-AP. In some embodiments, EHT STA 504 may be referred to as either a EHT AP STA or a EHT non-AP.

Figure 6:
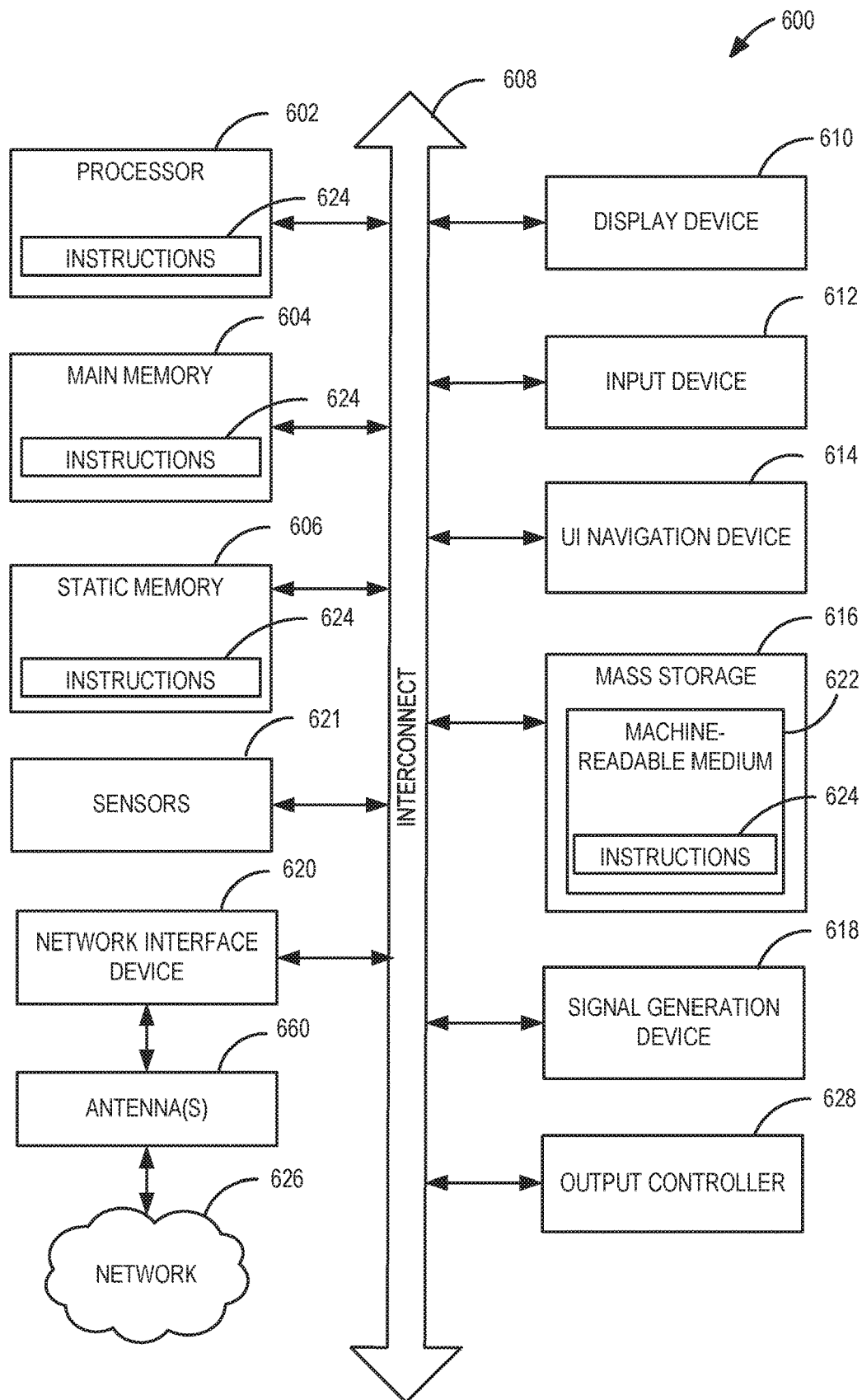
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a EHT AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
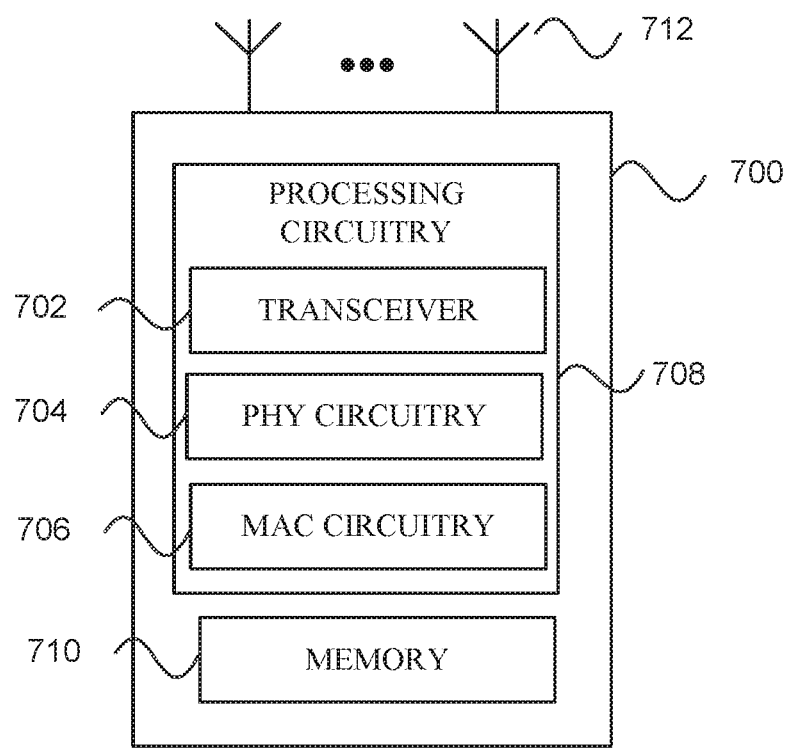
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or EHT wireless device. The wireless device 700 may be a EHT STA 504, EHT AP 502, and/or a HE STA or HE AP. A EHT STA 504, EHT AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., EHT AP 502, EHT STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., EHT AP 502 and/or EHT STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a EHT TXOP and encode or decode an EHT PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a EHT PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the EHT stations 504 of FIG. 5 or wireless device 700) and an access point (e.g., the EHT AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
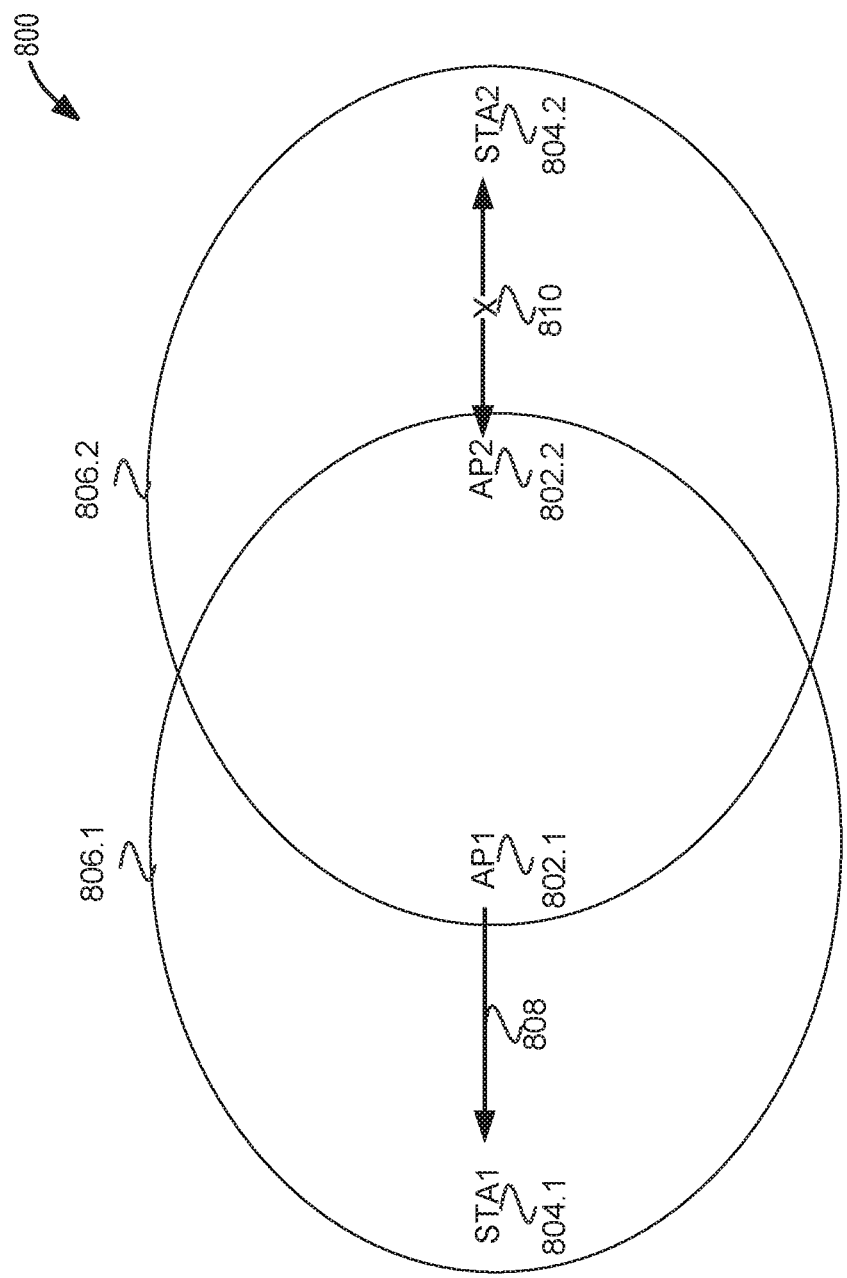
FIG. 8 illustrates overlapping basic service sets (OBSS) in accordance with some embodiments.

FIG. 8 illustrates overlapping basic service sets (OBSS) 800 in accordance with some embodiments. Illustrated in FIG. 8 are APs 802, STAs 804, transmission ranges 806, transmission 808, and transmission 810. Transmission ranges 806.1 and 806.2 indicate the transmission ranges of AP1 802.1 and AP2 802.1, respectively. The transmission range 806 may be a range of the signals of the AP 802 where outside the transmission range 806 the signal strength may be below a threshold, e.g., below −82 dBm. Each AP 802 is part of a different BSS, in accordance with some embodiments. In some embodiments, BSSs may include multiple APs 802. The BSSs may be termed OBSSs because the transmission ranges 806.1 and 806.2 overlap one another and they are operating on the same channel. In embodiments, the BSSs may be termed OBSSs because the transmission ranges 806.1 and 806.2 overlap one another.

The APs 802 may be EHT APs 502 or HE APs. The STAs 804 may be EHT STAs 504 or HE STAs. As illustrated, AP1 802.1 is transmitting transmission 808, e.g., a request-to-send (RTS). The transmission 808 may reach AP 802.2 since it is inside the transmission range 806.1 of AP1 802.1 but will not reach or likely will not reach STA2 804.2 because it is outside the transmission range 806.1 of AP1 802.1. STA2 804.2 may be termed a hidden node to AP1 802.1 in accordance with some embodiments. In some embodiments, the APs 802 may be managed by a common entity (not illustrated). In some embodiments, the APs 802 operate on different primary channels. For example, AP1 802.1 and AP2 802.2 may operate on primary channel 904.1 and primary channel 904.2, respectively. The APs 802 may operate on 20 MHz, 40 MHz, 80 MHz, 160 MHz, 80+80 MHz, 320 MHz, 160+160 MHz, 640 MHz, or another bandwidth, which may include a primary channel 904. For example, referring to FIG. 9, AP1 802.1 may operate on C1 902.1 and C2 902.2, which include the primary channel of AP2 904.2, e.g., primary channel 904.1 or primary channel 904.2.

Figure 9:
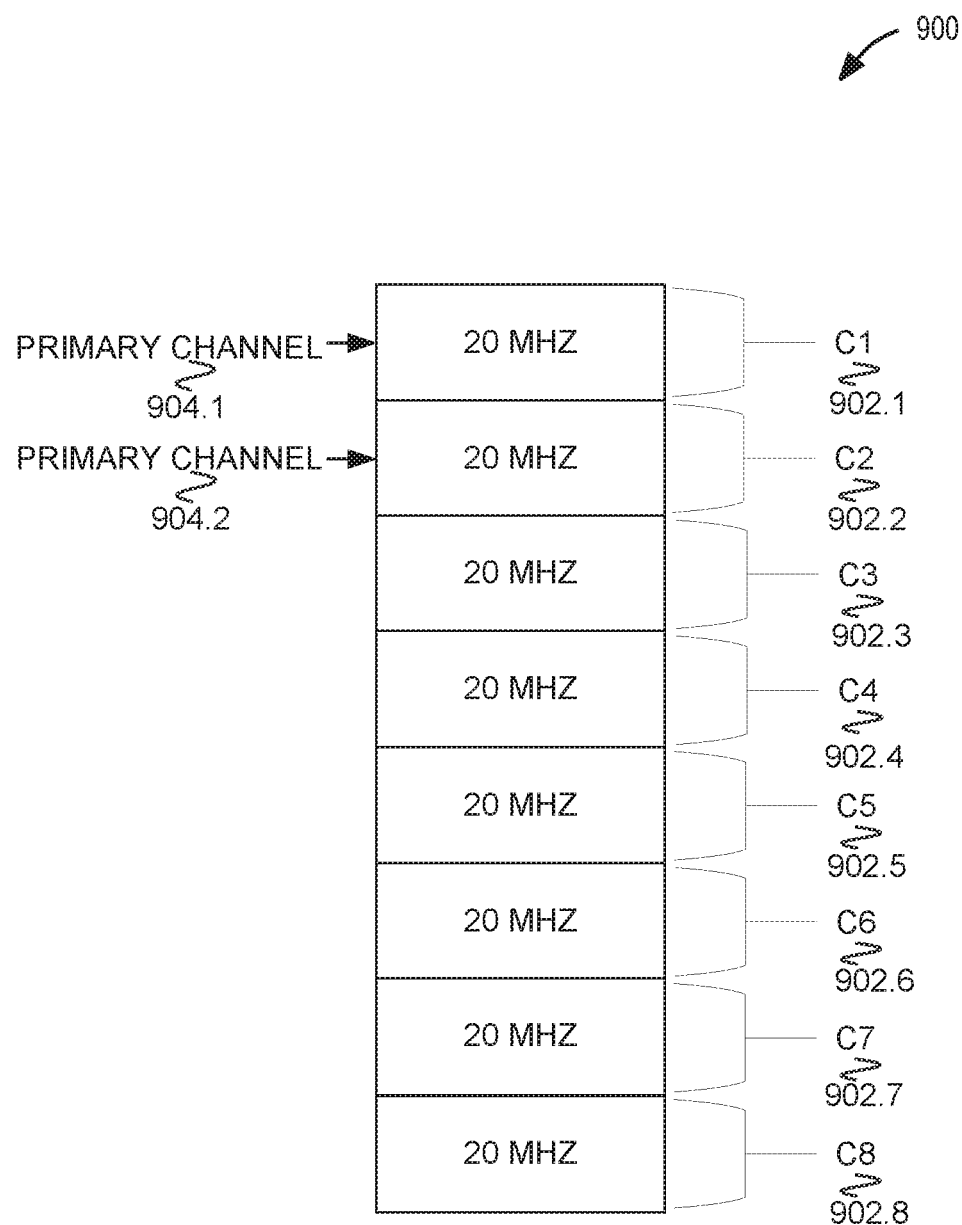
FIG. 9 illustrates a bandwidth in accordance with some embodiments.

FIG. 9 illustrates a bandwidth 900 in accordance with some embodiments. The bandwidth 900 may be divided in a number of channels C1 902.1 through C8 902.8. The channels 902 may be termed subchannels in accordance with some embodiments. The bandwidth 900 may be 160 MHz, in accordance with some embodiments. In some embodiments the bandwidth 900 may be 20 MHz, 40 MHz, 80 MHz, 160 MHz, 320 MHz, 640 MHz, or another value. A BSS and/or an AP may operate on a primary channel, e.g., AP1 802.1 may operate on primary channel 904.1 and AP2 802.2 may operate on primary channel 904.2. The APs 802 may use different channels 902 as a primary channel. In some embodiments APs 904 may be centrally managed and assigned a primary channel 904. In some embodiments, APs 904 may determine a primary channel 904 based on signal measurements to try to select a primary channel 904 that is less used than others. In some embodiments, a primary channel 904 may be 20 MHz, 40 MHz, 80 MHz, 160 MHz, 320 MHz, 640 MHz, or another bandwidth, in accordance with some embodiments.

Figure 10:
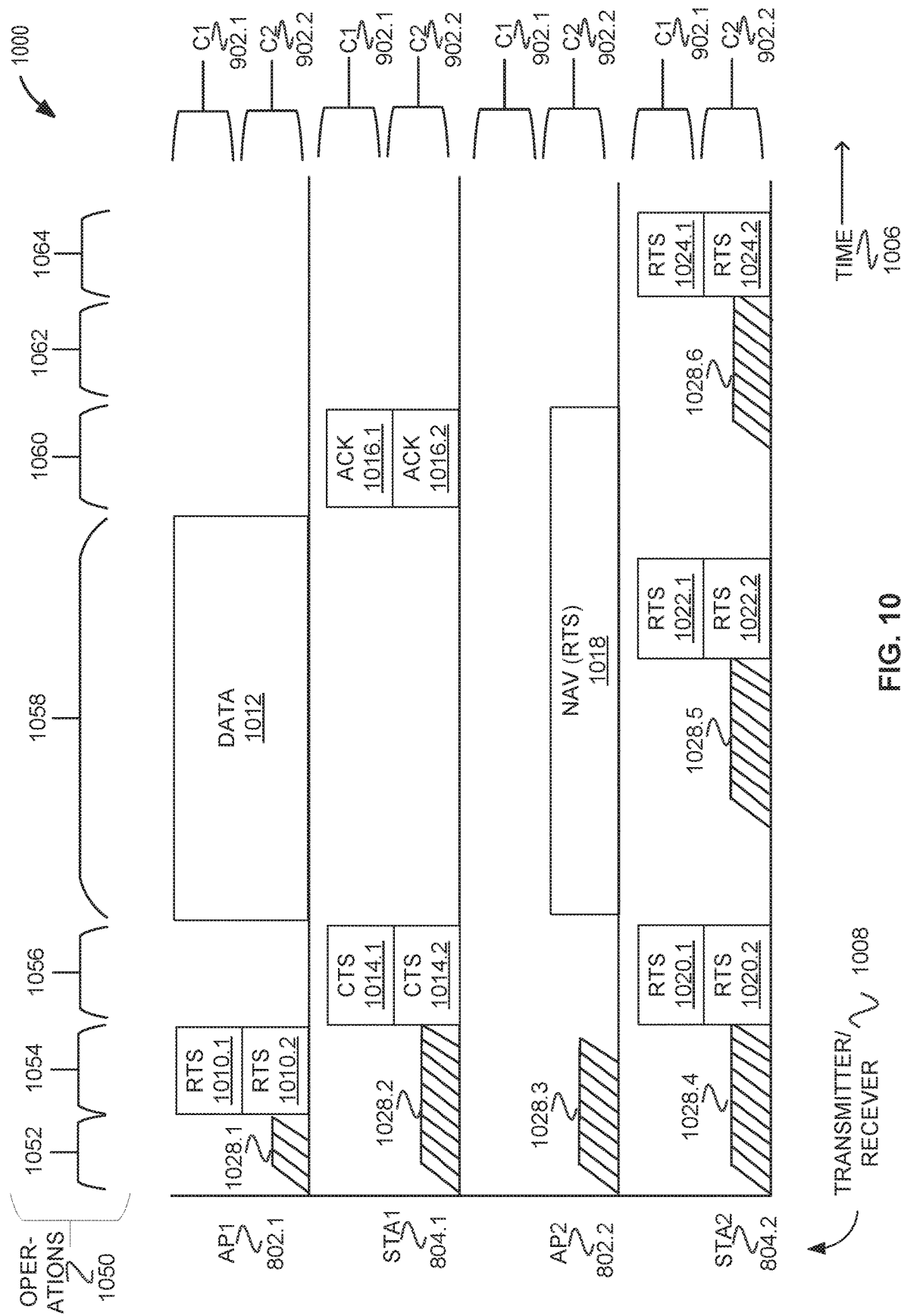
FIG. 10 illustrates a method using request-to-send (RTS) and clear-to-send (CTS) in accordance with some embodiments.

FIG. 10 illustrates a method using request-to-send (RTS) and clear-to-send (CTS) 1000 in accordance with some embodiments. Illustrated in FIG. 10 are APs 802, STAs 804, time 1006 along a horizontal axis, transmitter/receiver 1008, channels C1 902.1 and C2 902.2, and operations 1050 along the top. C1 902.1 and C2 902.2 may be 20 MHz channels. C1 902.1 may be a primary channel for AP1 802.1 (e.g., primary channel 904.1), and C2 902.2 may be a primary channel for AP2 802.2 (e.g., primary channel 904.2). C2 902.2 may be a secondary 20 MHz channel for AP1 802.1, and C2 902.1 may be a secondary channel for AP2 802.2. In some embodiments, there may be a different number of channels. In some embodiments, the APs 802 may use different primary channels 904 and/or the primary channels 904 may be a different bandwidth. APs 802 may be APs 802 as disclosed in conjunction with FIG. 8. STAs 804 may be STAs 804 as disclosed in conjunction with FIG. 8. APs 802 and STAs 804 may be APs 802 and STAs 804 as disclosed in conjunction with FIG. 8.

The method 1000 begins at operation 1052 with AP1 802.1 contending 1028.1 for channels (e.g., C1 902.1 and/or C2 902.2). Other devices may contend 1028 for the channels concurrently with AP1 802.1. AP1 802.1 may have data packets waiting to be sent to STA1 804.1. AP2 802.2 may have data packets waiting to be sent to STA2 804.2. AP1 802.1 may gain access to C1 902.1 and C2 902.2, which may be a 40 MHz channel (20 MHz+20 MHz).

The method 1000 may continue at operation 1054 with AP1 802.1 transmitting RTS 1010.1 on C1 902.1 and RTS 1010.2 on C2 902.2. The RTSs 1010 may be PPDUs 1400 that include a RTS frame 1100. The STA1 804.1 may receive the RTSs 1010. AP2 802.2 may receive the RTSs 1010. STA2 804.2 may not receive the RTSs 1010, e.g., see FIG. 8 where STA2 804.2 is not within the transmission range 806 of AP1 802.1. The RTSs 1010 may be duplicative RTSs.

The method 1000 may continue at operation 1056 with STA 1 804.1 transmitting CTSs 1014. The CTSs 1014 may be PPDUs 1400 that include CTS frame (e.g., CTS 1300 of FIG. 13). The duration of 1306 of the CTS frame 1014 may be set based on the duration (e.g., duration 1106 of FIG. 11) of the RTS frames 1010.

AP2 802.2 may set a NAV 1018 based on a duration included in the CTSs 1014 and/or RTSs 1010. The NAV 1018 may be set to a duration to extend to the end of the ACKs 1016.

STA2 804.2 may contend 1028.4 for channels (e.g., C1 902.1 and/or C2 902.2). STA2 804.2 may gain access to C1 902.1 and C2 902.2 since STA2 804.2 is outside the transmission range 806.1 of AP1 802.1 and outside the transmission range (not illustrated) of STA1 804.1 (e.g., see FIG. 8). AP2 802.2 may not be able to decode the RTSs 1020 due to interference from the CTSs 1014. In some embodiments, the RTSs 1020 are not transmitted simultaneously with the CTSs 1014. STA2 804.2 may have data that it wants to transmit to AP2 802.2. STA2 804.2 may transmit the RTSs 1020 to AP2 802.2 to solicit an uplink (UL) resource allocation to transmit the data to AP2 802.2. In some embodiments, STA2 804.2 may want a different service (other than UL resource allocation) from AP2 802.2.

The method 1000 continues at operation 1058 with AP1 802.1 transmitting data 1012 to STA1 804.1. The data 1012 may be a PPDU (e.g., PPDU 1400 of FIG. 14) with data in the MAC (e.g., MAC 1406). The NAV (RTS) 1018 is set for AP2 802.2 during operation 1058. STA2 804.2 may continue to attempt to transmit RTSs to AP2 802.2. For example, the STA2 804.2 may contend 1028.5 for the channels C1 902.1 and C2 902.2. STA2 804.2 may transmit RTSs 1022, which may be similar to or the same as RTSs 1020. AP2 802.2 will ignore the RTSs 1022 because the NAV (RTS) 1018 is set, in accordance with some embodiments. The transmission of the RTSs 1022 may be unnecessary and may waste energy of STA2 804.2 and/or AP2 802.2.

The method 1000 may continue with operation 1060 with STA 804.1 transmitting ACKs 1016 to AP1 802.1 to acknowledge the receipt of data 1012. The ACKs 1016 may be PPDUs (e.g., PPDUs 1400) with acknowledgement frames (not illustrated) as part of MAC (e.g., MAC 1406).

The method 1000 may continue at operation 1062 with STA2 804.2 contending 1028.6 for C1 902.1 and C2 902.2. STA2 804.2 may gain access to C1 902.1 and C2 902.2.

The method 1000 may continue at operation 1064 with STA2 804.2 transmitting RTSs 1024. RTSs 1024 may be the same or similar to RTSs 1020. AP2 802.2 may receive the RTSs 1024. AP2 802.2 may response with CTSs (not illustrated) or another PPDU (e.g., PPDU 1400) to respond to the RTSs 1024 from STA2 804.2.

In some embodiments, STA2 804.2 may use energy to transmit the RTSs 1020 and 1022 when AP2 802.2 cannot respond due its NAV being set or because of interference from other transmissions. The transmission of the RTSs 1020 when the NAV of AP2 802.2 is set may use more energy than is necessary for STA 804.2 to transmit RTSs 1020 to AP2 802.2.

In some embodiments, the method 1000 may be performed by an apparatus of a HE (or EHT) AP 802 or 502, a HE (or EHT) AP 802, 502, an apparatus of a HE (or EHT) STA 804, 504, and/or a HE (or EHT) STA. In some embodiments, one or more of the operations 1050 of method 1000 may not be performed. In some embodiments, method 1000 may include one or more additional operations 1050. In some embodiments, the order of the operations 1050 of method 1000 may be different.

Figure 11:
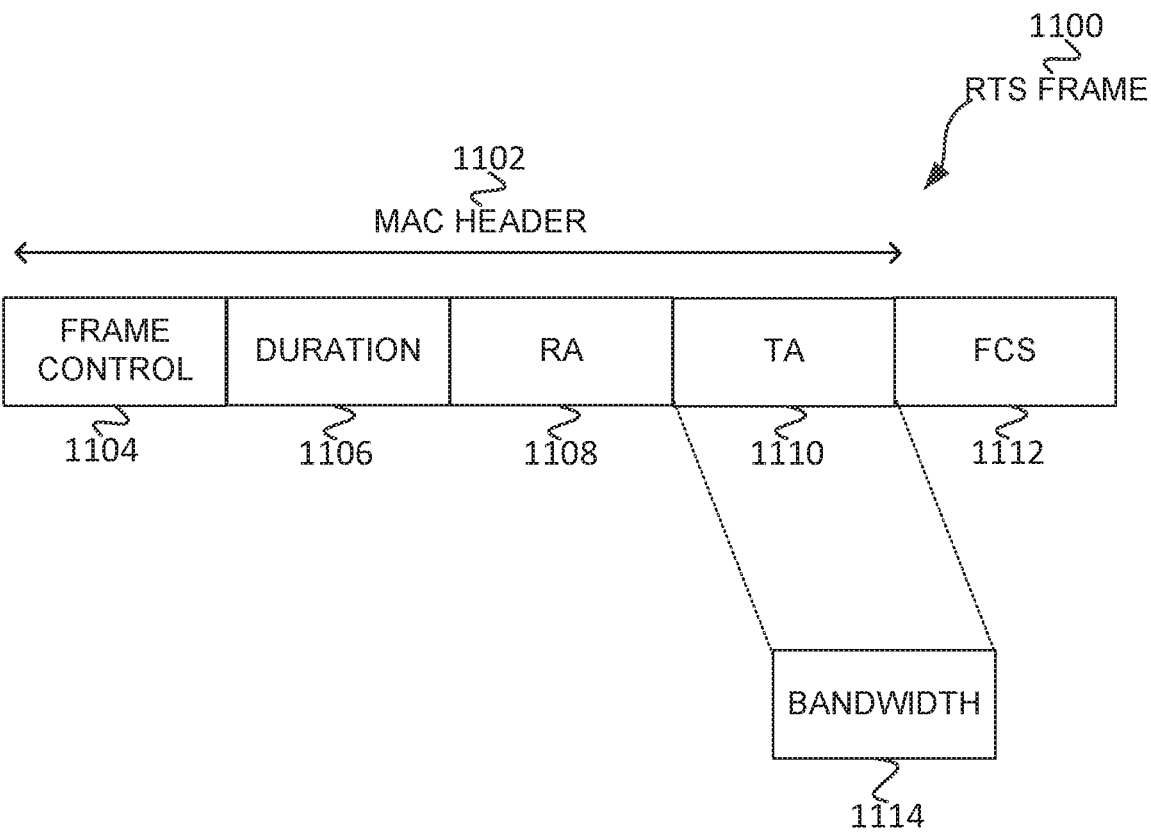
FIG. 11 illustrates a RTS frame in accordance with some embodiments.

FIG. 11 illustrates a RTS frame 1100 in accordance with some embodiments. The RTS frame 1100 may include a media access control (MAC) header 1102 and a FCS 1112 field. The MAC header 1102 may include a frame control 1104, a duration 1106, a receiver address (RA) 1108, and a transmitter address (TA) 1110. The frame control 1104 may include information about the RTS frame 1100 such as the type of the frame. The duration 1106 may be a remaining duration of a transmission opportunity. The RA 1108 field may have an intended receiver address, which may be a group address. The TA 1110 field may have a transmitter address of the RTS frame 1100. In some embodiments, the TA 1110 may include a signaling bit that is not part of the MAC address of the transmitting station/access point, e.g., group/multicast bit. In some embodiments, when the group/multicast bit is set the TA 1110 may be termed a bandwidth signaling TA 1110. The bandwidth signaling TA 1110 may indicate a bandwidth 1114 that the RTS frame 1100 is transmitted on, e.g., it may indicate that the RTS frame 1100 is transmitted on a 20 MHz channel (e.g., C1 902.1 through C8 902.8), a 40 MHz channel (e.g., duplicated RTS frames 1100 on each 20 MHz channel), a 80, 80+80, 160, 160+160, 320, 320+320, or 640 MHz channel (e.g., duplicated RTS frames 1100 on each 20 MHz channel), etc. For example, the TA 1110 may be a bandwidth signaling TA 1110 that indicates 40 MHz with the RTS frame 1100 be a duplicative RTS frame transmitted on each 20 MHz channel.

The FCS 1112 may include information for detecting and correcting errors in the RTS frame 1100. The RTS frame 1100 includes a physical (PHY) header (not illustrated). The AP 802, EHT AP 502, STA 804, and/or EHT station 504 may be configured to encode and decode one or more of the frames disclosed herein (e.g., the RTS frame 1100.)

Figure 12:
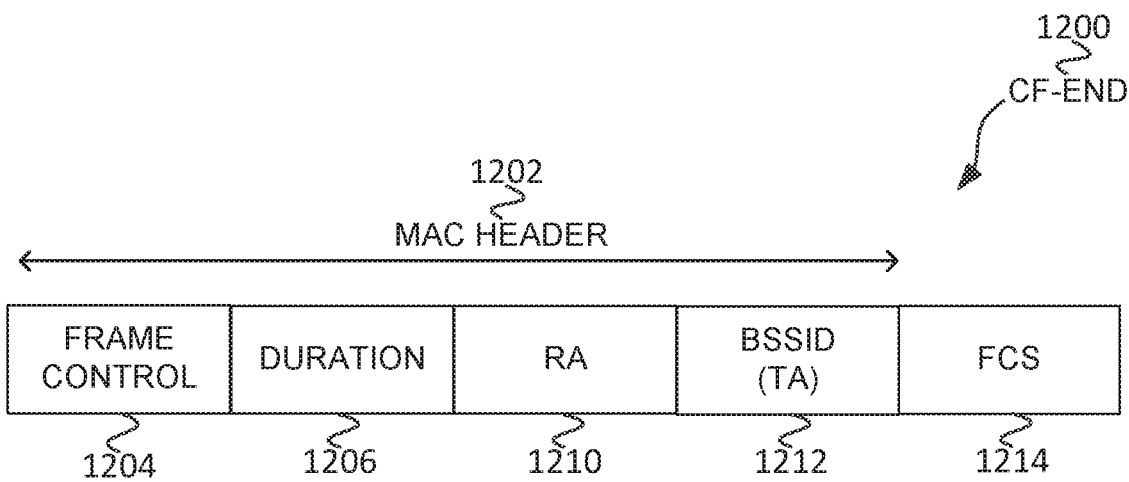
FIG. 12 illustrates a contention-free (CF) end (CF-end) frame in accordance with some embodiments.

FIG. 12 illustrates a contention-free (CF) end (CF-end) frame 1200 in accordance with some embodiments. The CF-end frame 1200 may include a MAC header 1202 and a FCS 1214 field. The MAC header 1202 may include a frame control 1204, a duration 1206, a RA 1210, and a BSSID (TA) 1212. The frame control 1204 may include information about the CF-End 1200 such as the type of the frame. The duration 1206 may be set to 0 to indicate that a contention free period or transmission opportunity is over. The RA 1208 field may have an intended receiver address, which may be a group address, an address of a single receiver, or a broadcast address.

Figure 14:
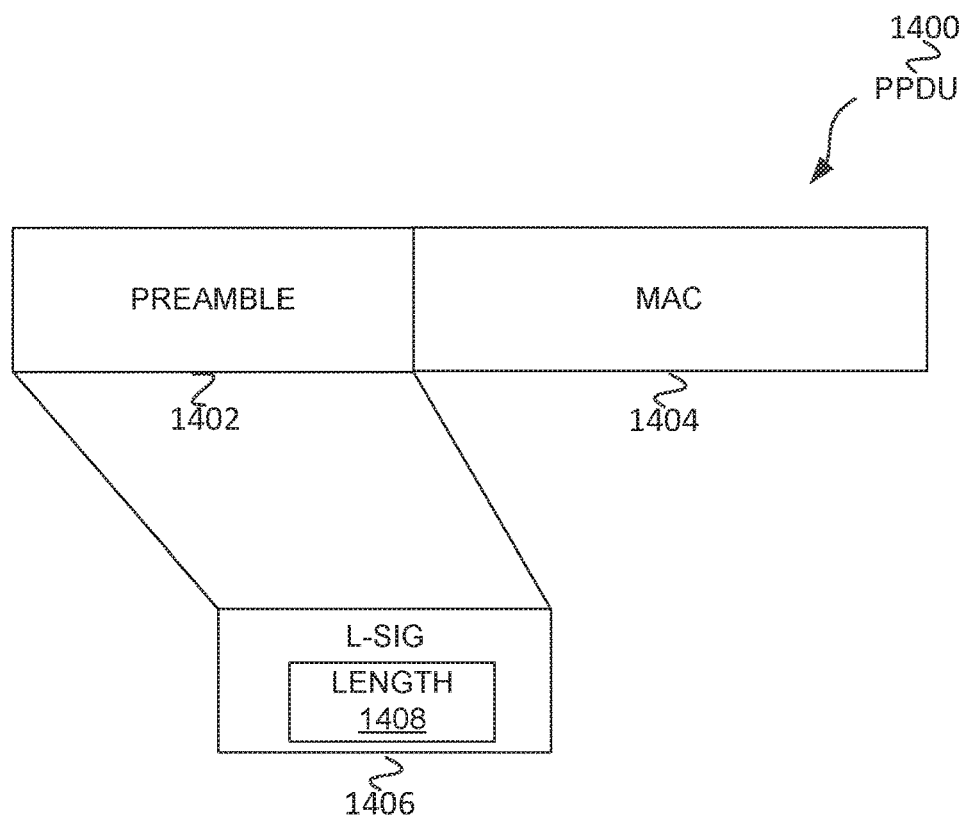
FIG. 14 illustrates a physical Layer Convergence Procedure (PLCP) Protocol Data Unit (PPDU) in accordance with some embodiments.

The FCS 1214 may include information for detecting and correcting errors in the CF-End frame 1200. The CF-end frame 1200 may be included in the MAC 1404 of PPDU 1400 (FIG. 14). The AP 802, EVT AP 502, STA 804, and/or EVT STA 504 may be configured to encode and decode the CF-End frame 1200.

Figure 13:
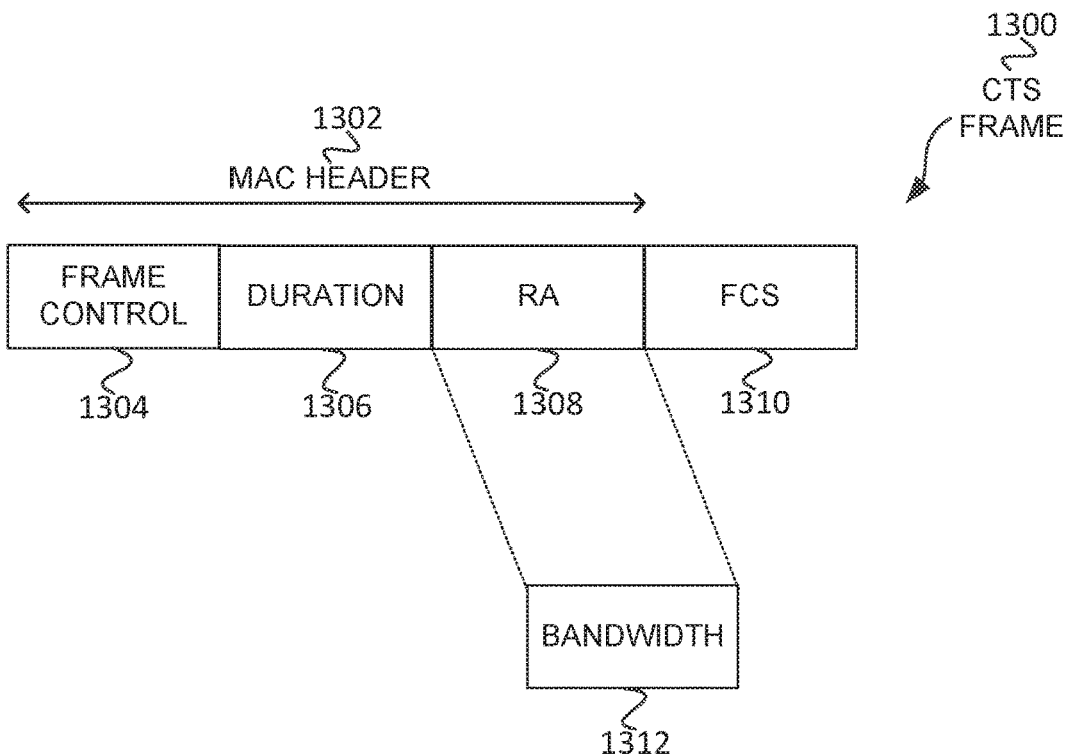
FIG. 13 illustrates a CTS frame in accordance with some embodiments.

FIG. 13 illustrates a CTS frame 1300 in accordance with some embodiments. The CTS frame 1300 may include a MAC header 1302 and a FCS 1310 field. The MAC header 1302 may include a frame control 1304, a duration 1306, and a RA 1308. The frame control 1304 may include information about the CTS frame 1300 such as the type of the frame. The duration 1306 may indicate a remaining duration of a transmission opportunity. The RA 1308 field may have an intended receiver address. The RA 1308 may include a bandwidth 1312. For example, the bandwidth 1312 may be indicated by a CH_BANDWIDTH that is encoded with a RA and indicates a bandwidth used to transmit a frame, e.g., 20 MHz, 40 MHz, 80 MHz, etc. The CH_BANDWIDTH may indicate that 20 MHz frames are transmitted or duplicated on each 20 MHz channel indicated by the CH_BANDWIDTH. The CH_BANDWIDTH may be encoded in one of the fields of the CTS frame 1300, e.g., RA field 1308.

The FCS 1310 may include information for detecting and correcting errors in the CTS frame 1300. The CTS frame 1300 may be included in the MAC 1406 of a PPDU 1400. The AP 802, EVT AP 502, STA 804, and/or EVT STA 504 may be configured to encode and decode the CTS frame 1300.

FIG. 14 illustrates a physical Layer Convergence Procedure (PLCP) Protocol Data Unit (PPDU) 1400 in accordance with some embodiments. The PPDU 1400 may include a preamble portion 1402 and MAC portion 1404. The preamble 1402 may include a legacy signal (L-SIG) field 1406. The preamble 1402 may include other fields such as a short training field, long-training field, a legacy portion, a HE portion, EHT portion, etc. The L-SIG field 1406 may be part of a legacy portion of the PPDU 1400. The PPDU 1400 may be a non-high throughput (NHT) PPDU, a high-throughput (HT) PPDU, a very-high throughput (VHT) PPDU, a HE PPDU, a EHT PPDU, or another type of PPDU, in accordance with some embodiments. The PPDU 1400 may include additional fields. The MAC 1404 may be configured to include one or more frames, e.g., RTS frame 1100, CF-End 1200, and/or CTS frame 1300.

Figure 15:
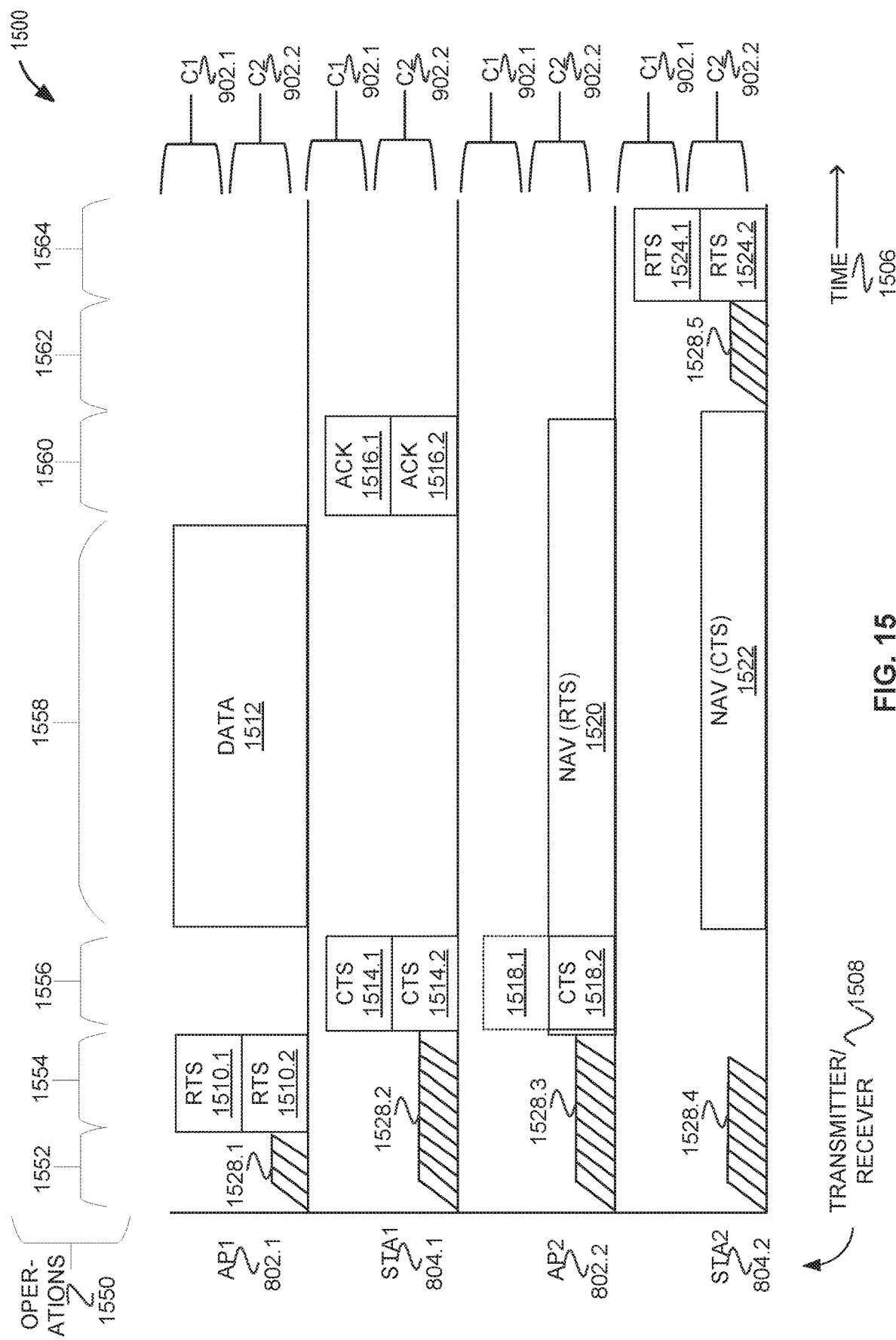
FIG. 15 illustrates a method of power reduction in a wireless network in accordance with some embodiments.

FIG. 15 illustrates a method 1500 of power reduction in a wireless network in accordance with some embodiments. Illustrated in FIG. 15 are APs 802, STAs 804, time 1506 along a horizontal axis, transmitter/receiver 1508, channels C1 902.1 and C2 902.2, and operations 1550 along the top. C1 902.1 and C2 902.2 may be 20 MHz channels. C1 902.1 may be a primary channel for AP1 802.1 (e.g., primary channel 904.1) and C2 902.2 may be a primary channel for AP2 802.2 (e.g., primary channel 904.2). C2 902.2 may be a secondary 20 MHz channel for AP1 802.1 and C2 902.1 may be a secondary channel for AP2 802.2. In some embodiments, there may be a different number of channels 902 and/or the channel 902 bandwidths may be different. APs 802 may be APs 802 as disclosed in conjunction with FIG. 8. STAs 804 may be STAs 804 as disclosed in conjunction with FIG. 8.

The method 1500 begins at operation 1552 with AP1 802.1 contending 1528.1 for channels (e.g., C1 902.1 and/or C2 902.2). Other devices may contend 1528 for the channels concurrently with AP 1 802, e.g., STA1 804.1 contending 1528.2, AP2 802.2 contending 1528.3, and STA2 804.2 contending 1528.4. AP1 802.1 may have data packets waiting to be sent to STA1 804.1. AP2 802.2 may have data packets waiting to be sent to STA2 804.2. AP1 802.1 may gain access to C1 902.1 and C2 902.2, which may be a 40 MHz channel (20 MHz plus 20 MHz).

The method 1500 continues at operation 1554 with AP1 802.1 transmitting RTSs 1510. The RTSs 1510 may be duplicative RTSs that are each transmitted on a 20 MHz channel (C1 902.1 and C2 902.2). The RTSs 1510 may indicate a total bandwidth of 40 MHz for the RTSs 1510, e.g., in a CH_BANDWIDTH (e.g., bandwidth 1114). The RTSs 1510 may be received by STA1 804.1 and AP2 802.2. RTSs 1510 may not be received by STA2 804.2 as STA2 804.2 may be outside the transmission range 806.1 of AP1 802.1. The RTSs 1510 may be the same or similar as RTS frames 1100.

The method 1500 may continue at operation 1556 with STA1 804.1 transmitting CTSs 1514. The CTSs 1514 may include an indication of a bandwidth (e.g., bandwidth 1312) the CTSs 1514 are transmitted on, e.g., in this case 40 MHz, which may indicate the primary 20 MHz channel C1 902.1 for AP1 802.1 and the secondary 20 MHz channel C2 902.2 for AP1 802.1. CTS 1514.1 may be transmitted on C1 902.1 and CTS 1514.2 may be transmitted on C2 902.2. The CTSs 1514 may be the same or similar to CTS frames 1300.

Operation 1556 may include AP2 802.2 setting its NAV 1520 to the duration in the RTSs 1510, e.g., duration field 1106, which may be a duration to the then end of the transmission of ACKs 1516. Operation 1556 may include AP2 802.2 transmitting CTS 1518.2 to self where the RA field 1308 is set to a MAC address of AP2 802.2. The CTS 1518.2 may be transmitted on C2 902.2 which may be the primary channel of AP2 802.2. In some embodiments, AP2 802.2 does not transmit 1518.1 on C1 902.1.

Operation 1556 may include AP1 802.1 receiving CTS 1514.1. The CH_BANDWIDTH may indicate a bandwidth the CTSs 1514 were transmitted (one per 20 MHz). AP1 802.1 may not be able to receive CTS 1514.2 from STA1 804.1 because it may be interfered with by CTS 1518.2 transmitted from AP2 802.2. AP1 802.1 may determine that CTSs 1514 were transmitted on both C1 902.1 and C2 902.2 by STA1 804.1 based on the bandwidth, e.g., bandwidth 1312. In some embodiments, the CTSs 1514 are a different kind of frame, e.g., with a broadcast address as the RA.

Operation 1556 may include STA2 804.2 not transmitting a PPDU or STA2 804.2 may attempt to transmit a RTS (not illustrated) to the AP2 802.2, in accordance with some embodiments. STA2 804.2 would not or likely would not receive RTSs 1510, e.g., see FIG. 8.

The method 1500 may continue at operation 1558 with AP1 802.1 transmitting data 1512 to STA1 804.1 on both C1 902.1 and C2 902.2. STA1 804.1 may receive the data 1512 over C1 902.1 and C2 902.2.

Operation 1558 may include AP2 802.2 having the NAV 1520 set and AP2 802.2 operating under spatial reuse, e.g., AP2 802.2 may still transmit PPDUs (not illustrated) if the PPDU adhere to spatial reuse rules and/or methods. AP2 802.2 may transmit a CF-end frame (e.g., 1200) to associated STAs (e.g., STA2 804.2) if data 1512 is not detected on the primary channel of AP2 802.2, e.g., C2 902.2, SIFS time after the end of the CTS 1518.2 to self.

Operation 1558 may include STA2 804.2 setting its NAV 1522 for a duration that extends to the end of the ACKs 1516. In some embodiments, STA2 804.2 may set a NAV, e.g., a basic NAV or intra NAV based on the duration indicated in the CTS 1518.2 to self. STA2 804.2 may reset its NAV if STA2 804.2 transmits a CF-end frame (e.g., 1200). The NAV of STA2 804.2 being set may prevent STA2 804.2 from transmitting RTSs 1020, 1022 (FIG. 10) and may enable STA2 804.2 and/or AP2 802.2 to use less energy.

Operation 1558 may include other STAs (not illustrated) that receive the CTS 1518.2 to self set their NAV to a duration to extend to the end of the ACKs 1516. The other STAs setting their NAV may result in the other STAs suspending channel contention until their NAVs expire, e.g., end of ACKs 1516, or the reception of a CF-end frame (e.g., 1200). The other STAs may not be associated with AP2 802.2. The other STAs may not be associated with AP1 802.1. The other STAs may be legacy devices 506 or HE STAs.

The method 1500 may continue at operation 1506 with STA1 804.1 transmitting ACKs 1516 to acknowledge the receipt of the data 1512. The method 1500 may continue at operation 1562 with STA2 804.2 contending 1528.1 for channels (e.g., C1 902.1 and/or C2 902.2). STA2 804.2 may gain access to C1 902.1 and C2 902.2.

The method 1500 continues at operation 1564 with STA2 804.2 transmitting RTSs 1524 on C1 902.1 and C2 902.2. STA2 804.2 may consume less power in comparison to the operation of STA2 804.2 in FIG. 10 due to the transmission of the CTS 1518.2 to self by AP2 802.2. In some embodiments, STA2 804.2 does not transmit RTSs 1524. In some embodiments, AP2 802.2 or another wireless device may contend for channels 902 and gain access. In some embodiments, AP2 802.2 may transmit a trigger frame (not illustrated) or another frame to STA2 804.2 (e.g., AP2 802.2 may gain access before STA2 804.2.)

In some embodiments, the method 1500 may be performed by an apparatus of an AP 802, an apparatus of an EHT AP 502, an EHT AP 502, an apparatus of a EHT STA 504, an apparatus of a STA 804, a STA 804, and/or a EHT STA. In some embodiments, one or more of the operations 1550 of method 1500 may not be performed. In some embodiments, method 1500 may include one or more additional operations 1550. In some embodiments, the order of the operations 1550 of method 1500 may be different.

The time between the operations 1550 may be short interframe space (SIFs), in accordance with some embodiments. The illustration of channels C1 902.1 and C2 902.2 is an example in accordance with some embodiments. In some embodiments, the channels may be arranged differently, e.g., as described in conjunction with FIG. 9.

Figure 16:
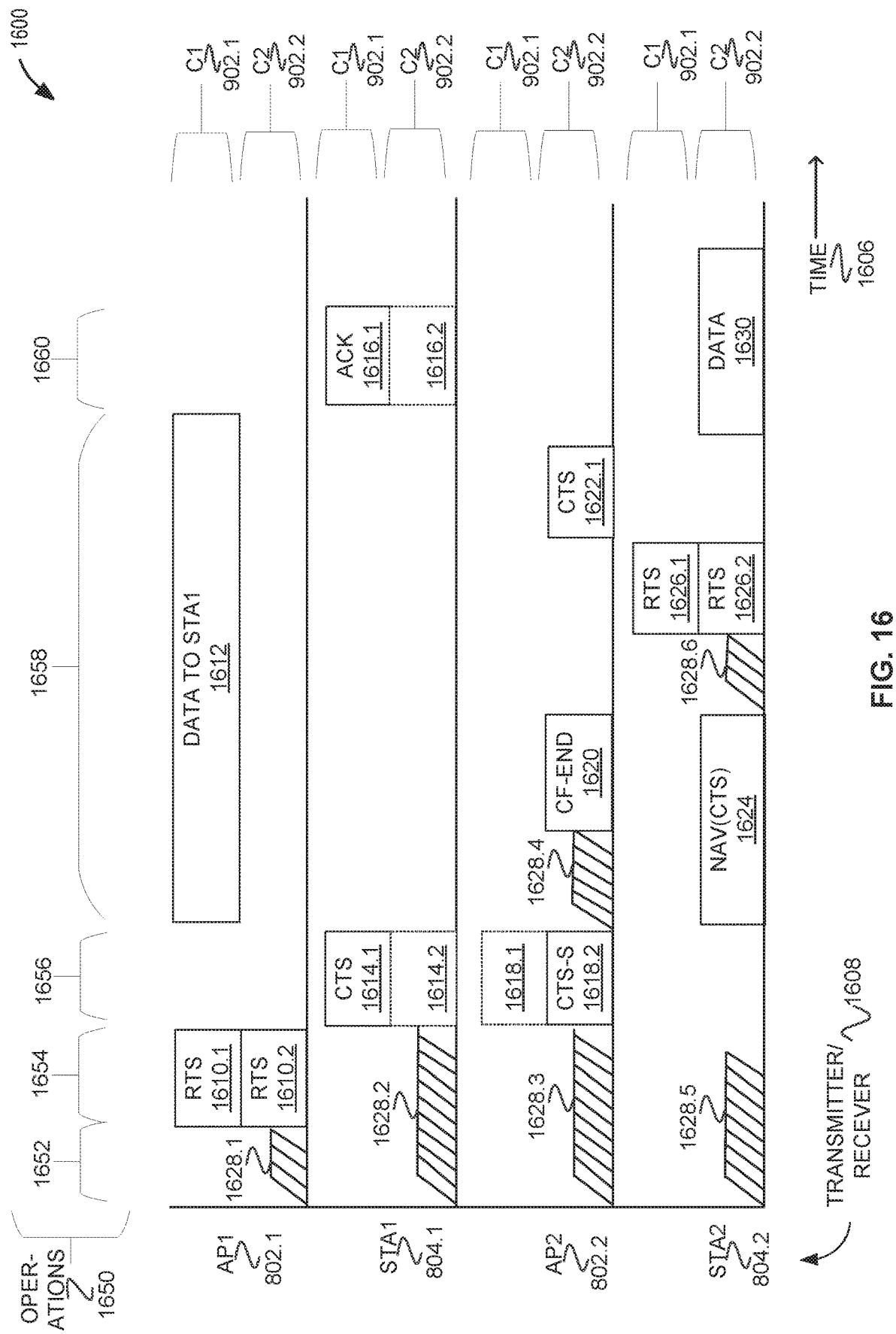
FIG. 16 illustrates a method of power reduction in a wireless network in accordance with some embodiments.

FIG. 16 illustrates a method 1600 of power reduction in a wireless network in accordance with some embodiments. Illustrated in FIG. 16 are APs 802, STAs 804, time 1606 along a horizontal axis, transmitter/receiver 1608, channels C1 902.1 and C2 902.2, and operations 1650 along the top. C1 902.1 and C2 902.2 may be 20 MHz channels. C1 902.1 may be a primary channel for AP1 802.1 (e.g., primary channel 904.1) and C2 902.2 may be a primary channel for AP2 802.2 (e.g., primary channel 904.2). C2 902.2 may be a secondary 20 MHz channel for AP1 802.1 and C2 902.1 may be a secondary channel for AP2 802.2. In some embodiments, there may be a different number of channels or the bandwidth of the channels may be different, e.g., as disclosed in conjunction with FIG. 9. APs 802 may be APs 802 as disclosed in conjunction with FIG. 8. STAs 804 may be STAs 804 as disclosed in conjunction with FIG. 8.

The method 1600 begins at operation 1652 with AP1 802.1 contending 1628.1 for channels (e.g., C1 902.1 and/or C2 902.2). Other devices may contend 1628 for the channels concurrently with AP 1 802, e.g., STA1 804.1 contending 1628.2, AP2 802.2 contending 1628.3, and STA2 804.2 contending 1628.5. AP1 802.1 may have data packets waiting to be sent to STA1 804.1. AP2 802.2 may have data packets waiting to be sent to STA2 804.2. AP1 802.1 may gain access to C1 902.1 and C2 902.2, which may be a 40 MHz channel.

The method 1600 continues at operation 1654 with AP1 802.1 transmitting RTSs 1610. The RTSs 1610 may be duplicative RTSs that are each transmitted on a 20 MHz channel (C1 902.1 and C2 902.2). The RTSs 1610 may indicate a total bandwidth of 40 MHz for the RTSs 1610, e.g., in a CH_BANDWIDTH (e.g., bandwidth 1114). The RTSs 1610 may be received by STA1 804.1 and AP2 802.2. RTSs 1610 may not be received by STA2 804.2 as STA2 804.2 may be outside the transmission range 806.1 of AP1 802.1 (see FIG. 8).

The method 1600 may continue at operation 1656 STA1 804.1 transmitting CTS 1614.1. The CTS 1614.1 may include an indication of a bandwidth (e.g., bandwidth 1312) the CTS 1614.1 is transmitted on, e.g., in this case 20 MHz, which may be the primary 20 MHz channel C1 902.1 for AP1 802.1. At 1614.2, STA1 803.1 does not transmit a CTS on the secondary 20 MHz channel C2 902.2 for AP1 802.1. STA1 804.1 may determine that C2 902.2 is not clear so it cannot transmit a CTS on C2 902.2.

Operation 1656 may include AP2 802.2 setting its NAV (not illustrated) to the duration in the RTSs 1610, e.g., duration field 1106, which may be a duration to the then end of the transmission of ACK 1616. Operation 1656 may include AP2 802.2 transmitting CTS 1618.2 to self where the RA field 1308 is set to a MAC address of AP2 802.2. The CTS 1618.2 may be transmitted on C2 902.2 which may be the primary channel of AP2 802.2. In some embodiments, AP2 802.2 does not transmit 1618.1 on C1 902.1. Operation 1656 may include where AP2 802.2 cannot decode other transmissions on C2 902.2 because AP2 802.2 is transmitting on C2 902.2. If STA1 804.1 had transmitted a CTS on C2 902.2 (e.g., as illustrated in FIG. 15 at 1614.2), then AP2 802.2 would not have been able to decode the CTS from STA1 804.1.

Operation 1656 may include AP1 802.1 receiving CTS 1614.1. The CH_BANDWIDTH may indicate a bandwidth of 20 MHz. AP1 802.1 may determine from this that a CTS was not transmitted by STA1 804.1 on C2 902.2.

Operation 1656 may include STA2 804.2 not transmitting a PPDU or STA2 804.2 may attempt to transmit a RTS (not illustrated) to the AP2 802.2, in accordance with some embodiments. STA2 804.2 would be interrupted by the CTS-S 1618.2 transmitted by AP2 802.2.

The method 1600 may continue at operation 1658 with AP1 802.1 transmitting data 1612 to STA1 804.1 on C1 902.1. STA1 804.1 may receive the data 1612 over C1 902.1. AP1 802.1 transmits only on C1 902.1 because the CTS 1614.1 received on C1 902.1 indicated only a 20 MHz bandwidth.

Operation 1658 may include AP2 802.2 having a NAV set (not illustrated) for C1 902.1. AP2 802.2 may reset its NAV in accordance with some embodiments because no data is received on C2 902.2 (e.g., a SIFS after transmitting CTS-S 1618.2). AP2 802.2 may contend 1628.4 for channel C2 902.2. AP2 802.2 may gain access to C2 902.2 and transmit a CF-end 1620, e.g., 1200, to its associated STAs including STA2 804.2.

Operation 1658 may include STA2 804.2 setting its NAV 1624 for a duration that extends to the end of the ACKs 1616. As illustrated NAV (CTS) 1624 is truncated. In some embodiments, STA2 804.2 may set a NAV, e.g., a basic NAV or intra NAV based on the duration indicated in the CTS 1618.2 to self. STA2 804.2 may reset after decoding CF-end 1620.

Operation 1658 may include other STAs (not illustrated) that receive the CTS-S 1618.2 setting their NAV to a duration to extend to the end of the ACKs 1616. The other STAs setting their NAV may result in the other STAs suspending channel contention until their NAVs expire, e.g., end of ACKs 1616, or the reception of the CF-end frame 1620. The other STAs may not be associated with AP2 802.2. The other STAs may not be associated with AP1 802.1. The other STAs may be legacy devices 506 or EHT STAs 504.

Operation 1658 may include STA2 804.2 contending 1628.6 for C1 902.1 and C2 902.2. STA2 804.2 may gain access to both C1 902.1 and C2 902.2 since it is out of the transmission range 806.1 of AP1 802.1 (see FIG. 8), in accordance with some embodiments. STA2 804.2 may have a service it wants from AP2 802.2, e.g., it may have UL data to send to AP2 802.2. STA2 804.2 may transmit RTSs 1626 on C1 902.1 and C2 902.2.

Operation 1658 may include AP2 802.2 responding to the RTS 1626 by transmitting a CTS 1622.1 on C2 902.2. AP2 802.2 does not transmit on C1 902.1 because of the reception of RTS 1610.1 (and data to STA1 1612).

The method 1600 may continue with operation 1660 with STA1 804.1 transmitting ACK 1616.1 to AP1 802.1 to acknowledge the received data 1612 on C1 902.1. Operation 1658 and/or 1660 may include STA2 804.2 transmitting data 1630 to AP2 802.2. AP2 802.2 may transmit an acknowledgement (not illustrated) of the data 1630 from STA2 804.2 on C2 902.2 to STA2 804.2 after receiving the data 1630. T In some embodiments, the method 1600 may be performed by an apparatus of a EHT AP 502, an apparatus of an AP 802, a EHT AP 502, an AP 802, an apparatus of a EHT STA 504, an apparatus of a STA 804, a STA 804, and/or a EHT STA. In some embodiments, one or more of the operations 1650 of method 1600 may not be performed. In some embodiments, method 1600 may include one or more additional operations 1650. In some embodiments, the order of the operations 1650 of method 1600 may be different. The time between the operations 1650 may be short interframe space (SIFs), in accordance with some embodiments.

Method 1600 may illustrate additional operations of method 1600 in accordance with some embodiments.

Figure 17:
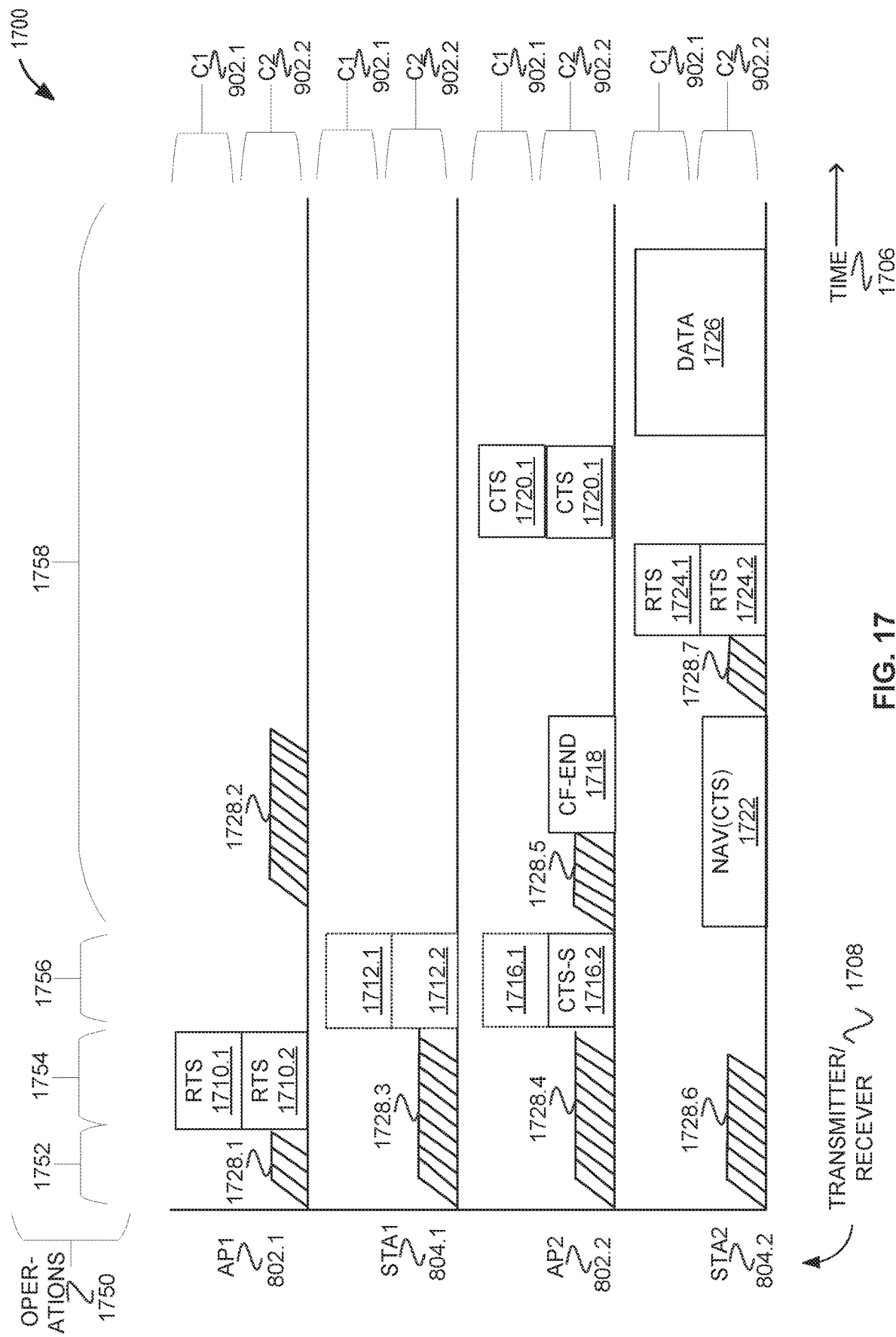
FIG. 17 illustrates a method of power reduction in a wireless network in accordance with some embodiments.

FIG. 17 illustrates a method 1700 of power reduction in a wireless network in accordance with some embodiments. Illustrated in FIG. 17 are APs 802, STAs 804, time 1706 along a horizontal axis, transmitter/receiver 1708, channels C1 902.1 and C2 902.2, and operations 1750 along the top. C1 902.1 and C2 902.2 may be 20 MHz channels. C1 902.1 may be a primary channel for AP1 802.1 (e.g., primary channel 904.1) and C2 902.2 may be a primary channel for AP2 802.2 (e.g., primary channel 904.2). C2 902.2 may be a secondary 20 MHz channel for AP1 802.1 and C2 902.1 may be a secondary channel for AP2 802.2. In some embodiments, there may be a different number of channels and/or the bandwidths of the channels may be different, e.g., as disclosed in conjunction with FIG. 9. APs 802 may be APs 802 as disclosed in conjunction with FIG. 8. STAs 804 may be STAs 804 as disclosed in conjunction with FIG. 8.

The method 1700 begins at operation 1752 with AP1 802.1 contending 1728.1 for channels (e.g., C1 902.1 and/or C2 902.2). Other devices may contend 1728 for the channels concurrently with AP1 802, e.g., STA1 804.1 contending 1728.3, AP2 802.2 contending 1728.4, and STA2 804.2 contending 1728.6. AP1 802.1 may have data packets waiting to be sent to STA1 804.1. AP2 802.2 may have data packets waiting to be sent to STA2 804.2. AP1 802.1 may gain access to C1 902.1 and C2 902.2, which may be a 40 MHz channel.

The method 1700 continues at operation 1754 with AP1 802.1 transmitting RTSs 1710. The RTSs 1710 may be duplicative RTSs that are each transmitted on a 20 MHz channel (C1 902.1 and C2 902.2). The RTSs 1710 may indicate a total bandwidth of 40 MHz for the RTSs 1710, e.g., in a CH_BANDWIDTH (e.g., bandwidth 1114). The RTSs 1710 may be received by STA1 804.1 and AP2 802.2. RTSs 1710 may not be received by STA2 804.2 as STA2 804.2 may be outside the transmission range 806.1 of AP1 802.1 (see FIG. 8).

The method 1700 may continue at operation 1756 with STA1 804.1 not transmitting. STA1 804.1 may detect other activity on C1 902.1 and C2 902.2, e.g., a NAV of STA1 804.1 is set or another transmission is detected. STA1 804.1 may not receive the RTSs 1710.

Operation 1756 may include AP2 802.2 setting its NAV to the duration in the RTSs 1710, e.g., duration field 1106, which may be a duration determined by AP1 802.1 to include a data transmission and an ACK transmission from STA1 804.1 plus interframe durations, e.g., SIFS. Operation 1756 may include AP2 802.2 transmitting CTS-S 1716.2 where the RA field 1308 is set to a MAC address of AP2 802.2. The CTS-S 1716.2 may be transmitted on C2 902.2 which may be the primary channel of AP2 802.2. In some embodiments, AP2 802.2 does not transmit 1716.1 on C1 902.1. Operation 1756 may include where AP2 802.2 cannot decode other transmissions on C2 902.2 because AP2 802.2 is transmitting on C2 902.2. If STA1 804.1 had transmitted a CTS on C2 902.2 (e.g., as illustrated in FIG. 15 at 1514.2), then AP2 802.2 would not have been able to decode the CTS from STA1 804.1.

Operation 1756 may include STA2 804.2 not transmitting a PPDU or STA2 804.2 may attempt to transmit a RTS (not illustrated) to the AP2 802.2, in accordance with some embodiments. STA2 804.2 may be interrupted by the CTS-S 1618.2 transmitted by AP2 802.2.

The method 1700 may continue at operation 1758 with AP1 802.1 not transmitting data (not illustrated) to STA1 804.1. AP1 802.1 may attempt to contend 1728.2 for C1 902.1 and/or C2 902.2. In some embodiments, AP1 802.1 may gain access to channel C1 902.1 and/or C2 902.2 and transmit new RTSs or PPDUs (not illustrated).

Operation 1758 may include AP2 802.2 resetting its NAV in accordance with some embodiments because no data is received on C1 902.1 or C2 902.2 (e.g., a SIFS after transmitting CTS-S 1716.2). AP2 802.2 may contend 1728.5 for channel C2 902.2. AP2 802.2 may gain access to C2 902.2 and transmit a CF-end 1718, e.g., 1200, to its associated STAs including STA2 804.2.

Operation 1758 may include STA2 804.2 setting its NAV 1722 for a duration that extends to the end of when an ACK would have been transmitted by STA1 804.1 (e.g., 1616 of FIG. 16). In some embodiments, STA2 804.2 may set a NAV, e.g., a basic NAV or intra NAV based on the duration indicated in the CTS-S 1716.2. STA2 804.2 may reset its NAV or NAVs after decoding CF-end 1718.

Operation 1758 may include other STAs (not illustrated) that receive the CTS-S 1716.2 setting their NAV to a duration to extend to the end of where STA1 804.1 would have transmitted an ACK (e.g., 1616 of FIG. 16). The other STAs setting their NAV may result in the other STAs suspending channel contention until their NAVs expire, e.g., end of ACK 1616 of FIG. 16, or the reception of the CF-end frame 1718. The other STAs may not be associated with AP2 802.2. The other STAs may not be associated with AP1 802.1. The other STAs may be legacy devices 506 or EHT STAs 504.

Operation 1758 may include STA2 804.2 contending 1728.7 for C1 902.1 and C2 902.2. STA2 804.2 may gain access to both C1 902.1 and C2 902.2. STA2 804.2 may have a service it wants from AP2 802.2, e.g., it may have UL data to send to AP2 802.2. STA2 804.2 may transmit RTSs 1724 on C1 902.1 and C2 902.2.

Operation 1758 may include AP2 802.2 responding to the RTSs 1724 by transmitting CTSs 1720. AP2 802.2 may transmit on C1 902.1 in this case because no data was received on either C1 902.1 or C2 902.1 after the transmission of the CTS-S 1716. Operation 1758 may include STA2 804.2 transmitting data 1728 to AP2 802.2 on both C1 902.1 and C2 902.2. Operation 1758 may include AP2 802.2 transmitting an ACK (not illustrated) for the data 1726. In some embodiments, AP2 802.2 may contend (not illustrated) after the CF-end 1718 and gain access and transmit a PPDU to STA2 804.2.

In some embodiments, the method 1700 may be performed by an apparatus of a EHT AP 502, a EHT AP 502, an apparatus of a AP 802, an AP 802, an apparatus of a EHT STA 504, an apparatus of a STA 804, a STA 804, and/or a EHT STA. In some embodiments, one or more of the operations 1750 of method 1700 may not be performed. In some embodiments, method 1700 may include one or more additional operations 1750. In some embodiments, the order of the operations 1750 of method 1700 may be different. The time between the operations 1750 may be SIFs, in accordance with some embodiments. Method 1700 may illustrate additional operations of methods 1500 and/or 1600 in accordance with some embodiments.

Figure 18:
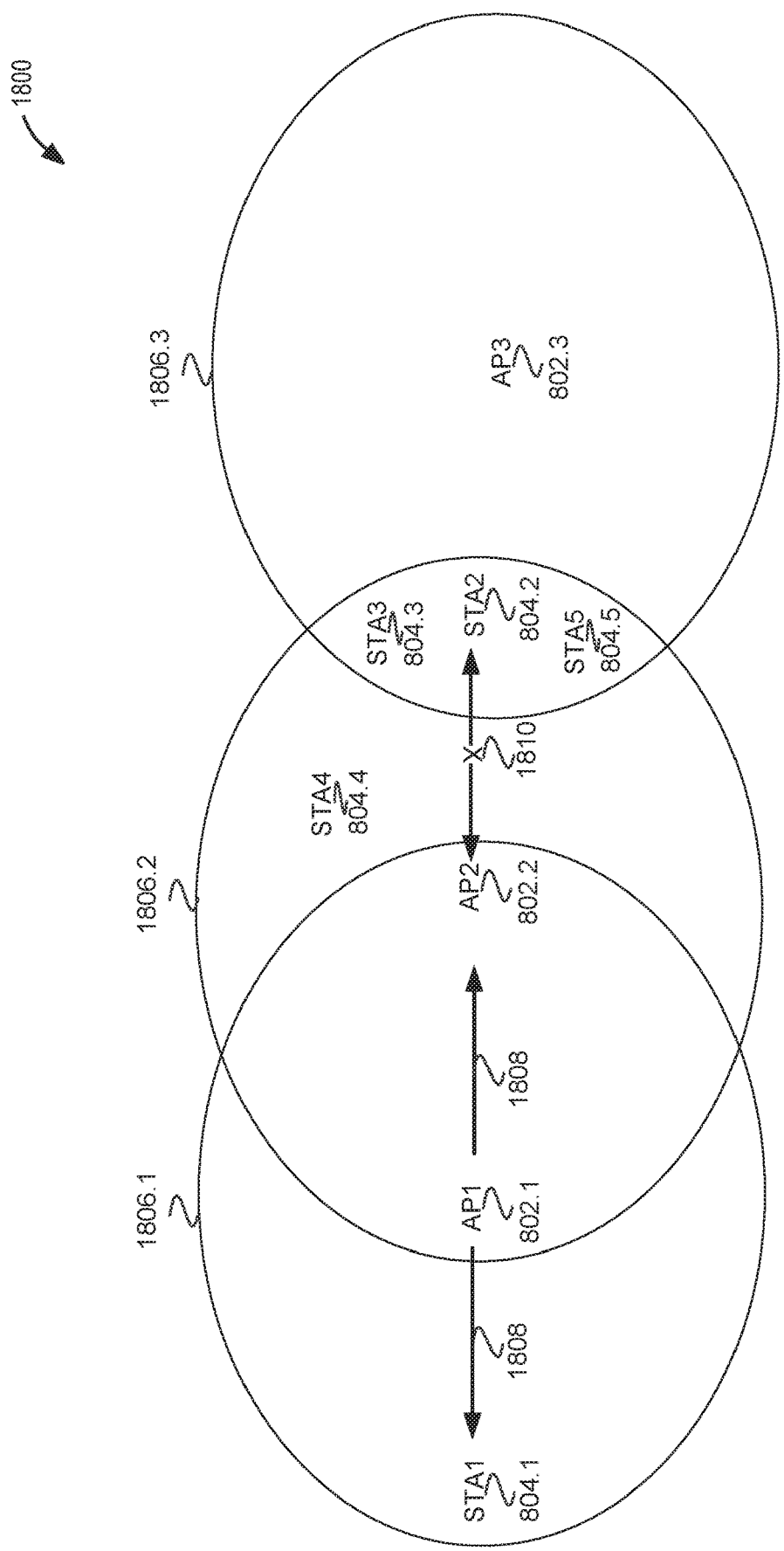
FIG. 18 illustrates OBSS in accordance with some embodiments.
Figure 19:
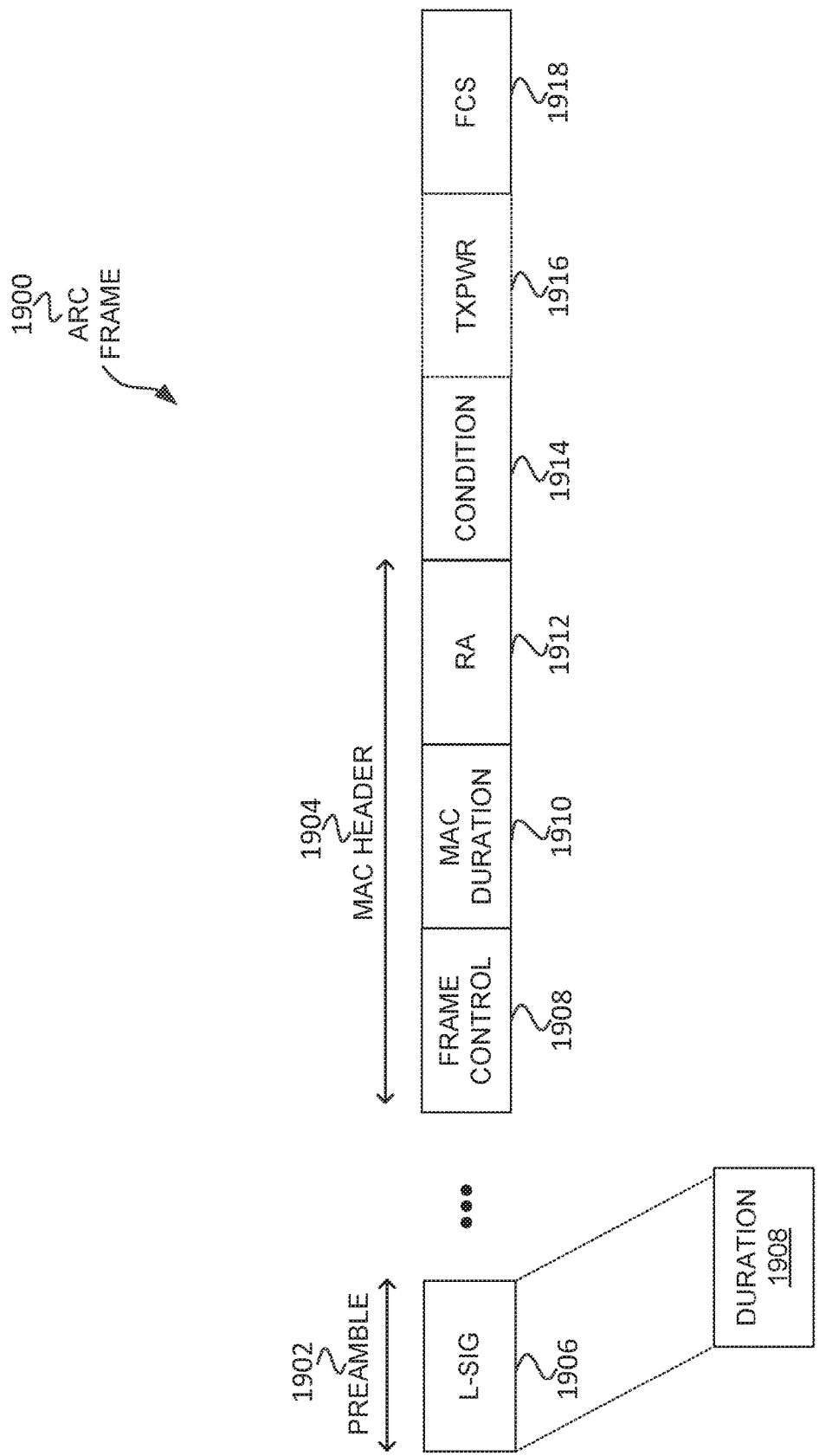
FIG. 19 illustrates an able to receive with condition (ARC) frame 1900 in accordance with some embodiments.

FIG. 18 illustrates OBSS 1800 in accordance with some embodiments. FIGS. 18 and 19 will be disclosed in conjunction with one another. Illustrated in FIG. 18 are APs 802, STAs 804, transmission ranges 1806, transmission 1808, and transmission 1810. Transmission ranges 1806.1, 1806.2, 1806.2 are for AP1 802.1, AP2 802.2, and AP 802.3, respectively. The transmission range 1806 may be a range of the signals of the AP 802 where outside the transmission range 1806 the signal strength may be below a threshold, e.g., below −82 dBm. Each AP 802 is part of a different BSS, in accordance with some embodiments. In some embodiments, the BSSs may include more than one AP 802. The BSSs are OBSSs because the transmission ranges 1806.1 and 1806.2 overlap one another and the transmission ranges of 1806.2 and 1806.3 overlap one another. In some embodiments, the BSSs are OBSSs because the transmission ranges 1806.1 and 1806.2 overlap one another and the transmission ranges of 1806.2 and 1806.3 overlap one another, and AP1 802.1, AP2 802.2, and AP3 802.3 overlap in their usage of a primary channel 904 (e.g., the APs 802 may use the same primary channel 904 or their primary channels 904 may overlap.)

As illustrated, AP1 802.1 is transmitting transmission 1808, e.g., a request-to-send (RTS). The transmission 1808 may reach AP 802.2 since it is inside the transmission range 806.1 of AP1 802.1, but will not reach or likely will not reach STA2 804.2, STA3 804.3, STA4 804.4, STA5 804.5, or AP3 802.3 because they are outside the transmission range 1806.1 of AP1 802.1. STA2 804.2, STA3 804.3, STA4 804.4, STA5 804.5, or AP3 802.3 may be termed hidden nodes to AP1 802.1 in accordance with some embodiments. In some embodiments, the APs 802 may be managed by a common entity (not illustrated). In some embodiments, the APs 802 operate on different primary channels. For example, AP1 802.1 and AP2 802.2 may operate on primary channel 904.1 and primary channel 904.2, respectively. AP3 802.3 may operate on C3 902.3. The APs 802 may operate on 20 MHz, 40 MHz, 80 MHz, 160 MHz, 80+80 MHz, 320 MHz, 160+160 MHz, 640 MHz, or another bandwidth, which may include a primary channel 904, which may be a different bandwidth than 20 MHz. For example, referring to FIG. 9, AP1 802.1 may operate on channels C1 902.1 and C2 902.2, which includes the primary channel of AP2 904.2. In some embodiments, AP3 802.3 may operate on the same primary channel (e.g., primary channel 904) as AP1 802.1 and AP2 802.2.

STAs 804 may be associated with a BSS, which includes an AP 802. STA1 804.1 may be associated with AP1 802.1. STA2 804.2 and STA4 804.4 may be associated with AP2 802.2. STA3 804.3 and STA5 804.5 may be associated with AP3 802.3. In some embodiments, one or more of the STAs 804 may be legacy stations.

FIG. 19 illustrates an able to receive with condition (ARC) frame 1900 in accordance with some embodiments. Illustrated in FIG. 19 is preamble 1902, MAC header 1904, L-SIG field 1906, frame control field 1908, MAC duration field 1910, RA field 1912, condition field 1914, TXPWR 1916, and FCS field 1918. The ARC frame 1900 may be part of a PPDU 1400. The L-SIG 1906 may be the same or similar to L-SIG field 1406. The preamble portion 1902 may be the same or similar to preamble 1402. MAC header 1904, condition 1914, TXPWR 1916, and FCS 1918 may be the same or similar as MAC portion 1404. MAC duration field 1910 may be the same or similar as length 1408. The FCS 1918 may be the same or similar to FCS 1310.

The L-SIG field 1906 may include a duration of a PPDU that includes the ARC frame 1900. The MAC duration 1910 may be a duration to an end of a TXOP, e.g., the MAC duration 1910 may be set based on a duration of RTS 1510 that is a duration to an end of the ACK 1516. The MAC duration 1910 may be set to a different value, in accordance with some embodiments. The RA field 1912 may be set to a value of an APs MAC address, e.g., the MAC address of AP2 802.2.

The condition field 1914 may indicate a condition that a STA 804 needs to meet or the STA 804 should set their NAV, in accordance with some embodiments. In some embodiments, if the STA 804 fails to meet the condition indicated by the condition field 1914 and the STA 804 is associated with the AP 802 that transmitted the ARC frame 1900 then the STA 804 sets a NAV based on the duration indicated by the duration field 1910.

STAs 804 are configured to set their NAV (e.g., basic NAV or intra-BSS NAV) based on the MAC duration 1910 if the ARC frame 1900 indicates the ARC frame 1900 is from the same BSS that the STA 804 is associated with and if the condition indicated by the condition field 1914 is met, in accordance with some embodiments. For example, the STA 804 may compare the RA field 1912 with a BSSID of the BSS the STA is associated with or the STA 804 may compare the RA field 1912 with the MAC address of an AP 802 that the STA 804 is associated with.

The condition field 1914 may indicate a minimum received signal strength indicator (RSSI) at the AP that transmitted the ARC frame 1900 that a transmission from the STA 804 needs to be. The STA 804 may determine the RSSI based on estimating an attenuation between the STA 804 and AP 802 based on a TXPWR indicated by the TXPWR field 1916 and a RSSI of the ARC frame 1900. The STA 804 may then determine a TXPWR that the STA 804 would have to use to transmit a PPDU that would have the RSSI indicated by the condition field 1914 at the AP 802 that transmitted the ARC frame 1900. The STA 804 may then determine whether it can transmit PPDUs using this TXPWR based on various constraints including, co-located APs, physical limits of TXPWR, communication standards for maximum TXPWR (e.g., IEEE 802.1 lax/EHT), regulatory limits etc. If the STA 804 can transmit PPDUs at the TXPWR indicated by the condition 1914, then the STA 804 may determine not to set its NAV based on the duration indicated by the MAC duration 1910.

Returning to FIG. 18, transmission 1808 may be a RTS with bandwidth signaling (e.g., RTSs 1510, 1610, or 1710) transmitted by AP1 802.1. AP2 802.2 may receive the transmission 1808 and determine whether to transmit a CTS to self (e.g., CTS-S 1518.2, CTS-S 1618.2, CTS-S 1716.2), an ARC 1900, another frame, or no frame.

AP2 804.2 may transmit transmission 1810 which may be an ARC frame 1900. The duration 1908 is set to the duration of the transmission 1810. The MAC duration 1910 is set based on a duration in transmission 1808, e.g., a duration indicated by duration field 1106. The duration in transmission 1808 may be set to an end of a TXOP, e.g., to an end of ACKs 1516, ACKs 1616, etc. AP2 804.2 may have to subtract from the duration indicated by the duration field 1106 to account for a duration time of transmission 1810 and interframe space durations. The RA field 1912 of the ARC frame 1900 may be set to a BSSID or MAC address of AP2 804.2. In some embodiments, the ARC frame 1900 comprises a TA field (not illustrated), and AP2 802.2 may set the TA field to the BSSID or MAC address of AP 804.2.

STAs 804 within the transmission range 1806.2 of AP2 802.2 may receive the transmission 1810, e.g., ARC frame 1900, which may be included in a PPDU (e.g., 1400). In some embodiments, STA3 804.3 and STA5 804.5 are associated with AP3 802.3. STA2 804.2 and STA4 804.4 are associated with AP2 802.2. STA1 804.1 is associated with AP1 802.1. STA3 804.3 and STA5 804.5 may decode the transmission 1810 and determine not to set their NAVs (e.g., intra-NAV or basic NAV) based on the ARC frame 1900 included in the transmission 1810 because the RA field 1912

(or in some embodiments TA field) indicates an address associated with AP2 802.2 and not AP3 802.3, e.g., a MAC address or BSSID.

STA2 804.2 may receive the ARC frame 1900 and determine that it should set its NAV (e.g., intra-BSS NAV or basic NAV) based on the duration indicated in the MAC duration field 1910 of the ARC frame 1900. The determination may be based on a stored addressed associated with AP2 802.2 matching an address in the RA field 1912 (or TA field) of the ARC frame 1900 and a determination that the condition indicated in the condition field 1914 cannot be met. For example, the condition field 1914 may indicate a RSSI (e.g., −70 dBm, which may be needed to overcome interference from AP1 802.1) that a PPDU transmitted by STA2 804.2 needs to have at AP2 802.2. STA2 804.2 may determine an attenuation based on a TXPWR indicated in the TXPWR field 1916 and an RSSI of the PPDU that included the ARC frame 1900 and then determine whether the TXPWR may bet set high enough to achieve the RSSI indicated by the condition field 1914. STA2 804.2 may determine that the TXPWR necessary is above a maximum TXPWR STA2 804.2 may use to transmit the PPDU and thus that the condition indicated by condition field 1914 cannot be met.

STA4 804.4 may receive the ARC frame 1900 and determine that it should not set its NAV (e.g., intra-BSS NAV or basic NAV) based on the duration indicated in the MAC duration field 1910 of the ARC frame 1900. The determination may be based on a stored addressed associated with AP2 802.2 matching an address in the RA field 1912 (or TA field) of the ARC frame 1900 and a determination that the condition indicated in the condition field 1914 can be met. For example, the condition field 1914 may indicate a RSSI (e.g., −70 dBm, which may be needed to overcome interference from AP1 802.1) that a PPDU transmitted by STA4 804.4 needs to have at AP2 802.2. STA2 804.2 may determine an attenuation based on a TXPWR indicated in the TXPWR field 1916 and an RSSI of the PPDU that included the ARC frame 1900 and then determine whether the TXPWR may be set high enough to achieve the RSSI indicated by the condition field 1914. STA4 804.4 may determine that the TXPWR necessary is below or equal to a maximum TXPWR STA4 804.4 may use to transmit the PPDU and thus that the condition indicated by condition field 1914 can be met. Thus, in accordance with some embodiments, STA4 804.4 may determine not to set a NAV based on the duration indicated by the duration field 1910.

In some embodiments, the STAs 804 may determine the attenuation between the STA 804 and the AP 802 based on another PPDU received from the AP 802. Transmission 1810 may be on a primary channel of AP2 802.2. Transmission 1808 may be both on a primary channel of AP1 802.1 and a primary channel of AP2 802.2. The transmission 1810 may interfere with the reception of responses to transmission 1808 from other STAs 804 to AP1 802.1, e.g., STA1 804.1 to AP1 802.1 (e.g., CTS 1514.2 may be interfered with by CTS 1518 at reception for AP1 802.1 as disclosed in conjunction with FIG. 15). The transmissions from STAs 804 associated with AP1 802.1 may be duplicative and include an indication of a bandwidth so that interference on one channel will not interfere with the AP1 802.1 determining the response. For example, as disclosed in conjunction with FIG. 15, CTS 1514.1 (transmitted on C1 902.1) is not interfered with by CTS 1518.2 (transmitted on C2 902.2) and CTS 1514.1 includes bandwidth 1312, which indicates 40 MHz. AP1 802.1 may determine based on this that STA1 802.1 transmitted another CTS 1514.2 on C2 902.2.

An apparatus of a EHT STA 504, an apparatus of a STA 804, a STA 804, a EHT STA 504, an apparatus of a EHT AP 502, an apparatus of a AP 802, an AP 802, and/or a EHT AP 502 may be configured to encode/decode an ARC frame 1900 as described herein.

In some embodiments, all STAs 804 within the transmission range 1806.2 of AP2 802.2 would set their NAV (e.g., basic NAV or intra-BSS NAV) based on a duration of a CTS-to-self transmitted by AP2 802.2. In contrast, if AP1 802.1 transmits an ARC frame 1900 then only STA2 804.2 would set its NAV. For example, STA3-5 804.3-804.5. If the STAs 804 were configured to only set a NAV if the CTS-to-self was from an AP 802.2 associated with the STA 804, then STA4 804.4 would still set its NAV when it would not have with an ARC frame 1900.

Setting of the NAV based on the duration of a TXOP of AP1 802.1 (or NAV propagation) may not be necessary for some STAs 804 thst are out of transmission range 1806.1 of AP1 and STA1 804.1, such as STA3 804.3 and STA 4 804.4, as illustrated in FIG. 18. As mentioned above, when AP1 802.1 receives the duplicate CTS frames (e.g., CTS 1514.1 and 1514.2), AP1 802.1 will only decode the CTS frame over the primary channel (C1 902.1) and determine whether it is duplicate CTS frame or not according to the CH_BANDWITH field (e.g., bandwidth field 1312) in the CTS frame 1300. This means that the frame (CTS-to-self or ARC frame 1900) transmitted by AP2 802.1 over the secondary channel (C2 902.2) of AP1 902.1 will not affect the reception of the CTS (1514.1 and 1514.2) frame from STA1 804.1 to AP 1804.1.

AP2 802.2 may be configured to transmit a CF-end frame (e.g., 1718) if AP1 802.1 does not continue with another transmission (e.g., data 1512). The ARC frame 1900 may reduce the power consumption for STA2 802.2 as STA2 804.2 may set its NAV and not use energy to transmit to AP2 802.2 would could not receive its transmissions during the TXOP of AP1 802.1 due to the interference from AP1 802.1 or STAs 804 (e.g., 804.1) participating in the TXOP, e.g., see FIG. 15. STA4 804.4 may use spatial reuse to transmit to AP2 802.2 during the TXOP of AP1 802.1

In accordance with some embodiments, STAs 804 associated with the AP that transmits the ARC frame 1900 that are far away (e.g., too far to be able to transmit with enough power for their PPDU to be received at the AP 802 with the RSSI indicated by condition field 1914) from the AP 802 that transmitted the ARC frame 1900 set their NAVs. In accordance with some embodiments, STAs 804 that are associated with the AP that transmits the ARC frame 1900 that are not far away may determine not to set their NAV and thus may use spatial reuse operations to transmit to the AP 802 that transmitted the ARC frame 1900. In accordance with some embodiments, legacy devices 806 cannot decode the ARC frame 1900 and thus will not set NAVs based on the MAC duration 1910. In accordance with some embodiments, legacy devices 506 may set their NAVs based on receiving a CTS-to-self (e.g., 1300, 1716). In some embodiments, AP 802 determines whether to transmit a CTS-to-self or ARC frame 1900 based at least on a number of legacy devices 806. In some embodiments, the ARC frame 1900 indicates that STAs 804 not associated with any AP should set their NAV if they cannot meet the condition indicated by the condition field 1914.

In accordance with some embodiments, setting a NAV indicates that the STA 804, EHT STA 504, EHT AP 502, and/or AP 802 may determine whether to set the NAV (e.g., basic NAV or intra-BSS NAV) based a duration in a received frame and other determinations such as whether the frame is an inter or intra BSS frame, a current setting of the NAV, etc.

Figure 20:
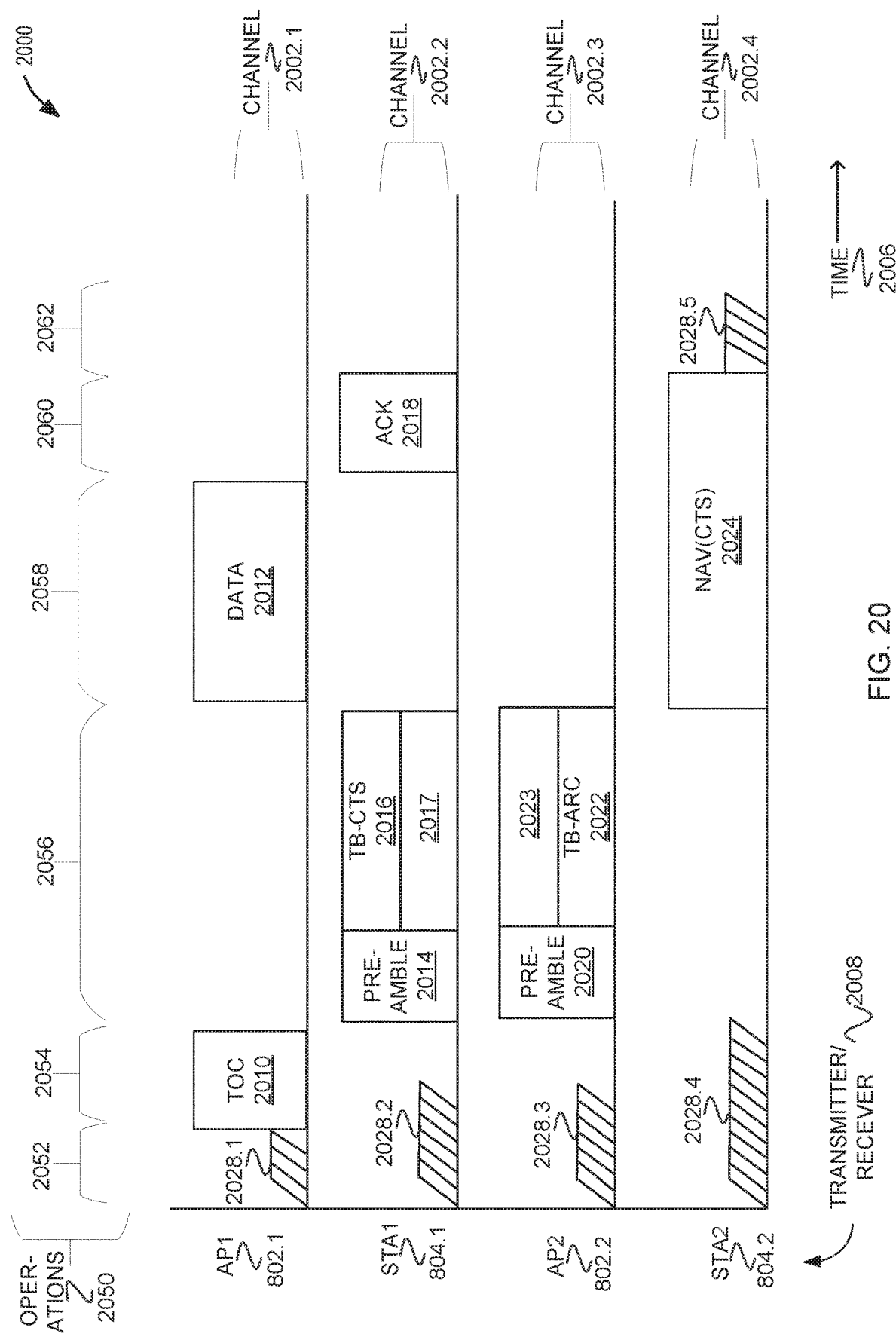
FIG. 20 illustrates a method of power reduction in a wireless network in accordance with some embodiments.

FIG. 20 illustrates a method 2000 of power reduction in a wireless network in accordance with some embodiments. Illustrated in FIG. 20 are APs 802, STAs 804, time 2006 along a horizontal axis, transmitter/receiver 2008, channels 2002, and operations 2050 along the top. Channel 2002 may be a same channel with a bandwidth of 20 MHz, 40 MHz, 80 MHz, 160 MHz, 80+80 MHz, 160+160 MHz, 320 MHz, 320+320 MHz, 640 MHz, or another bandwidth. In some embodiments, channel 2002.1 may include a primary channel (e.g., primary channel 904.1) of AP1 802.1. In some embodiments, channel 2002.3 may include a primary channel (e.g., primary channel 904.2) of AP2 802.2. Channel 2002.1, 2002.2, 2002.3, and 2002.4 may be a same channel or different channels that may overlap one another. For example, AP1 802.1 may transmit on a 40 MHz channel that includes 20 MHz channels including a primary channel of AP1 802.1 and a primary channel of AP2 802.2. APs 802 may be APs 802 as disclosed in conjunction with FIG. 8. STAs 804 may be STAs 804 as disclosed in conjunction with FIG. 8.

The method 2000 begins at operation 2052 with AP1 802.1 contending 2028.1 for channel 2002.1. Other devices may contend 2028 for channel 2002 concurrently with AP1 802, e.g., STA1 804.1 contending 2028.2, AP2 802.2 contending 2028.3, and STA2 804.2 contending 2028.4. AP1 802.1 may have data packets waiting to be sent to STA1 804.1. AP2 802.2 may have data packets waiting to be sent to STA2 804.2. STA2 804.2 may have data to transmit to AP2 802.2. AP1 802.1 may gain access to channel 2002.

The method 2000 continues at operation 2054 with AP1 802.1 transmitting trigger-for-control (TOC) frame 2010 on channel 2002.1. The TOC frame 2010 may be the same or similar as TOC frame 2400. The TOC 2010 may include a user information field 2412 for STA1 804.1 and AP2 802.2. AP1 802.1 may encode the TOC frame 2010 based on one or more of associated STAs, data that is pending to be sent to associated STAs, data that is pending to be sent to the AP1 802.1 from associated STAs, neighbor AP information 2210, etc. The neighbor AP information 2210 of AP1 802.1 may indicate that AP2 802.2 (see FIG. 18) is part of an OBSS of a BSS of AP1 802.1. AP1 802.1 may monitor channel 2002 and determine that a PPDU was transmitted by AP2 802.2. The TOC frame 2010 may include a RU allocation 2504 for STA1 804.1 to transmit TB-CTS 2016 and for AP2 802.2 to transmit TB-ARC 2022.

The TOC frame 2010 may include a AID of STA1 804.1 and an identification for AP2 802.2. In some embodiments, the identification for AP2 802.2 may be an AID where AP1 802.1 assigns an AID for AP2 802.2. In some embodiments, the identification for AP2 802.2 may be a partial BSSID. In some embodiments, the identification for AP2 802.2 may be a particular reserved value for AID to indicate a neighboring AP, which may include some partial identification such as a color, partial MAC address of the AP, or another identification for AP2 802.2. AP1 802.1 may determine that AP2 802.2 is operating on a same primary channel as AP1 802.1, e.g., channel 2002 or a portion of channel 2002. The TOC 2010 may include a trigger type field 2418 that indicates a TOC.

The inclusion of STA1 804.1 in the TOC 2010 may indicate that AP1 802.1 has DL data for STA1 804.1 and that AP 802.1 is requesting or soliciting STA1 804.1 to transmit a trigger-based (TB) PPDU CTS frame over the RU allocation 2504 indicated in the TOC 2010 in accordance with the user information 2412. The TOC 2010 is included in a multi-user (MU) PPDU, e.g., PPDU 1400.

The TOC frame 2010 may include a length field 1408 (FIG. 14) in the L-SIG 1406 of the PPDU 1400 that includes the TOC frame 2010 where the length 1408 may be set to a length or duration of the TOC frame 2010 or PPDU 1400. The duration field 2404 (FIG. 24) is set to an estimated time or duration to transmit the TB-CTS 2016 (including preamble 2014), plus the time or duration to transmit data 2012, plus application SIFS, in accordance with some embodiments. The UL length field 2420 (FIG. 24) indicates a length of the TB-CTS 2016.

The method 2000 may continue at operation 2056 with STA1 804.1 transmitting TB-CTS 2016 including (preamble 2014) and AP2 802.2 transmitting TB-ARC 2022 (including preamble 2020) a SIFS time after reception of TOC 2010. STA1 804.1 may transmit TB-CTS 2016 on the RU allocation 2504 indicated in the TOC 2010 for STA1 804.1. The transmission may be in accordance with OFDMA. TB-CTS 2016 may be the same or similar to TB-CTS 2600. The TB-CTS 2016 may have the length field 2604 of the L-SIG 2606 set to the value of the UL length field 2420 of the TOC 2400. The CTS 2608 may be the same or similar to CTS frame 1300. The duration field 1306 may be set to a duration or time based on the duration field 2404 of the TOC frame 2010, which may extend to the end of the ACK frame 2018. The TB-CTS 2016 may include decoding information 2612, which may be transmitted on a 20 MHz, 40 MHz, 80 MHz, or 160 MHz channel that includes the CTS 2608. The decoding information 2612 may include some or all of the fields in the trigger for control 2400 to enable STAs 804 to decode the CTSs 2606, which may be transmitted on subchannels that are less than 20 MHz.

AP2 802.2 may transmit TB-ARC 2022 on the RU allocation 2504 indicated in the TOC 2010 for AP2 802.1. The transmission may be in accordance with OFDMA. AP2 802.2 may encode TB-ARC 2022 which may be the same or similar to TB ARC 2700. The TB-ARC 2022 may have the length field 2704 of the L-SIG 2706 set to the value to the value of the UL length field 2420 of the TOC 2400. The ARC 2708 may be the same or similar to ARC frame 1900. The MAC duration field 1910 may be set to a duration or time based on the duration field 2404 of the TOC frame 2010, which may extend to the end of the ACK frame 2018. The AP2 802.2 may encode the fields of the ARC 2708 the same or similar to the encoding as described herein, e.g., FIG. 19. AP2 802.2 encodes the ARC 1900 with a condition 1914 as described in conjunction with FIG. 19, which may indicate a receive capability of AP2 802.2, e.g., a RSSI that a PPDU would need to have at AP2 802.2 for AP2 802.2 to decode the PPDU over the interference of AP 1 802.1 and/or STA1 804.1. In some embodiments, AP2 802.2 may encode a CTS-to-self frame rather than the ARC frame. The TB-ARC 2022 may include decoding information 2612, which may be transmitted on a 20 MHz, 40 MHz, 80 MHz, or 160 MHz channel that includes the ARC 2708. The decoding information 2612 may include some or all of the fields in the trigger for control 2400 to enable STAs 804 to decode the ARCs 2708, which may be transmitted on subchannels that are less than 20 MHz.

The method 2000 continues at operation 2058 with STA2 804.2 setting a NAV 2024 and AP1 802.1 transmitting data 2012 to STA1 804.1. For example, STA2 804.2 (referring to FIG. 18) may be far away from AP2 802.2 and unable to transmit with enough power to meet the minimum RSSI indicated in the condition field. AP2 802.2 may operate in accordance with spatial reuse rules, e.g., STA4 804.4 (referring to FIG. 18) may determine that data 2012 is from an OBSS and evaluate TB-ARC (or CTS-to-self) as described below. STA4 804.4 may then be able to transmit to AP2 802.2 in accordance with spatial reuse rules, e.g., determine a transmission power that may be based on a needed RSSI at AP2 802.2 and/or a maximum RSSI at AP1 802.1, which may be indicated in the data 2012 (e.g., in a PPDU that includes data 2012.)

STAs 804 decode the TB-ARC 2022 and set their NAV (e.g., NAV 2308 of FIG. 23) based on the MAC duration 1910 if a BSSID (e.g., BSSID 2302 of FIG. 23) of an AP 802 the STA 804 is associated with matches a RA 1912 address of the ARC frame 2706 and the STA 804 cannot meet the condition (e.g., condition 1914), e.g., the STA's 804 maximum achievable RSSI to the AP 802 that transmitted the TB-ARC 2022 (or CTS-to self) is lower than a value indicated in the condition field 1914. For example, STA2 802.2 may set the NAV 2024 based on STA2 804.2 being associated with AP2 802.2 so BSSID 2302 will match the RA 1912 address of AP2 802.2 and STA2 802.2 may determine that it cannot achieve the RSSI required by the condition 1914, which may be determined based on an estimated attenuation from AP2 802.2 to STA2 804.2 as disclosed herein.

Referring to FIG. 18, STA3 804.3 and STA5 804.5 will not set their NAV based on the TB-ARC 2022 because the RA 1912 of the TB-ARC 2022 (or CTS-to-self) will not match a stored BSSID 2302, e.g., STA3 804.3 and STA5 804.5 may be associated with AP3 802.3 and not AP2 802.2. STA4 804.4 may have a stored BSSID 2302 that matches the RA 1912 of the TB-ARC 2022 (or CTS-to-self) and STA4 804.4 may be able to meet the condition 1914, e.g., STA4 804.4 may be close enough to AP2 802.2 that it can transmit a PPDU that can be received with an RSSI that is equal to or greater than the RSSI indicated by the condition 1914. STA4 804.4 will be able to perform spatial reuse because its NAV was not set by the TB-ARC 2022 (or CTS-to-self).

STAs 804 that are legacy will not be able to decode the TB-CTS 2016, TB-ARC 2022 (or TB-CTS to self), in accordance with some embodiments. Additionally, STAs 804 that are legacy will receive the TOC 2010 sent by AP1 802.1 and defer transmission (e.g., set a NAV) based on the length field 1408 in an L-SIG field 1406 of a PPDU 1400 (e.g., MU PPDU) that includes the TOC 2010 frame. The STAs 804 that are legacy devices may not be able to decode the PPDU 1400 that includes the TOC 2010 past the legacy portion and/or may not be able to decode the TOC 2010 frame. STAs 804 that are legacy will similarly defer based on a length field 2604 of the L-SIG 2606 of TB-CTS 2016 and STAs 804 that are legacy will similarly defer based on the length field 2704 of a L-SIG field 2706 of the TB-ARC PPDU 2700. Similarly, STAs 804 that are legacy would defer based on the length field 1408 in an L-SIG field 1406 of a PPDU 1400 that includes the data 2012 or ACK frame 2018.

The method 2000 may continue at operation 2060 with STA1 804.1 transmitting an ACK 2018 to acknowledge the data 2012 and the NAV 2024 of STA2 804.2 ending. In some embodiments, the method 2000 includes an RTS/CTS exchange between AP1 802.1 and associated stations (e.g., STA1 802.1) before the transmission of the TOC 2010 frame. STAs 804 that are associated with AP1 802.1 will set their NAVs to the end of the ACK 2018 upon decoding the TOC 2010 or TB-CTS 2016. The method 2000 may continue at operation 2062 with STA2 804.2 contending 2028.5 for the channel 2002.4 after the NAV (CTS) 2024 duration has ended. In some embodiments, STA2 804.2 may want services from AP2 802.2 and contend 2028.5 for the channel 2002.4 to transmit a PPDU to AP2 802.2.

In some embodiments, the method 2000 may be performed by an apparatus of a EHT AP 502, a EHT AP 502, an apparatus of a AP 802, an AP 802, an apparatus of a EHT STA 504, an apparatus of a STA 804, a STA 804, and/or a EHT STA. In some embodiments, one or more of the operations 2050 of method 2000 may not be performed. In some embodiments, method 2000 may include one or more additional operations 2050. In some embodiments, the order of the operations 2050 of method 2000 may be different. The time between the operations 2050 may be SIFs, in accordance with some embodiments.

Figure 21:
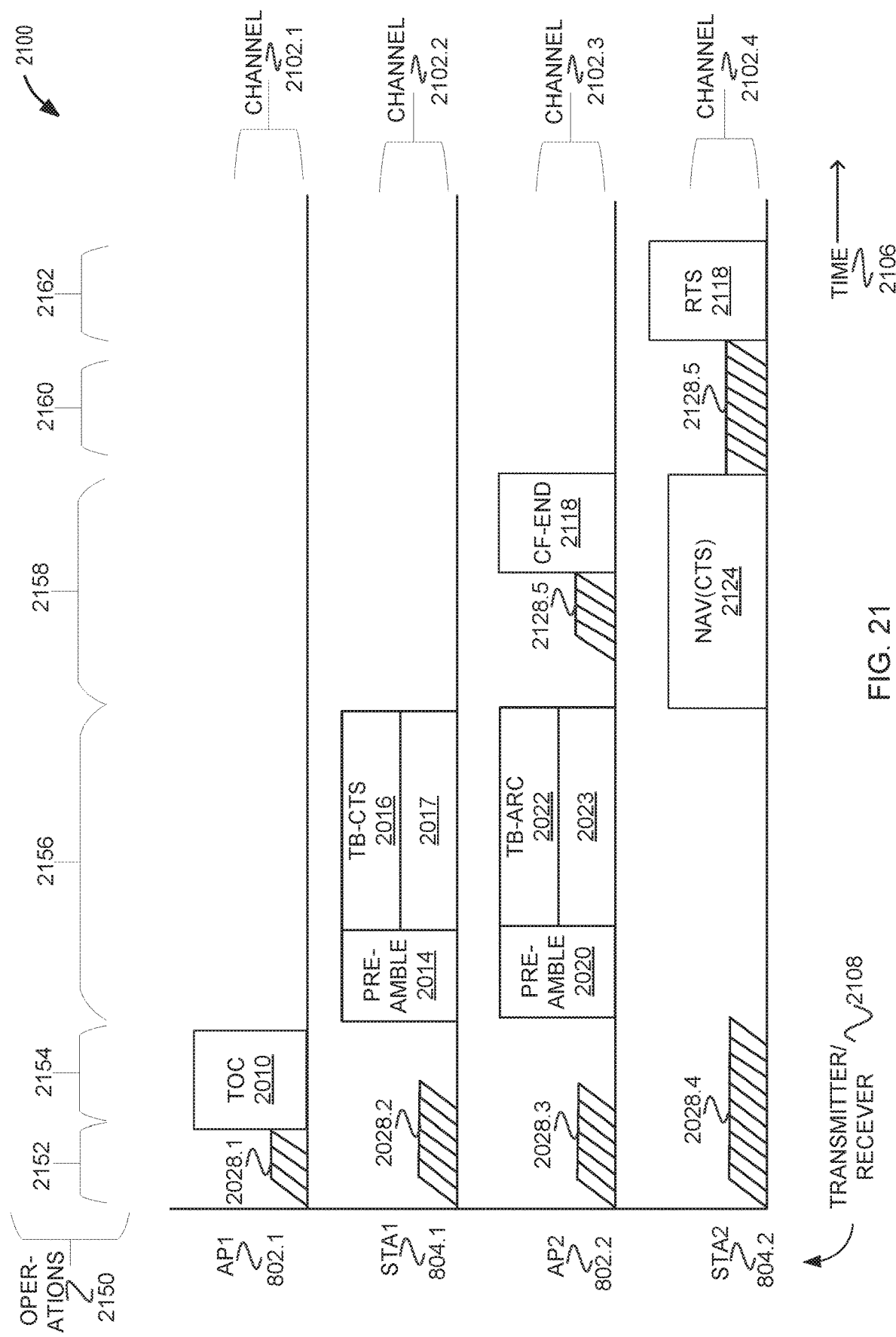
FIG. 21 illustrates a method of power reduction in a wireless network in accordance with some embodiments.

FIG. 21 illustrates a method 2100 of power reduction in a wireless network in accordance with some embodiments. Illustrated in FIG. 21 are APs 802, STAs 804, time 2106 along a horizontal axis, transmitter/receiver 2108, channels 2102, and operations 2150 along the top. Channel 2102 may be a channel with a bandwidth of 20 MHz, 40 MHz, 80 MHz, 160 MHz, 80+80 MHz, 160+160 MHz, 320 MHz, 320+320 MHz, 640 MHz, or another bandwidth. Channel 2102.1, 2102.2, 2102.3, and 2102.4 may be a same channel or different channels that may overlap one another. For example, AP1 802.1 may transmit on a 40 MHz channel that includes 20 MHz channels including a primary channel of AP1 802.1 and a primary channel of AP2 802.2. In some embodiments, channel 2102.1 may include a primary channel of AP1 802.1. In some embodiments, channel 2102.3 may include a primary channel of AP2 802.2. APs 802 may be APs 802 as disclosed in conjunction with FIG. 8. STAs 804 may be STAs 804 as disclosed in conjunction with FIG. 8.

Operations 2152 may be the same or similar as operation 2052 of FIG. 20. Operation 2154 may be the same or similar as operation 2054 of FIG. 20. Operation 2156 may be the same or similar as operation 2056. The method 2100 may continue with operation 2158. AP2 802.2 may determine to transmit a CF-End 2118 because there are no transmissions on channel 2102.3, e.g., data 2012 is not being transmitted. STA2 804.2 will receive the CF-END 2118 and reset its NAV (e.g., 2308). The method 2100 continues at operation 2160 with STA2 804.2 contending 2128.5 for channel 2102.4. STA2 804.2 may gain access to channel 2102.4. The method 2100 continues at operation 2162 with STA2 804.2 transmitting a RTS 2118 to AP2 802.2 to request services from AP2 802.2. The CF-END 2118 enables the wireless medium (e.g., channel 2102) to be used rather than remaining idle through where the ACK 2018 would have been transmitted.

Figure 22:
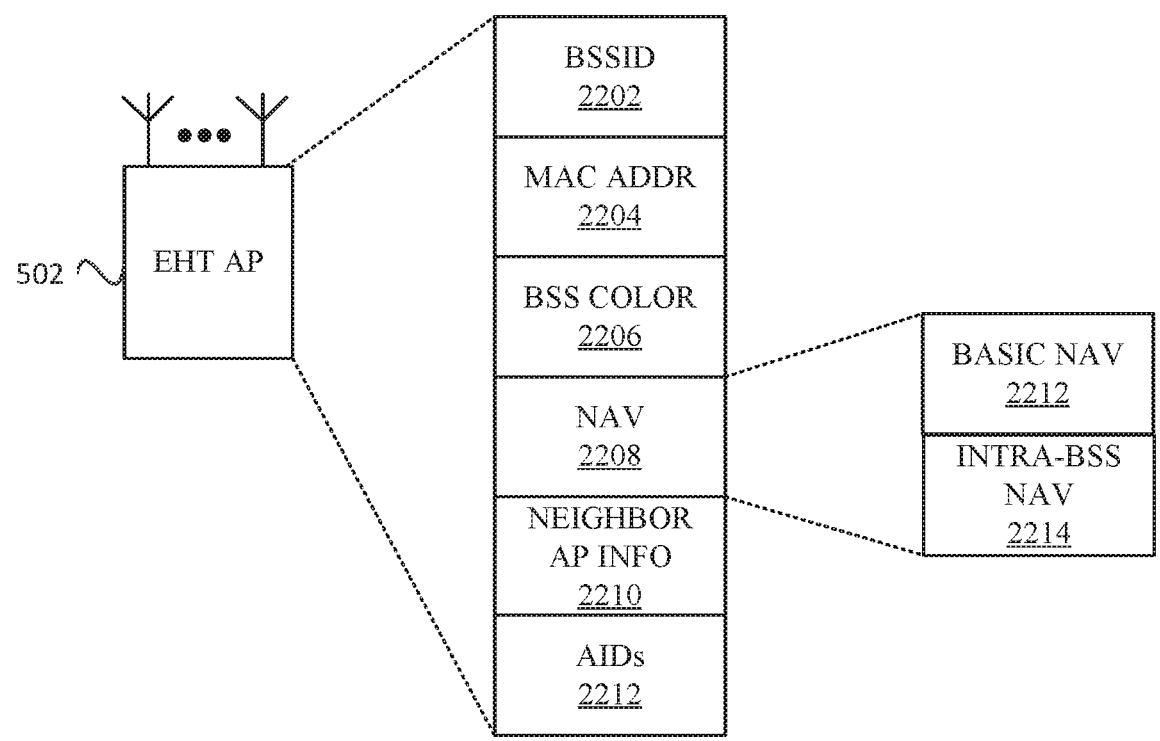
FIG. 22 illustrates a EHT AP in accordance with some embodiments.

FIG. 22 illustrates a EHT AP 502 in accordance with some embodiments. The EHT AP 502 may include a BSSID 2202, MAC address 2204, BSS color 2206, NAV 2208, neighbor AP information 2210, AIDs 2212. The BSSID 2202 may be an ID of the BSS with which the EHT AP 502 is part of. The BSSID 2202 may be assigned by a controller (not illustrated). The BSSID 2202 may be a MAC address of the EHT AP 502, e.g., MAC address 2204. The MAC address 2204 may be a MAC address of the EHT AP 502. The BSS color 2206 may indicate a color for the BSS. The color may be used to determine whether a PPDU is an intra-BSS or intra-BSS PPDU. The NAV 2208 may include a basic NAV 2212 and an intra-BSS NAV 2214. In some embodiments, there is only the one NAV 2208. The basic NAV 2212 may be for inter-BSS PPDUs and unclassified PPDUs transmissions. The intra-BSS NAV 2214 may be for intra-BSS transmissions. The neighbor AP information 2210 may include information relating to other APs that overlap with a BSS of the EHT AP 502, e.g., referring to FIG. 18, AP2 802.2 may maintain information for AP1 802.1 and AP3 802.3, e.g., a primary channel, a BSSID, a MAC address, a color, communication standard (e.g., 11ax or 11EVT), and/or an operating bandwidth. EHT AP 502 may be configured to monitor channels (e.g., 902) to determine this information. In some embodiments, EVT AP 502 may keep the information for APs that operate on the same primary channel 904 as the EVT AP 502. The AIDs 2212 may be AIDs of STA that are associated with the EHT AP 502, e.g., AP1 802.1 may have an AID of STA1 804.1. In some embodiments, the AIDs 2212 may include AIDs of other APs that are part of BSSes that overlap the BSS that the EHT AP 502 is part of. In some embodiments, the AIDs 2212 may include AIDs that have been assigned to the EHT AP 502 by OBSSes, e.g., AP1 802.1 may assign an AID to AP2 802.2. The EHT AP 502 may be an AP 802.

Figure 23:
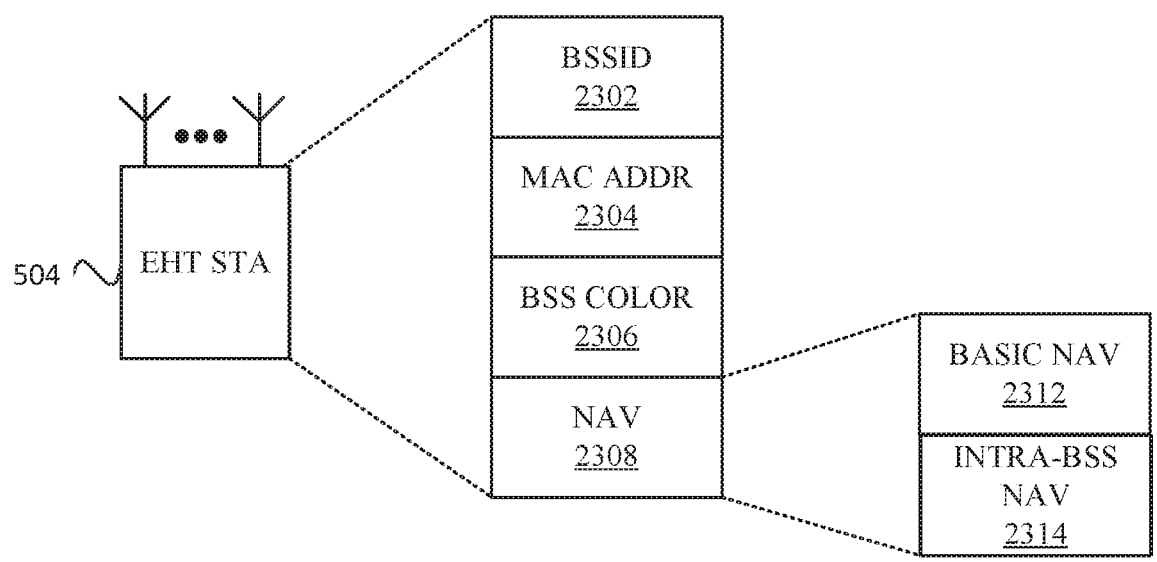
FIG. 23 illustrates a EHT STA in accordance with some embodiments.

FIG. 23 illustrates a EHT STA 504 in accordance with some embodiments. The EHT STA 504 may include BSSID 2302, MAC address 2304, BSS color 2306, and NAV 2308. The BSSID 2302 may be a BSSID of a BSS that the EHT STA is associated with. The MAC address 2304 may be a MAC address of the EHT STA 504. The BSS color 2306 may be a color that is associated with the BSS that the EHT STA 504 is associated with. The NAV 2308 may include basic NAV 2312 and intra-BSS NAV 2314. In some embodiments, EHT STA 504 may have only one NAV. The basic NAV 2212 may be for inter-BSS PPDUs and unclassified PPDUs transmissions. The intra-BSS NAV 2214 may be for intra-BSS transmissions. The EHT STA 504 may be a STA 804.

FIG. 24 illustrates a trigger for control (TOC) frame 2400 in accordance with some embodiments. The TOC 2400 may include frame control 2402, duration 2404, RA 2406, TA 2408, common information 2410, user information 2412, padding 2414, and FCS 2416. The frame control 2402 may include information about the TOC frame 2400 such as the type of the frame. The duration 2404 may be set to a TXOP duration as described herein. The RA 2406 may be a receiver address, which may be set to a broadcast address, in accordance with some embodiments. The TA 2408 may be the MAC address of the AP that transmits the TOC frame 2400. The common information field 2410 may include fields that are common to the STAs that are being solicited for UL transmissions, e.g., common information field 2410 may include trigger type 2418, which may be set to indicate a TOC trigger frame (see table 1), and UL length 2420, which may indicate a value that should be set for the length field 1408 of a L-SIG 1406 of a PPDU, e.g., TB PPDU, that is a response to the TOC frame 2400.

The user information 2412.1 through user information 2412.N may include fields as indicated FIG. 25. The padding field 2414 may be optionally present to extend the frame length to give the recipient STAs enough time to prepare a response for transmission a SIFS after the frame is received. The FCS 2416 may include information for detecting and correcting errors in the TOC frame 2400. Table I indicates trigger type field values and their respective meanings; a TOC may be indicated by one of the values of 8-15.

TABLE 1

TRIGGER TYPE SUBFIELD ENCODING

| TRIGGER TYPE FIELD VALUE | DESCRIPTION |
|---|---|
| 0 | Basic Trigger |
| 1 | Beamforming Report Poll (BRP) |

TABLE 1-continued

TRIGGER TYPE SUBFIELD ENCODING

| TRIGGER TYPE FIELD VALUE | DESCRIPTION |
|---|---|
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll |
| 8-15 | Reserved with one for TOC |

FIG. 25 illustrates a user information field 2500 in accordance with some embodiments. The user information field 2500 may include one or more of the following fields AID 2502, RU allocation field 2504, FEC coding type field 2506, MCS 2508, DCM field 2510, SS allocation/RA-RU information field 2512, target RSSI 2514, reserved 2516, TOC information field 2518, deferral transmission type field 2520. The AID 2502 may be an AID of STA or an indication that the user information 2500 is for any associated station or an unassociated station. In some embodiments, the AID may indicate a neighboring AP. In some embodiments, a value of the AID field 2502 may indicate any neighboring AP. In some embodiments, a RSSI may be encoded in another field, and a neighboring AP that receives the TOC frame 2400 will respond if the RSSI of the TOC frame 2400 is at least the RSSI indicated by one of the fields of the TOC frame 2400. The RU allocation 2504 indicates a subchannel for the station to use to transmit a transmission, e.g., TB PPDU. The FEC coding type field 2506 indicates the code type of the HE/EHT TB PPDU that is the response to the TOC frame 2400, e.g., 0 to indicate binary convolution coding (BCC) and 1 to indicate low-density parity check (LDPC). MCS field 2508 indicates a modulation and coding scheme (MCS) to use for the HE/EHT TB PPDU. The DCM field 2510 indicates the dual carrier modulation (DCM) of the HE/EVT TB PPDU that is the response to the TOC trigger frame 2400.

The SS allocation/RA-RU information field 2512 indicates a number of spatial streams for the RU or may indicate a number resource allocation (RAs) for random access use. The target RSSI field 2514 may indicate the expected receive signal power, averaged over the APs antenna connectors, for the HE TB PPDU transmitted on the assigned RU (indicated in RU allocation 2504) at the AP that transmitted the TOC 2400. In some embodiments, the target RSSI 2514 may indicate a minimum RSSI of the received TOC 2400 for a neighboring or overlapping AP to respond to the TOC 2400. The reserved field 2516 indicates portions of the user information 2500 that may be assigned for future use. The TOC information 2518 may indicate information that is particular to the TOC frame 2400, e.g., the TOC information 2518 may indicate a deferral transmission type field 2502. For example, the deferral transmission type field 2520 may indicate a CTS frame, CTS-to-self frame, or an ARC frame. In some embodiments, a bandwidth (BW) field may be included in the common information field 2410 that indicates a BW that is included in the deferral transmission and indicates a BW stations and APs should set their NAV, e.g., the BW may be indicated in a same or similar manner as the BW is indicated for trigger frames for multiple-user RTS as disclosed in IEEE 802.1 lax.

FIG. 26 illustrates a trigger-based (TB) CTS 2600 in accordance with some embodiments. The TB CTS 2600 includes a preamble portion 2602 and CTS 2608. The preamble portion 2602 may be part of a PPDU (e.g., HE/EVT TB PPDU) that includes the CTS 2608. The preamble portion 2602 may include a L-SIG field 2606 that includes a length field 2604. The length field 2604 may indicate a length of the PPDU (e.g., HE/EVT TB PPDU) that includes the CTS frame 2608. The duration 1306 (of the CTS frame 2608) is set based on a duration 2404 of the TXOP included in the TOC frame 2400 that solicits the TB CTS 2600.

The decoding information 2612 may include information needed for a AP 802 and/or STA 804 to decode the CTS 2608. For example, the decoding information 2612 may include one or more fields as disclosed in conjunction with FIGS. 24 and 25. In some embodiments, the decoding information 2612 may be encoded in a SIG field, e.g., a HE/EVT-SIG-B field or A2 field. The CTS 2608 may be the same or similar to CTS frame 1300. The CTS 2608 may be transmitted based on a resource allocation, e.g., as disclosed in conjunction with FIGS. 24 and 25. The preamble portion 2602 may be transmitted over a channel (e.g., 20 MHz) and the CTS 2608 may be transmitted on a subchannel of the channel in accordance with the RU allocation 2504 of the TOC frame 2400.

FIG. 27 illustrates a TB ARC frame 2700 in accordance with some embodiments. The TB ARC 2700 includes a preamble portion 2702 and ARC 2708. In some embodiments, the ARC 2708 may be a CTS-to-self. The preamble portion 2702 may be part of a PPDU (e.g., HE/EVT TB PPDU) that includes the CTS 2708. The preamble portion 2702 may include a L-SIG field 2706 that includes a length field 2704. The length field 2704 may indicate a length of the PPDU (e.g., HE/EVT TB PPDU) that includes the ARC frame 2708. The MAC duration 1910 (of the ARC frame 2708) is set based on a duration 2404 of the TXOP included in the TOC frame 2400 that solicits the TB ARC frame 2700.

The decoding information 2712 may include information needed for a AP 802 and/or STA 804 to decode the ARC (or CTS-to-self) 2708. For example, the decoding information 2712 may include one or more fields as disclosed in conjunction with FIGS. 24 and 25. In some embodiments, the decoding information 2712 may be encoded in a SIG field, e.g., a HE/EVT-SIG-B field or A2 field. The CTS 2708 may be the same or similar to ARC frame 1900. The ARC 2708 may be transmitted based on a resource allocation, e.g., as disclosed in conjunction with FIGS. 24 and 25. The preamble portion 2702 may be transmitted over a channel (e.g., 20 MHz) and the ARC 2708 may be transmitted on a subchannel of the channel in accordance with the RU allocation 2504 of the TOC frame 2400.

Figure 28:
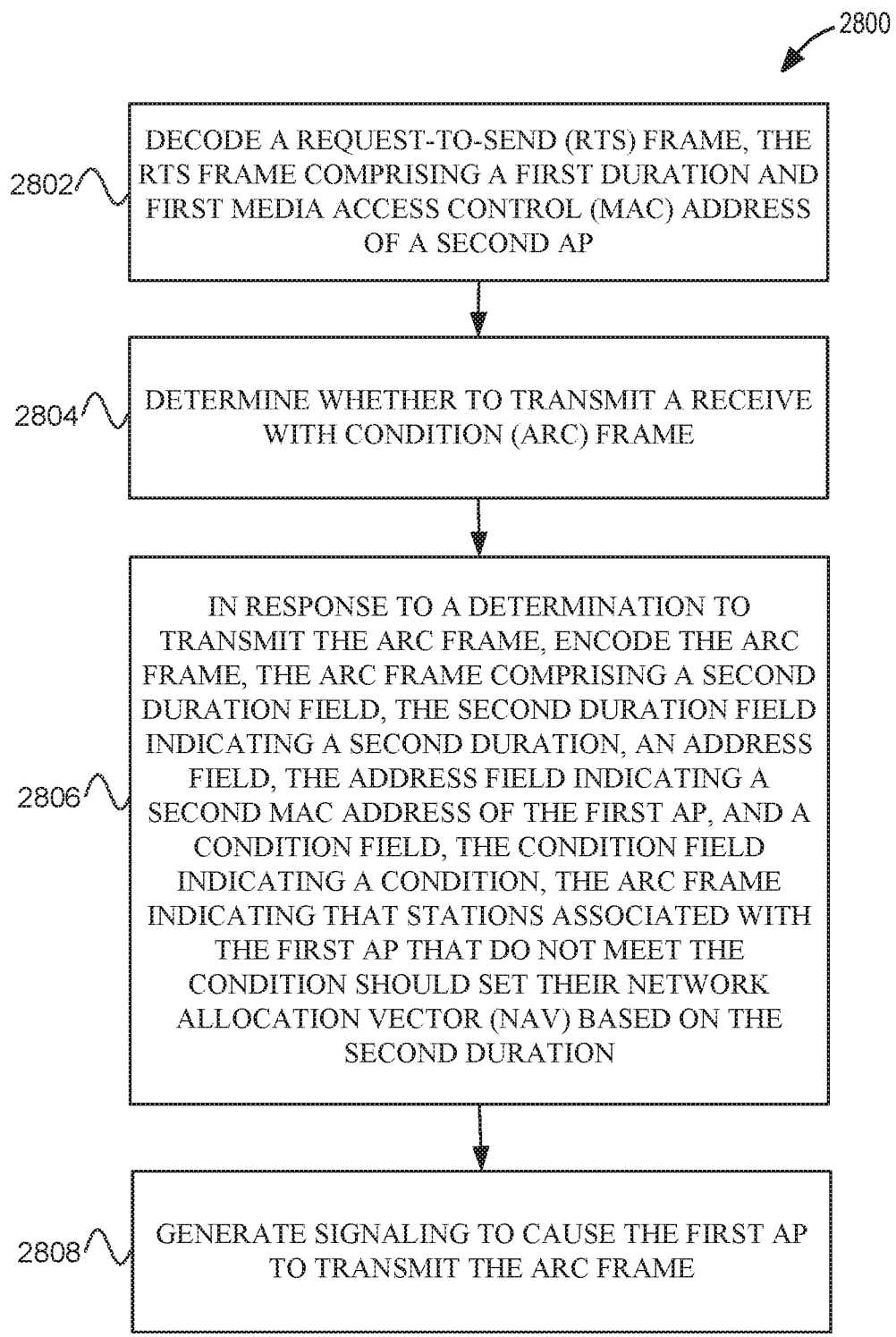
FIG. 28 illustrates a method of power reduction in a wireless network in accordance with some embodiments.

FIG. 28 illustrates a method 2800 of power reduction in a wireless network in accordance with some embodiments. The method 2800 begins at operation 1802 with decoding a RTS frame, the RTS frame including a first duration and first MAC address of a second AP. For example, in FIG. 15, STA1 804.1 and AP2 802.2 may decode RTSs 1510.1 and 1510.2. For example, in FIG. 16, STA1 804.1 and AP2 802.2 may decode RTSs 1610.1 and 1610.2. For example, in FIG. 17, STA1 804.1 and AP2 802.2 may decode RTSs 1710.1 and 1710.2. For example, in FIGS. 18 and 19, AP2 802.2 may receive RTSs 1808 from AP1 802.1.

The method 2800 may continue at operation 2804 with determining whether to transmit an ARC frame. For example, referring to FIGS. 18 and 19, AP2 802.2 may determine whether to transmit an ARC frame 1900 as disclosed herein.

The method 2800 may continue at operation 2806 with in response to a determination to transmit the ARC frame, encoding the ARC frame, the ARC frame comprising a second duration field, the second duration field indicating a second duration, an address field, the address field indicating a second MAC address of the first AP, and a condition field, the condition field indicating a condition, the ARC frame indicating that stations associated with the first AP that do not meet the condition should set their NAV based on the second duration. For example, AP2 802.2 may determine to transmit ARC frame 1810 as disclosed in conjunction with FIGS. 18 and 19.

The method 2800 may continue at operation 2808 with generating signaling to cause the first AP to transmit the ARC frame. For example, referring to FIGS. 18 and 19, an apparatus of the AP2 802.2 may generate signaling to cause AP2 802.2 to transmit ARC frame 1810.

In some embodiments, the method 2800 may be performed by an apparatus of a EHT AP 502, a EHT AP 502, an apparatus of a EHT STA 504, and/or a EHT STA. In some embodiments, one or more of the operations of method may not be performed. In some embodiments, method 2800 may include one or more additional operations. In some embodiments, the order of the operations of method 2800 may be different.

Figure 29:
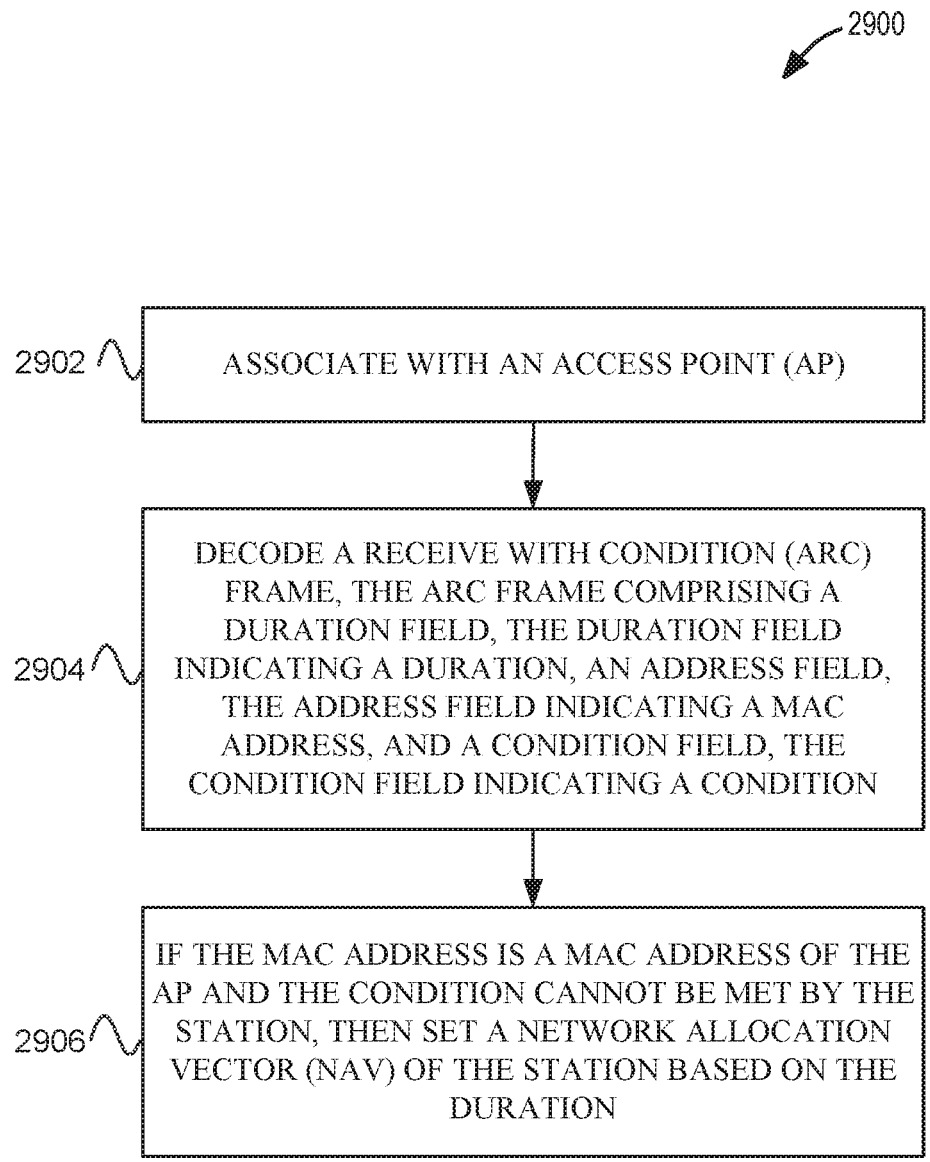
FIG. 29 illustrates a method of power reduction in a wireless network in accordance with some embodiments.

FIG. 29 illustrates a method 2900 of power reduction in a wireless network in accordance with some embodiments. The method 2900 begins at operation 2910 with associating with an AP. For example, referring to FIGS. 18 and 19, STA2 804.2 and STA4 804.4 may associate with AP 802.2.

The method 2900 continues at operation 2904 with decoding a ARC frame, the ARC frame including a duration field, the duration field indicating a duration, an address field, the address field indicating a MAC address, and a condition field, the condition field indicating a condition. For example, referring to FIGS. 18 and 19, STA4 804.4 and STA2 804.2 may decode the ARC frame 1810.

The method 2900 may continue at operation 2906 with if the MAC address is a MAC address of the AP and the condition cannot be met by the station, then set a NAV of the station based on the duration. For example, referring to FIGS. 18 and 19, STA4 804.4 may decode the ARC frame and determine the MAC address of the ARC frame is the MAC address or BSSID address of AP2 802.2. STA4 804.4 may determine that it can meet the condition so it will not set its NAV. STA2 804.2 may decode the ARC frame 1810 and determine that the MAC address is the MAC address or BSSID address of AP2 802.2 and that it cannot meet the condition (e.g., it is too far from AP2 802.2 to be able to transmit a PPDU that will be received with a high enough RSSI). STA2 804.2 may determine how to set the NAV based on at least a value of an intra-BSS NAV.

In some embodiments, the method 2900 may be performed by an apparatus of a EHT AP 502, a EHT AP 502, an apparatus of a EHT STA 504, and/or a EHT STA. In some embodiments, one or more of the operations of method may not be performed. In some embodiments, method 2900 may include one or more additional operations. In some embodiments, the order of the operations of method 2900 may be different.

Figure 30:
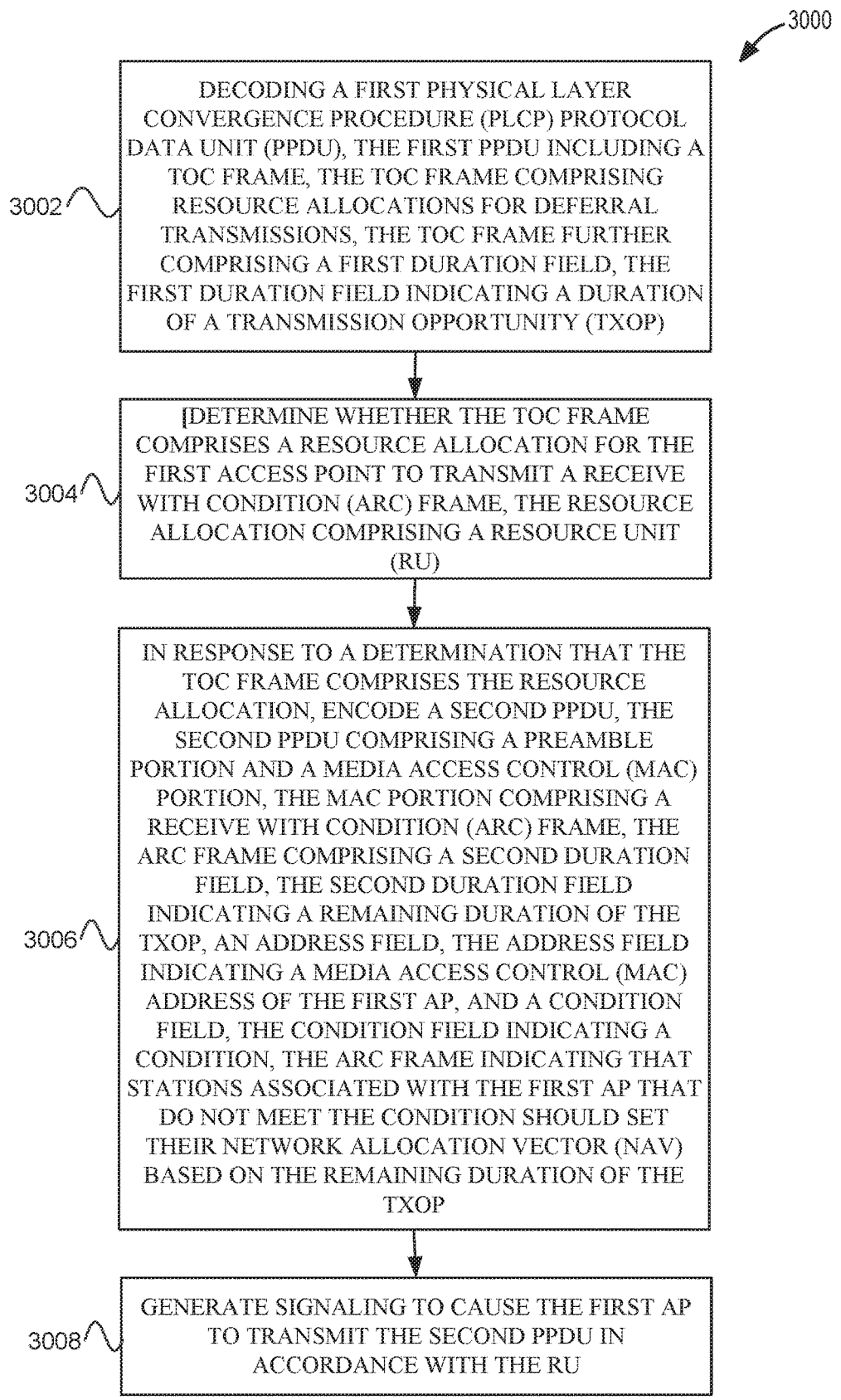
FIG. 30 illustrates a method of power reduction in a wireless network in accordance with some embodiments.

FIG. 30 illustrates a method 3000 of power reduction in a wireless network in accordance with some embodiments. The method 3000 begins at operation 3002 with decoding a first PPDU, the first PPDU including a TOC frame, the TOC frame including resource allocations for deferral transmissions, the TOC frame further comprising a first duration field, the first duration field indicating a duration of a TXOP.

For example, referring to FIGS. 20 and 21, STA1 804.1 and AP2 802.2 may decode TOC 2010 which may include resource allocations (e.g., common information 2410 and user information 2412) and first duration field (duration 2404).

The method 3000 may continue at operation 3004 with determining whether the TOC frame comprises a resource allocation for the first access point to transmit an ARC frame, the resource allocation including a RU. For example, referring to FIGS. 21, 22, 24, and 25, AP2 802.2 may determine whether TOC 2010 indicates AP2 802.2, e.g., in AID 2502 or another field, and, if AP2 802.2 is indicated in the TOC 2010, then an RU allocation 2504 field indicates an RU for AP2 802.2 to use to transmit on.

The method 3000 may continue at operation 3006, in response to a determination that the TOC frame comprises the resource allocation, encode a second PPDU, the second PPDU including a preamble portion and a MAC portion, the MAC portion comprising an ARC frame, the ARC frame including a second duration field, the second duration field indicating a remaining duration of the TXOP, an address field, the address field indicating a MAC address of the first AP, and a condition field, the condition field indicating a condition, the ARC frame indicating that stations associated with the first AP that do not meet the condition should set their NAV based on the remaining duration of the TXOP. For example, referring to FIGS. 21, 22, 24, 25, 26, and 27, AP2 802.2 may determine to transmit TB-ARC frame 2022, e.g., TB ARC 2700. The second duration (e.g., MAC duration 1910) may be set based on the duration 2404. The address field (e.g., RA field 1912) may be an BSSID or MAC address of AP2 802.2. The condition field (e.g., condition field 1914) may be set to a condition as disclosed herein.

The method 3000 may continue at operation 3008 with generating signaling to cause the first AP to transmit the second PPDU in accordance with the RU. For example, referring to FIGS. 19 and 20, an apparatus of AP2 802.2 may generate signaling to cause the AP2 802.2 to transmit the TB-ARC 2022, e.g., TB ARC 2700. The TB-ARC 2022 may be transmitted on the RU and the preamble of the TB-ARC 2022 may be transmitted on a channel (e.g., 20 MHz, 40 MHz, etc.). In some embodiments, the deferral transmission may be a CTS that is transmitted by a STA (e.g., STA1 804.1), e.g., as disclosed in conjunction with FIGS. 20 and 21.

In some embodiments, the method 3000 may be performed by an apparatus of a EHT AP 502, a EHT AP 502, an apparatus of a EHT STA 504, and/or a EHT STA. In some embodiments, one or more of the operations of method may not be performed. In some embodiments, method 3000 may include one or more additional operations. In some embodiments, the order of the operations of method 3000 may be different.

Figure 31:
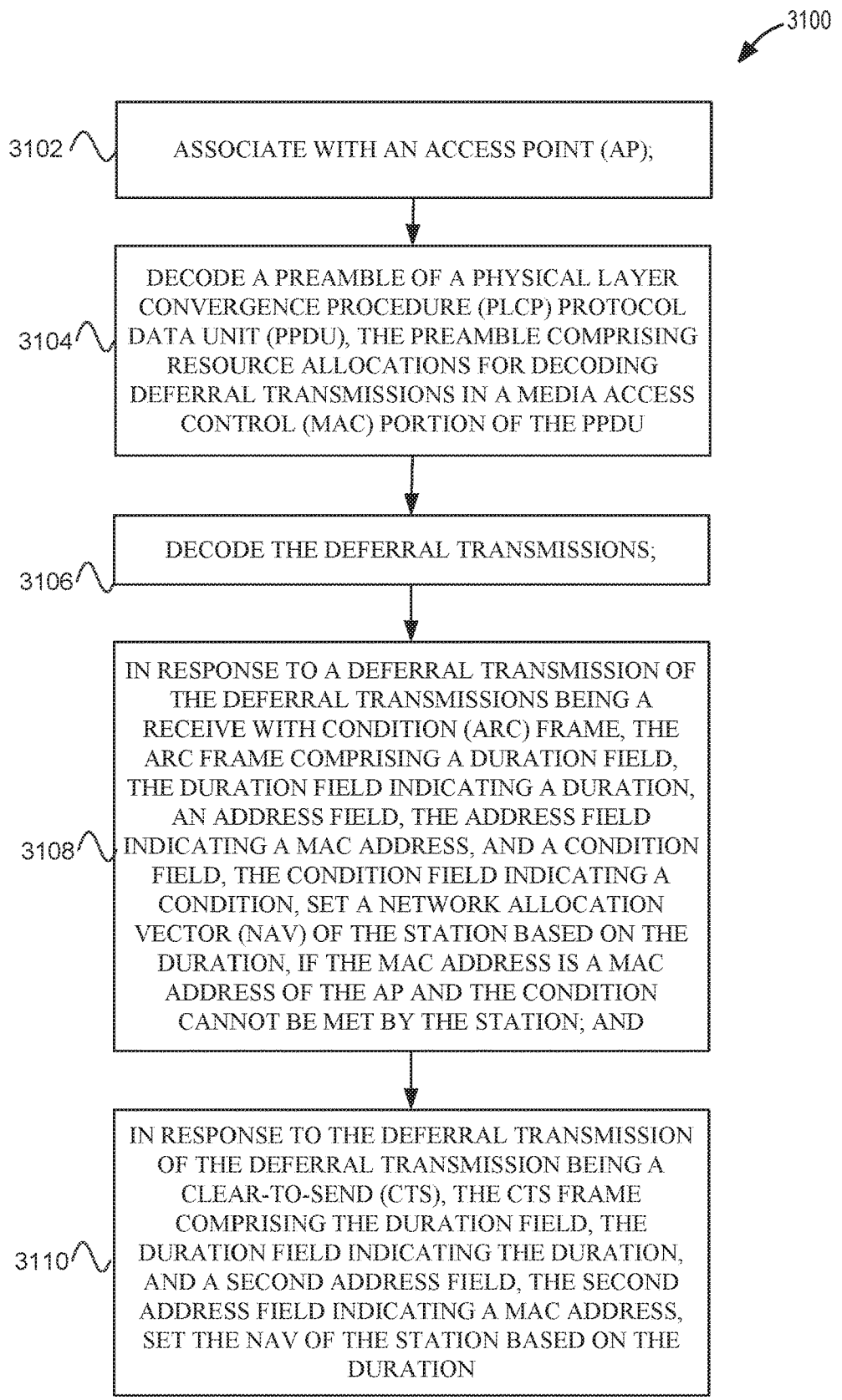
FIG. 31 illustrates a method of power reduction in a wireless network in accordance with some embodiments.

FIG. 31 illustrates a method 3100 of power reduction in a wireless network in accordance with some embodiments. The method 3100 begins at operation 3102 with associating with an AP. For example, STA2 804.2 may associated with AP2 802.2. As another example, STA1 804.1 may associated with AP1 802.1. The method 3100 may continue at operation 3104 with decoding a preamble of a PPDU, the preamble including resource allocations for decoding deferral transmissions in a MAC portion of the PPDU. For example, STA2 804.2 may decode preamble 2120 and/or 2114, which may be the same or similar as preamble 2602 and 2702. In some embodiments, preamble 2014 and preamble 2020 are the same so as not to interfere with one another. In some embodiments, preamble 2114 and preamble 2120 are the same so as not to interfere with one another. The preamble may include decoding information (e.g., 2612 or 2712).

The method 3100 may continue at operation 3106 with decoding the deferral transmissions. For example, STA2 804.2 may decode TB-ARC 2122 (in some embodiments, referring to FIG. 18, STA 1 804.1 may be too far from STA2 804.2 for STA2 804.2 to receive TB-CTS frame 2016) as disclosed in conjunction with FIGS. 20 and 21.

The method 3100 may continue at operation 3108 with in response to a deferral transmission of the deferral transmissions being an ARC frame, the ARC frame comprising a duration field, the duration field indicating a duration, an address field, the address field indicating a MAC address, and a condition field, the condition field indicating a condition, set a network allocation vector (NAV) of the station based on the duration, if the MAC address is a MAC address of the AP and the condition cannot be met by the station.

For example, referring to FIGS. 20, 21, 22, 24, 25, 26, and 27, STA2 804.2 may decode TB-ARC 2022. The duration field (e.g., MAC duration 1910) may be set based on the duration 2404. The address field (e.g., RA field 1912) may be an BSSID or MAC address of AP2 802.2. The condition field (e.g., condition field 1914) may be set to a condition as disclosed herein. STA2 804.2 may set a NAV if it cannot meet the condition and address field indicates AP2 802.2, as disclosed herein.

The method 3100 may continue at operation 3110 with in response to the deferral transmission of the deferral transmission being a CTS, the CTS frame comprising the duration field, the duration field indicating the duration, and a second address field, the second address field indicating a MAC address, set the NAV of the station based on the duration. For example, STA 804 (not illustrated) may receive TB-CTS 2116. The duration 1306 may be set based on duration 2404. The address field RA field 1308 may be set to an address of STA2 804.2. In some embodiments, a bandwidth may be signaled by the CTS frame 1300 based on a bandwidth in the TOC frame 2110. The STA 804 may determine to set a NAV upon receiving the TB-CTS 2116. In some embodiments, the RA field 1308 is set to the MAC address or BSSID of AP1 802.1 and STA 804 determines if it is associated with AP1 802.1, and if it is associated with AP1 802.1 then it sets it NAV based on the duration 1306.

In some embodiments, the method 3100 may be performed by an apparatus of a EHT AP 502, a EHT AP 502, an apparatus of a EHT STA 504, and/or a EHT STA. In some embodiments, one or more of the operations of method may not be performed. In some embodiments, method 3100 may include one or more additional operations. In some embodiments, the order of the operations of method 3100 may be different.

The following first examples pertain to further embodiments. Example 1 is an apparatus of a first access point (AP), the apparatus comprising memory; and processing circuitry coupled to the memory, the processing circuity configured to: decode a request-to-send (RTS) frame, the RTS frame comprising a first duration and first media access control (MAC) address of a second AP; determine whether to transmit a receive with condition (ARC) frame; in response to a determination to transmit the ARC frame, encode the ARC frame, the ARC frame comprising a second duration field, the second duration field indicating a second duration, an address field, the address field indicating a second MAC address of the first AP, and a condition field, the condition field indicating a condition, the ARC frame indicating that stations associated with the first AP that do not meet the condition should set their network allocation vector (NAV)

based on the second duration; and generate signaling to cause the first AP to transmit the ARC frame.

In Example 2, the subject matter of Example 1 optionally includes wherein the condition is a receive signal strength indicator (RSSI) value, the RSSI value indicating that to meet the condition a station of the stations can transmit frames to the first AP that are received at the first AP with the RSSI value or a value higher than the RSSI value.

In Example 3, the subject matter of Example 2 optionally includes wherein the ARC frame further comprises a transmit power (TXPWR) field, the TXPWR field indicating a TXPWR used by the first AP to transmit the ARC frame.

In Example 4, the subject matter of any one or more of Examples 2-3 optionally include dBm.

In Example 5, the subject matter of any one or more of Examples 1-4 optionally include wherein the processing circuitry is further configured to: determine whether to transmit a clear-to-send to self (CTS-S); in response to a determination to transmit the CTS-S, encode the CTS-S, the CTS-S comprising a receiver address (RA) field, the RA field to indicate the second MAC address of the first AP, and the second duration field; and generate a signal to cause the first access point to transmit the CTS-S.

In Example 6, the subject matter of any one or more of Examples 1-5 optionally include wherein the processing circuitry is further configured to: determine whether to transmit the ARC frame based on a number of legacy stations associated with the first AP.

In Example 7, the subject matter of any one or more of Examples 1-6 optionally include wherein the first duration indicates a duration to an end of a transmission opportunity.

In Example 8, the subject matter of any one or more of Examples 1-7 optionally include wherein the ARC frame is included in a physical Layer Convergence Procedure (PLCP) Protocol Data Unit (PPDU), the PPDU comprising a legacy signal field, the legacy signal field comprising a third duration field, the third duration field indicating a duration of the PPDU.

In Example 9, the subject matter of any one or more of Examples 1-8 optionally include wherein the address field is a transmitter address field or a receiver address field.

In Example 10, the subject matter of any one or more of Examples 1-9 optionally include wherein the condition further indicates a maximum transmit power the stations may use.

In Example 11, the subject matter of any one or more of Examples 1-10 optionally include wherein the processing circuitry is further configured to: determine the second duration based on the first duration.

In Example 12, the subject matter of any one or more of Examples 1-11 optionally include wherein the first AP, the second AP, and the stations are configured to operate in accordance with one or more of the following communication standards: an Institute of Electrical and Electronic Engineers (IEEE) 802.11ax, an IEEE 802.11 extremely-high throughput (EHT), IEEE 802.11 lay, and IEEE 802.11.

In Example 13, the subject matter of any one or more of Examples 1-12 optionally include transceiver circuitry coupled to the processing circuitry; and one or more antennas coupled to the transceiver circuitry.

Example 14 is a non-transitory computer-readable storage medium that stores instructions for execution by one or more processors of an apparatus of a first access point (AP), the instructions to configure the one or more processors to: decode a request-to-send (RTS) frame, the RTS frame comprising a first duration and first media access control (MAC) address of a second AP; determine whether to transmit a receive with condition (ARC) frame; in response to a determination to transmit the ARC frame, encode the ARC frame, the ARC frame comprising a second duration field, the second duration field indicating a second duration, an address field, the address field indicating a second MAC address of the first AP, and a condition field, the condition field indicating a condition, the ARC frame indicating that stations associated with the first AP that do not meet the condition should set their network allocation vector (NAV) based on the second duration; and generate signaling to cause the first AP to transmit the ARC frame.

In Example 15, the subject matter of Example 14 optionally includes wherein the condition is a receive signal strength indicator (RSSI) value, the RSSI value indicating that to meet the condition a station of the stations can transmit frames to the first AP that are received at the first AP with the RSSI value or a value higher than the RSSI value.

Example 16 is a method performed by an apparatus of a first access point, the method comprising: decoding a request-to-send (RTS) frame, the RTS frame comprising a first duration and first media access control (MAC) address of a second AP; determining whether to transmit a receive with condition (ARC) frame; in response to a determination to transmit the ARC frame, encoding the ARC frame, the ARC frame comprising a second duration field, the second duration field indicating a second duration, an address field, the address field indicating a second MAC address of the first AP, and a condition field, the condition field indicating a condition, the ARC frame indicating that stations associated with the first AP that do not meet the condition should set their network allocation vector (NAV) based on the second duration; and generating signaling to cause the first AP to transmit the ARC frame.

In Example 17, the subject matter of Example 16 optionally includes wherein the condition is a receive signal strength indicator (RSSI) value, the RSSI value indicating that to meet the condition a station of the stations can transmit frames to the first AP that are received at the first AP with the RSSI value or a value higher than the RSSI value.

Example 18 is an apparatus of a station comprising memory; and processing circuitry coupled to the memory, the processing circuity configured to: associate with an access point (AP); decode a receive with condition (ARC) frame, the ARC frame comprising a duration field, the duration field indicating a duration, an address field, the address field indicating a MAC address, and a condition field, the condition field indicating a condition; and if the MAC address is a MAC address of the AP and the condition cannot be met by the station, then set a network allocation vector (NAV) of the station based on the duration.

In Example 19, the subject matter of Example 18 optionally includes wherein the condition is a receive signal strength indicator (RSSI) value, the RSSI value indicating that to meet the condition the station can transmit frames to the AP that are received at the AP with the RSSI value or a value higher than the RSSI value.

In Example 20, the subject matter of any one or more of Examples 18-19 optionally include wherein the processing circuitry further comprises: if the MAC address is the MAC address of the AP and the condition can be met by the station, encode a physical Layer Convergence Procedure (PLCP) Protocol Data Unit (PPDU) to the AP; and generate signaling to cause the station to transmit the PPDU to the AP.

In Example 21, the subject matter of any one or more of Examples 18-20 optionally include wherein the ARC frame further comprises a transmit power (TXPWR) field, the TXPWR field indicating a TXPWR used by the first AP to transmit the ARC frame; and wherein the processing circuitry is further configured to: determine whether the condition can be met based on determining an attenuation between the station and the AP based on the TXPWR and a receive signal strength indicator (RSSI) of the ARC frame, and further based on a maximum TXPWR the station can use to transmit a physical Layer Convergence Procedure (PLCP) Protocol Data Unit (PPDU).

In Example 22, the subject matter of any one or more of Examples 18-21 optionally include wherein the ARC frame is included in a physical Layer Convergence Procedure (PLCP) Protocol Data Unit (PPDU), the PPDU comprising a legacy signal field, the legacy signal field comprising a third duration field, the third duration field indicating a duration of the PPDU.

In Example 23, the subject matter of any one or more of Examples 18-22 optionally include wherein the processing circuitry further comprises: if the MAC address is not the MAC address of the AP and the MAC address is not a basic service set identification (BSSID) associated with the AP, do not set the NAV based on the duration.

In Example 24, the subject matter of any one or more of Examples 18-23 optionally include wherein set the NAV of the station based on the duration, further comprises: set an intra-basic service set (intra-BSS) NAV based on the duration and a current value of the intra-BSS NAV.

In Example 25, the subject matter of any one or more of Examples 18-24 optionally include transceiver circuitry coupled to the processing circuitry; one or more antennas coupled to the transceiver circuitry.

The following first examples pertain to further embodiments. Example 1 is an apparatus of a first access point (AP), the apparatus including memory; and processing circuitry coupled to the memory, the processing circuitry configured to: decode a first physical Layer Convergence Procedure (PLCP) Protocol Data Unit (PPDU), the first PPDU including a trigger for control (TOC) frame, the TOC frame including resource allocations for deferral transmissions, the TOC frame further including a first duration field, the first duration field indicating a duration of a transmission opportunity (TXOP), where the PPDU is received from a second AP; determine whether the TOC frame includes a resource allocation for the first access point to transmit a receive with condition (ARC) frame, the resource allocation including a resource unit (RU); in response to a determination that the TOC frame includes the resource allocation, encode a second PPDU, the second PPDU including a preamble portion and a media access control (MAC) portion, the MAC portion including the ARC frame, the ARC frame including a second duration field, an address field, and a condition field, where the second duration field indicates a remaining duration of the TXOP, the address field indicates a MAC address of the first AP, and the condition field indicates a condition, and where the ARC frame indicates that stations associated with the first AP that do not meet the condition should set their network allocation vector (NAV) based on the remaining duration of the TXOP; and generate signaling to cause the first AP to transmit the second PPDU in accordance with the RU.

In Example 2, the subject matter of Example 1 optionally includes where the first PPDU is received over a first channel, and where the processing circuitry is further configured to: generate signaling to cause the first AP to transmit the preamble to be transmitted over the first channel and the PPDU in accordance with the RU, where the RU is a subchannel of the first channel.

In Example 3, the subject matter of any one or more of Examples 1-2 optionally include where the processing circuitry is further configured to: encode the preamble to include the resource allocations for deferral transmissions.

In Example 4, the subject matter of Example 3 optionally includes where each resource allocation of the resource allocations for deferral transmissions includes two or more from the following group: an association identification (AID), the RU, a coding type, a modulation and coding scheme (MCS), a spatial stream allocation, a target receive signal strength (RSSI), an indication of a type of deferral transmission, and an identification of an AP.

In Example 5, the subject matter of any one or more of Examples 1-4 optionally include where the processing circuitry is further configured to: determine the TOC frame includes the resource allocation for the first access point to transmit the ARC frame, if the resource allocation includes a association identification (AID) that indicates that neighboring APs are to transmit ARC frames.

In Example 6, the subject matter of any one or more of Examples 1-5 optionally include where the processing circuitry is further configured to: determine whether the TOC frame includes the resource allocation for the first access point to transmit a clear-to-send (CTS) to self; in response to a determination that the TOC frame includes the resource allocation for the first AP to transmit the CTS to self, encode a third PPDU, the third PPDU including the preamble portion and the MAC portion, the MAC portion including a CTS to self frame, the CTS to self frame including the second duration field, the second duration field indicating the remaining duration of the TXOP, and a receiver address field, the receiver address field indicating the MAC address of the first AP; and generate signaling to cause the first AP to transmit the third PPDU in accordance with the RU.

In Example 7, the subject matter of any one or more of Examples 1-6 optionally include where the condition is a receive signal strength indicator (RSSI) value, the RSSI value indicating that to meet the condition a station of the stations can transmit frames to the first AP that are received at the first AP with the RSSI value or a value higher than the RSSI value.

In Example 8, the subject matter of Example 7 optionally includes where the ARC frame further includes a transmit power (TXPWR) field, the TXPWR field indicating a TXPWR used by the first AP to transmit the ARC frame.

In Example 9, the subject matter of any one or more of Examples 7-8 optionally include where the condition further indicates a maximum transmit power the stations may use.

In Example 10, the subject matter of any one or more of Examples 1-9 optionally include where the second PPDU includes a legacy signal field, the legacy signal field including a length field, the length field indicating a length of the second PPDU.

In Example 11, the subject matter of any one or more of Examples 1-10 optionally include where the ARC frame further includes a field to indicate a bandwidth for the stations to set the NAV.

In Example 12, the subject matter of any one or more of Examples 1-11 optionally include In Example 13, the subject matter of any one or more of Examples 1-12 optionally include transceiver circuitry coupled to the processing circuitry; and one or more antennas coupled to the transceiver circuitry.

Example 14 is a method performed by an apparatus of a first access point, the method including: decoding a first physical Layer Convergence Procedure (PLCP) Protocol Data Unit (PPDU), the first PPDU including a trigger for control (TOC) frame, the TOC frame including resource allocations for deferral transmissions, the TOC frame further including a first duration field, the first duration field indicating a duration of a transmission opportunity (TXOP), where the PPDU is received from a second AP; determining whether the TOC frame includes a resource allocation for the first access point to transmit a receive with condition (ARC) frame, the resource allocation including a resource unit (RU); in response to a determination that the TOC frame includes the resource allocation, encoding a second PPDU, the second PPDU including a preamble portion and a media access control (MAC) portion, the MAC portion including the ARC frame, the ARC frame including a second duration field, an address field, and a condition field, where the second duration field indicates a remaining duration of the TXOP, the address field indicates a MAC address of the first AP, and the condition field indicates a condition, and where the ARC frame indicates that stations associated with the first AP that do not meet the condition should set their network allocation vector (NAV) based on the remaining duration of the TXOP; and generating signaling to cause the first AP to transmit the second PPDU in accordance with the RU.

In Example 15, the subject matter of Example 14 optionally includes where the first PPDU is received over a first channel, and where the method further includes: generating signaling to cause the first AP to transmit the preamble to be transmitted over the first channel and the PPDU in accordance with the RU, where the RU is a subchannel of the first channel.

Example 16 is a non-transitory computer-readable storage medium that stores instructions for execution by one or more processors of an apparatus of a station (STA), the instructions to configure the one or more processors to: associate with an access point (AP); decode a preamble of a physical Layer Convergence Procedure (PLCP) Protocol Data Unit (PPDU), the preamble including resource allocations for decoding deferral transmissions in a media access control (MAC) portion of the PPDU; decode the deferral transmissions; in response to a deferral transmission of the deferral transmissions being a receive with condition (ARC) frame, the ARC frame including a duration field, the duration field indicating a duration, an address field, the address field indicating a MAC address, and a condition field, the condition field indicating a condition, set a network allocation vector (NAV) of the station based on the duration, if the MAC address is a MAC address of the AP and the condition cannot be met by the station; and in response to the deferral transmission of the deferral transmission being a clear-to-send (CTS), the CTS frame including the duration field, the duration field indicating the duration, and a second address field, the second address field indicating a MAC address, set the NAV of the station based on the duration.

In Example 17, the subject matter of Example 16 optionally includes where the preamble is received over a first channel, and the deferral transmissions are received over second subchannels of the first channel.

In Example 18, the subject matter of any one or more of Examples 16-17 optionally include where the condition is a receive signal strength indicator (RSSI) value, the RSSI value indicating that to meet the condition the station can transmit frames to the AP that are received at the AP with the RSSI value or a value higher than the RSSI value.

In Example 19, the subject matter of any one or more of Examples 16-18 optionally include where the instructions further configure the one or more processors to: if the MAC address is the MAC address of the AP and the condition can be met by the station, encode a second PPDU to the AP; and generate signaling to cause the station to transmit the second PPDU to the AP.

In Example 20, the subject matter of any one or more of Examples 16-19 optionally include where the ARC frame further includes a transmit power (TXPWR) field, the TXPWR field indicating a TXPWR used by the AP to transmit the ARC frame; and where the instructions further configure the one or more processors to: determine whether the condition can be met based on determining an attenuation between the station and the AP based on the TXPWR and a receive signal strength indicator (RSSI) of the PPDU, and further based on a maximum TXPWR the station can use to transmit a second PPDU.

Example 21 is a non-transitory computer-readable storage medium that stores instructions for execution by one or more processors of an apparatus of a first access point (AP), the instructions to configure the one or more processors to: decode a first physical Layer Convergence Procedure (PLCP) Protocol Data Unit (PPDU), the first PPDU including a trigger for control (TOC) frame, the TOC frame including resource allocations for deferral transmissions, the TOC frame further including a first duration field, the first duration field indicating a duration of a transmission opportunity (TXOP), where the PPDU is received from a second AP; determine whether the TOC frame includes a resource allocation for the first access point to transmit a receive with condition (ARC) frame, the resource allocation including a resource unit (RU); in response to a determination that the TOC frame includes the resource allocation, encode a second PPDU, the second PPDU including a preamble portion and a media access control (MAC) portion, the MAC portion including the ARC frame, the ARC frame including a second duration field, an address field, and a condition field, where the second duration field indicates a remaining duration of the TXOP, the address field indicates a MAC address of the first AP, and the condition field indicates a condition, and where the ARC frame indicates that stations associated with the first AP that do not meet the condition should set their network allocation vector (NAV) based on the remaining duration of the TXOP; and generate signaling to cause the first AP to transmit the second PPDU in accordance with the RU.

In Example 22, the subject matter of any one or more of Examples 14-21 optionally include where the first PPDU is received over a first channel, and where the instructions further configure the one or more processors to: generate signaling to cause the first AP to transmit the preamble to be transmitted over the first channel and the PPDU in accordance with the RU, where the RU is a subchannel of the first channel.

Example 23 is an apparatus of a station including memory; and processing circuitry coupled to the memory, the processing circuity configured to: associate with an access point (AP), decode a preamble of a physical Layer Convergence Procedure (PLCP) Protocol Data Unit (PPDU), the preamble including resource allocations for decoding deferral transmissions in a media access control (MAC) portion of the PPDU; decode the deferral transmissions; in response to a deferral transmission of the deferral transmissions being a receive with condition (ARC) frame, the ARC frame including a duration field, the duration field indicating a duration, an address field, the address field indicating a MAC address, and a condition field, the condition field indicating a condition, set a network allocation vector (NAV) of the station based on the duration, if the MAC address is a MAC address of the AP and the condition cannot be met by the station; and in response to the deferral transmission of the deferral transmission being a clear-to-send (CTS), the CTS frame including the duration field, the duration field indicating the duration, and a second address field, the second address field indicating a MAC address, set the NAV of the station based on the duration.

In Example 24, the subject matter of Example 23 optionally includes where the preamble is received over a first channel, and the deferral transmissions are received over second subchannels of the first channel.

In Example 25, the subject matter of any one or more of Examples 23-24 optionally include where the condition is a receive signal strength indicator (RSSI) value, the RSSI value indicating that to meet the condition the station can transmit frames to the AP that are received at the AP with the RSSI value or a value higher than the RSSI value.

In Example 26, the subject matter of any one or more of Examples 23-25 optionally include where the processing circuitry further includes: if the MAC address is the MAC address of the AP and the condition can be met by the station, encode a second PPDU to the AP; and generate signaling to cause the station to transmit the second PPDU to the AP.

In Example 27, the subject matter of any one or more of Examples 23-26 optionally include where the ARC frame further includes a transmit power (TXPWR) field, the TXPWR field indicating a TXPWR used by the AP to transmit the ARC frame; and where the processing circuitry is further configured to: determine whether the condition can be met based on determining an attenuation between the station and the AP based on the TXPWR and a receive signal strength indicator (RSSI) of the PPDU, and further based on a maximum TXPWR the station can use to transmit a second PPDU.

In Example 28, the subject matter of any one or more of Examples 23-27 optionally include where the PPDU includes a legacy signal field, the legacy signal field including a length field, the length field indicating a length of the PPDU.

In Example 29, the subject matter of any one or more of Examples 23-28 optionally include where the processing circuitry further includes: if the MAC address is not the MAC address of the AP and the MAC address is not a basic service set identification (BSSID) associated with the AP, do not set the NAV based on the duration.

In Example 30, the subject matter of any one or more of Examples 23-29 optionally include transceiver circuitry coupled to the processing circuitry; one or more antennas coupled to the transceiver circuitry.

Example 31 is a method performed on a station (STA), the method including: associating with an access point (AP); decoding a preamble of a physical Layer Convergence Procedure (PLCP) Protocol Data Unit (PPDU), the preamble including resource allocations for decoding deferral transmissions in a media access control (MAC) portion of the PPDU; decoding the deferral transmissions; in response to a deferral transmission of the deferral transmissions being a receive with condition (ARC) frame, the ARC frame including a duration field, the duration field indicating a duration, an address field, the address field indicating a MAC address, and a condition field, the condition field indicating a condition, setting a network allocation vector (NAV) of the station based on the duration, if the MAC address is a MAC address of the AP and the condition cannot be met by the station; and in response to the deferral transmission of the deferral transmission being a clear-to-send (CTS), the CTS frame including the duration field, the duration field indicating the duration, and a second address field, the second address field indicating a MAC address, setting the NAV of the station based on the duration.

In Example 32, the subject matter of Example 31 optionally includes where the preamble is received over a first channel, and the deferral transmissions are received over second subchannels of the first channel.

Example 33 is an apparatus of a station (STA), the apparatus including: means for associating with an access point (AP); means for decoding a preamble of a physical Layer Convergence Procedure (PLCP) Protocol Data Unit (PPDU), the preamble including resource allocations for decoding deferral transmissions in a media access control (MAC) portion of the PPDU; means for decoding the deferral transmissions; in response to a deferral transmission of the deferral transmissions being a receive with condition (ARC) frame, the ARC frame including a duration field, the duration field indicating a duration, an address field, the address field indicating a MAC address, and a condition field, the condition field indicating a condition, means for setting a network allocation vector (NAV) of the station based on the duration, if the MAC address is a MAC address of the AP and the condition cannot be met by the station; and in response to the deferral transmission of the deferral transmission being a clear-to-send (CTS), the CTS frame including the duration field, the duration field indicating the duration, and a second address field, the second address field indicating a MAC address, means for setting the NAV of the station based on the duration.

In Example 34, the subject matter of Example 33 optionally includes where the preamble is received over a first channel, and the deferral transmissions are received over second subchannels of the first channel.

Example 35 is an apparatus of a first access point, the apparatus including: means for decoding a first physical Layer Convergence Procedure (PLCP) Protocol Data Unit (PPDU), the first PPDU including a trigger for control (TOC) frame, the TOC frame including resource allocations for deferral transmissions, the TOC frame further including a first duration field, the first duration field indicating a duration of a transmission opportunity (TXOP), where the PPDU is received from a second AP; means for determining whether the TOC frame includes a resource allocation for the first access point to transmit a receive with condition (ARC) frame, the resource allocation including a resource unit (RU); in response to a determination that the TOC frame includes the resource allocation, means for encoding a second PPDU, the second PPDU including a preamble portion and a media access control (MAC) portion, the MAC portion including the ARC frame, the ARC frame including a second duration field, an address field, and a condition field, where the second duration field indicates a remaining duration of the TXOP, the address field indicates a MAC address of the first AP, and the condition field indicates a condition, and where the ARC frame indicates that stations associated with the first AP that do not meet the condition should set their network allocation vector (NAV) based on the remaining duration of the TXOP; and means for generating signaling to cause the first AP to transmit the second PPDU in accordance with the RU.

In Example 36, the subject matter of Example 35 optionally includes where the first PPDU is received over a first channel, and where the apparatus further includes: means for generating signaling to cause the first AP to transmit the preamble to be transmitted over the first channel and the PPDU in accordance with the RU, where the RU is a subchannel of the first channel.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a first access point (AP), the apparatus comprising memory; and processing circuitry coupled to the memory, the processing circuitry configured to:
    decode a first physical Layer Convergence Procedure (PLCP) Protocol Data Unit (PPDU), the first PPDU comprising a trigger for control (TOC) frame, the TOC frame comprising resource allocations for deferral transmissions, the TOC frame further comprising a first duration field, the first duration field indicating a duration of a transmission opportunity (TXOP), wherein the PPDU is received from a second AP;
    determine whether the TOC frame includes a resource allocation for the first access point to transmit a receive with condition (ARC) frame, the resource allocation comprising a resource unit (RU);
    in response to a determination that the TOC frame includes the resource allocation, encode a second PPDU, the second PPDU comprising a preamble portion and a media access control (MAC) portion, the MAC portion comprising the ARC frame, the ARC frame comprising a second duration field, an address field, and a condition field, wherein the second duration field indicates a remaining duration of the TXOP, the address field indicates a MAC address of the first AP, and the condition field indicates a condition, and wherein the condition indicates that stations associated with the first AP that do not meet the condition should set their network allocation vector (NAV) based on the remaining duration of the TXOP; and
    generate signaling to cause the first AP to transmit the second PPDU in accordance with the RU.

2. The apparatus of claim 1, wherein the first PPDU is received over a first channel, and wherein the processing circuitry is further configured to:
    generate signaling to cause the first AP to transmit the preamble to be transmitted over the first channel and the PPDU in accordance with the RU, wherein the RU is a subchannel of the first channel.

3. The apparatus of claim 1, wherein the processing circuitry is further configured to:
    encode the preamble to comprise the resource allocations for deferral transmissions.

4. The apparatus of claim 3, wherein each resource allocation of the resource allocations for deferral transmissions comprises two or more from the following group: an association identification (AID), the RU, a coding type, a modulation and coding scheme (MCS), a spatial stream allocation, a target receive signal strength (RSSI), an indication of a type of deferral transmission, and an identification of an AP.

5. The apparatus of claim 1, wherein the processing circuitry is further configured to:
    determine the TOC frame comprises the resource allocation for the first access point to transmit the ARC frame, if the resource allocation comprises a association identification (AID) that indicates that neighboring APs are to transmit ARC frames.

6. The apparatus of claim 1, wherein the processing circuitry is further configured to:
    determine whether the TOC frame comprises the resource allocation for the first access point to transmit a clear-to-send (CTS) to self;
    in response to a determination that the TOC frame comprises the resource allocation for the first AP to transmit the CTS to self, encode a third PPDU, the third PPDU comprising the preamble portion and the MAC portion, the MAC portion comprising a CTS to self frame, the CTS to self frame comprising the second duration field, the second duration field indicating the remaining duration of the TXOP, and a receiver address field, the receiver address field indicating the MAC address of the first AP; and
    generate signaling to cause the first AP to transmit the third PPDU in accordance with the RU.

7. The apparatus of claim 1, wherein the condition is a receive signal strength indicator (RSSI) value, the RSSI value indicating that to meet the condition a station of the stations can transmit frames to the first AP that are received at the first AP with the RSSI value or a value higher than the RSSI value.

8. The apparatus of claim 7, wherein the ARC frame further comprises a transmit power (TXPWR) field, the TXPWR field indicating a TXPWR used by the first AP to transmit the ARC frame.

9. The apparatus of claim 7, wherein the condition further indicates a maximum transmit power the stations may use.

10. The apparatus of claim 1, wherein the second PPDU comprises a legacy signal field, the legacy signal field comprising a length field, the length field indicating a length of the second PPDU.

11. The apparatus of claim 1, wherein the ARC frame further comprises a field to indicate a bandwidth for the stations to set the NAV.

12. The apparatus of claim 1, wherein the first AP, the second AP, and the stations are configured to operate in accordance with one or more of the following communication standards: an Institute of Electrical and Electronic Engineers (IEEE) 802.11ax, an IEEE 802.11 extremely-high throughput (EHT), IEEE 802.11ay, and IEEE 802.11.

13. The apparatus of claim 1, further comprising transceiver circuitry coupled to the processing circuitry; and one or more antennas coupled to the transceiver circuitry.

14. A method performed by an apparatus of a first access point, the method comprising:
    decoding a first physical Layer Convergence Procedure (PLCP) Protocol Data Unit (PPDU), the first PPDU comprising a trigger for control (TOC) frame, the TOC frame comprising resource allocations for deferral transmissions, the TOC frame further comprising a first duration field, the first duration field indicating a duration of a transmission opportunity (TXOP), wherein the PPDU is received from a second AP;
    determining whether the TOC frame comprises a resource allocation for the first access point to transmit a receive with condition (ARC) frame, the resource allocation comprising a resource unit (RU);
    in response to a determination that the TOC frame includes the resource allocation, encode a second PPDU, the second PPDU comprising a preamble portion and a media access control (MAC) portion, the MAC portion comprising the ARC frame, the ARC frame comprising a second duration field, an address field, and a condition field, wherein the second duration field indicates a remaining duration of the TXOP, the address field indicates a MAC address of the first AP, and the condition field indicates a condition, and wherein the condition indicates that stations associated with the first AP that do not meet the condition should set their network allocation vector (NAV) based on the remaining duration of the TXOP; and generating signaling to cause the first AP to transmit the second PPDU in accordance with the RU.

15. The method of claim 14, wherein the first PPDU is received over a first channel, and wherein the method further comprises:

generating signaling to cause the first AP to transmit the preamble to be transmitted over the first channel and the PPDU in accordance with the RU, wherein the RU is a subchannel of the first channel.

16. A non-transitory computer-readable storage medium that stores instructions for execution by one or more processors of an apparatus of a station (STA), the instructions to configure the one or more processors to:

associate with an access point (AP);

decode a preamble of a physical Layer Convergence Procedure (PLCP) Protocol Data Unit (PPDU), the preamble comprising resource allocations for decoding deferral transmissions in a media access control (MAC) portion of the PPDU;

decode the deferral transmissions;

in response to a determination that the TOC frame includes the resource allocation, encode a second PPDU, the second PPDU comprising a preamble portion and a media access control (MAC) portion, the MAC portion comprising the ARC frame, the ARC frame comprising a second duration field, an address field, and a condition field, wherein the second duration field indicates a remaining duration of the TXOP, the address field indicates a MAC address of the first AP, and the condition field indicates a condition, and wherein the condition indicates that stations associated with the first AP that do not meet the condition should set their network allocation vector (NAV) based on the remaining duration of the TXOP; and in response to the deferral transmission of the deferral transmission being a clear-to-send (CTS), the CTS frame comprising the duration field, the duration field indicating the duration, and a second address field, the second address field indicating a MAC address, set the NAV of the station based on the duration.

17. The non-transitory computer-readable storage medium of claim 16, wherein the preamble is received over a first channel, and the deferral transmissions are received over second subchannels of the first channel.

18. The non-transitory computer-readable storage medium of claim 16, wherein the condition is a receive signal strength indicator (RSSI) value, the RSSI value indicating that to meet the condition the station can transmit frames to the AP that are received at the AP with the RSSI value or a value higher than the RSSI value.

19. The non-transitory computer-readable storage medium of claim 16, wherein the instructions further configure the one or more processors to:

if the MAC address is the MAC address of the AP and the condition can be met by the station, encode a second PPDU to the AP; and generate signaling to cause the station to transmit the second PPDU to the AP.

20. The non-transitory computer-readable storage medium of claim 16, wherein the ARC frame further comprises a transmit power (TXPWR) field, the TXPWR field indicating a TXPWR used by the AP to transmit the ARC frame; and wherein the instructions further configure the one or more processors to:

determine whether the condition can be met based on determining an attenuation between the station and the AP based on the TXPWR and a receive signal strength indicator (RSSI) of the PPDU, and further based on a maximum TXPWR the station can use to transmit a second PPDU.

* * * * *